(12) United States Patent
Stark et al.

(10) Patent No.: US 7,941,819 B2
(45) Date of Patent: *May 10, 2011

(54) TIME-BASED GRAPHICAL USER INTERFACE FOR MULTIMEDIA CONTENT

(75) Inventors: Korina J. B. Stark, Seattle, WA (US); Daniel R. Sterling, Mill Creek, WA (US); Michael Stacie, Kirkland, WA (US); Marcellino Tanumihardja, Seattle, WA (US)

(73) Assignee: Vulcan Inc., Seattle, WA (US)

( * ) Notice: Subject to any disclaimer, the term of this patent is extended or adjusted under 35 U.S.C. 154(b) by 268 days.

This patent is subject to a terminal disclaimer.

(21) Appl. No.: 12/430,746

(22) Filed: Apr. 27, 2009

(65) Prior Publication Data

US 2010/0031193 A1 Feb. 4, 2010

Related U.S. Application Data

(63) Continuation of application No. 11/121,302, filed on May 2, 2005, now abandoned.

(51) Int. Cl.
*G06F 3/00* (2006.01)
*G06F 13/00* (2006.01)
*H04N 5/445* (2011.01)

(52) U.S. Cl. ............. 725/45; 725/37; 725/39; 725/40; 725/43; 348/563

(58) Field of Classification Search ............ None
See application file for complete search history.

(56) References Cited

U.S. PATENT DOCUMENTS

| | | | |
|---|---|---|---|
| 5,473,609 A | 12/1995 | Chaney | |
| 5,585,838 A | 12/1996 | Lawler et al. | |
| 5,727,060 A | 3/1998 | Young | |
| 5,850,218 A * | 12/1998 | LaJoie et al. | 725/45 |
| 5,883,677 A | 3/1999 | Hofmann | |
| 6,040,829 A | 3/2000 | Croy et al. | |
| 6,122,648 A | 9/2000 | Roderick | |
| 6,151,059 A * | 11/2000 | Schein et al. | 725/37 |
| 6,163,345 A | 12/2000 | Noguchi et al. | |
| 6,177,931 B1 | 1/2001 | Alexander et al. | |
| 6,347,400 B1 | 2/2002 | Ohkura et al. | |
| 6,363,434 B1 | 3/2002 | Eytchison | |
| 6,370,455 B1 | 4/2002 | Larson et al. | |

(Continued)

OTHER PUBLICATIONS

Final Office Action for U.S. Appl. No. 11/397,531, Mail Date Aug. 13, 2009, 36 pages.

(Continued)

*Primary Examiner* — Joseph P Hirl
*Assistant Examiner* — Joshua Taylor
(74) *Attorney, Agent, or Firm* — Perkins Coie LLP

(57) ABSTRACT

A graphical user interface ("GUI") for a content management system is provided, such as to present information associated with various forms of multimedia content. In some situations, the GUI includes information presented simultaneously using at least first and second time scales, such as to provide relatively detailed information for content corresponding to a shorter time scale (e.g., to display content listings with details about content that corresponds to a time period at the shorter time scale) and to provide relatively limited information for content corresponding to a longer time scale (e.g., indications of other content of potential interest corresponding to times outside the time period of the shorter time scale). In addition, in some situations the relatively limited information for content corresponding to the longer time scale may be selectable by the user to provide various functionality related to that content.

34 Claims, 31 Drawing Sheets

U.S. PATENT DOCUMENTS

| | | | |
|---|---|---|---|
| 6,466,971 B1 | 10/2002 | Humpleman et al. | |
| 6,507,950 B1 | 1/2003 | Tsukidate et al. | |
| 6,526,577 B1 | 2/2003 | Knudson et al. | |
| 6,536,041 B1 | 3/2003 | Knudson et al. | |
| 6,563,430 B1 | 5/2003 | Kemink et al. | |
| 6,564,378 B1 | 5/2003 | Satterfield et al. | |
| 6,587,217 B1 | 7/2003 | Lahey et al. | |
| 6,601,238 B2 | 7/2003 | Morrison et al. | |
| 6,640,337 B1 | 10/2003 | Lu | |
| 6,784,805 B2 | 8/2004 | Harris et al. | |
| 6,792,323 B2 | 9/2004 | Krzyzanowski et al. | |
| 6,857,128 B1 | 2/2005 | Borden, IV et al. | |
| 6,938,101 B2 | 8/2005 | Hayes et al. | |
| 6,971,121 B2 | 11/2005 | West et al. | |
| 6,981,273 B1 | 12/2005 | Domegan et al. | |
| 7,017,120 B2 | 3/2006 | Shnier | |
| 7,047,547 B2 | 5/2006 | Alten et al. | |
| 7,065,777 B2 | 6/2006 | Inoue | |
| 7,136,709 B2 | 11/2006 | Arling et al. | |
| 7,140,033 B1 | 11/2006 | Durden et al. | |
| 7,207,057 B1 | 4/2007 | Rowe | |
| 7,434,153 B2 | 10/2008 | Liu et al. | |
| 7,539,759 B2 | 5/2009 | Narayanan et al. | |
| 2001/0010046 A1 | 7/2001 | Muyres et al. | |
| 2001/0011373 A1 | 8/2001 | Inoue | |
| 2001/0026287 A1 | 10/2001 | Watanabe | |
| 2001/0030950 A1 | 10/2001 | Chen et al. | |
| 2001/0042107 A1 | 11/2001 | Palm | |
| 2002/0013852 A1 | 1/2002 | Janik | |
| 2002/0035404 A1 | 3/2002 | Ficco et al. | |
| 2002/0068558 A1 | 6/2002 | Janik | |
| 2002/0078161 A1 | 6/2002 | Cheng | |
| 2002/0103934 A1 | 8/2002 | Fishman et al. | |
| 2002/0168177 A1 | 11/2002 | Kajitani | |
| 2002/0170057 A1 | 11/2002 | Barrett et al. | |
| 2002/0174430 A1 | 11/2002 | Ellis et al. | |
| 2002/0178279 A1 | 11/2002 | Janik et al. | |
| 2003/0023975 A1 | 1/2003 | Schrader et al. | |
| 2003/0048295 A1 | 3/2003 | Lilleness et al. | |
| 2003/0051246 A1 | 3/2003 | Wilder et al. | |
| 2003/0084449 A1 | 5/2003 | Chane et al. | |
| 2003/0086023 A1 | 5/2003 | Chung et al. | |
| 2003/0093790 A1 | 5/2003 | Logan et al. | |
| 2003/0095156 A1 | 5/2003 | Klein et al. | |
| 2003/0103088 A1 | 6/2003 | Dresti et al. | |
| 2003/0110514 A1* | 6/2003 | West et al. | 725/134 |
| 2003/0115593 A1 | 6/2003 | Alten et al. | |
| 2003/0229900 A1 | 12/2003 | Reisman | |
| 2004/0031058 A1 | 2/2004 | Reisman | |
| 2004/0068739 A1 | 4/2004 | Russ et al. | |
| 2004/0070491 A1 | 4/2004 | Huang et al. | |
| 2004/0078815 A1 | 4/2004 | Lemmons et al. | |
| 2004/0083266 A1 | 4/2004 | Comstock et al. | |
| 2004/0253945 A1 | 12/2004 | Janik | |
| 2004/0261040 A1 | 12/2004 | Radcliffe et al. | |
| 2004/0268407 A1 | 12/2004 | Sparrell et al. | |
| 2005/0055716 A1 | 3/2005 | Louie et al. | |
| 2005/0080915 A1 | 4/2005 | Shoemaker et al. | |
| 2005/0188078 A1 | 8/2005 | Kotzin et al. | |
| 2005/0210507 A1 | 9/2005 | Hawkins et al. | |
| 2005/0235047 A1 | 10/2005 | Li et al. | |
| 2005/0262535 A1 | 11/2005 | Uchida et al. | |
| 2005/0278741 A1 | 12/2005 | Robarts et al. | |
| 2006/0020962 A1 | 1/2006 | Stark et al. | |
| 2006/0026636 A1 | 2/2006 | Stark et al. | |
| 2006/0026638 A1 | 2/2006 | Stark et al. | |
| 2006/0031880 A1 | 2/2006 | Stark et al. | |
| 2006/0041927 A1 | 2/2006 | Stark et al. | |
| 2006/0064720 A1 | 3/2006 | Istvan et al. | |
| 2006/0080408 A1 | 4/2006 | Istvan et al. | |
| 2006/0085825 A1 | 4/2006 | Istvan et al. | |
| 2006/0085835 A1 | 4/2006 | Istvan et al. | |
| 2006/0248557 A1 | 11/2006 | Stark et al. | |
| 2006/0253874 A1 | 11/2006 | Stark et al. | |
| 2007/0098362 A1 | 5/2007 | Sharma | |
| 2008/0189737 A1 | 8/2008 | Ellis et al. | |

OTHER PUBLICATIONS

"Windows Media-Windows Media Player," Microsoft Corporation, 2004, http://download.microsoft.com/download/0/b/8/0b89049d-dc57-4571-aa69-cf592743a241/WMPlayer.doc, 211 pages [Internet accessed on Apr. 4, 2006].

"Slink-e Specs," Device features, Nirvis, Inc., 2001, http://www.nirvis.com/slinke_specs.htm, 2 pages [Internet accessed on Jul. 10, 2008].

"CDJ Compatibility," Nirvis, Inc., 2001, http://www.nirvis.com/cdj_compat.htm, 4 pages, [Internet accessed on Jul. 10, 2008].

"Slink-e Schematic," Datasheet, Nirvis, Inc., 2001, http://www.nirvis.com/schemati2_0.htm, 2 pages [Internet accessed on Jul. 10, 2008].

Phillips, W., "The Nirvis Slink-e and CDJ Software," Product Review, Jun. 15, 2001, http://www.onhifi.com/product/nirvis_slinke.htm, 4 pages [Internet accessed on Jul. 9, 2008].

"CDJ Features," Nirvis, Inc., 2001, http://www.nirvis.com/cdj_features.htm, 2 pages, [Internet accessed on Jul. 10, 2008].

"Slink-e," Product Controllng Panels, Nirvis, Inc., 2001, http://www.nirvis.com/slink-e.htm, 1 page [Internet accessed on Jul. 9, 2008].

CDJ Screenshot, CDJ GUI Interface, Nirvis, Inc., 2001, http://www.nirvis.com/Images/ir/screenshot.gif, 1 page [Internet accessed on Jul. 10, 2008].

Joyce, E., "Gemstar Patent Woes Signal shift in iTV Tech," Jun. 25, 2002, http://www.atnewyork.com/news/print.php/1371211, 3 pages [Internet accessed on Oct. 11, 2005].

"TiVo Online Scheduling," TiVo.com, http://www.tivo.com/4.9.6.asp, 2 pages [Internet accessed on Oct. 11, 2005].

"TiVo Desktop," TiVo.com, http://www.tivo.com/4.9.6.1.asp, 2 pages [Internet accessed on Oct. 11, 2005].

"TiVo Advantage," TiVo.com, http://www.tivo.com/1.0.asp, 2 pages [Internet accessed on Oct. 11, 2005].

"TiVo Service," TiVo.com, http://www.tivo.com/1.2.asp, 3 pages [Internet accessed on Oct. 11, 2005].

"What We Do—TV Guide on Screen," Gemstar-TV Guide International, http://www.gemstartvguide.com/whatwedo/tvgonscreen.asp, 2 pages [Internet accessed on Oct. 11, 2005].

"Gemstar Wars: Murdoch Strikes Back," Business Week Online, Jun. 3, 2002, http;//www.businessweek.com/print/magazine/content/02_22/b3785064.htm?chan=mz, 2 pages [Internet accessed on Oct. 11, 2005].

"ReplayTV 5500 Features," http://www.digitalnetworksna.com/dvr/5500/features.asp, 2 pages [Internet accessed on Oct. 11, 2005].

ReplayTV 5500 Demo; http://www.digitalnetworksna.Demo, 1 page [Internet accessed on Oct. 11, 2005].

"DigiGuide User Manual," DigiGuide Interactive TV & Radio, Apr. 28, 2005, http://www.digiguide.com/support/digiGuideUserManual.pdf, pp. 1-35 [Internet accessed on Oct. 11, 2005].

"Project Standard Guide," Microsoft Corporation, 2003, http://download.microsoft.com/download/2/9/d/29d 9b1f1-f875-430e-8138-8d0a23dbd1c4/ProjectStdGuide.doc, 28 pages [Internet accessed on Oct. 11, 2005].

"Microsoft Office Outlook 2003, Product Guide," Microsoft corporation, 2004, http://download.microsoft.com/download/2/d/9/2d9e7b12-f966-422c-82c4-679ba323d1ab/Outlook2003ProductGuide.doc, pp. 1-73 [Internet accessed on Oct. 11, 2005].

Block, R. "Toss that remote, score one for cellphones," Jun. 30, 2004, http://engadget.com/entry/5178754663242732/, 3 pages [Internet accessed on Jan. 20, 2005].

Zap2it, TV Listings Printable Grid, http://tvlistings.zap2it.com/grid_printable.asp, 1 page [Internet accessed on Mar. 18, 2005].

Dudley, B, "Consumer Electronics Show: Buzz is on Home-Media centers," Rearden Studios, Jan. 6, 2002, http://www.rearden.com/articles/seattletimesjan0602.html, 3 pages [Internet accessed on Mar. 18, 2005].

"About HAVi—HAVi Essentials— Fast Track," HAVi, http://www.havi.org/about/aboutoverview.asp 2 pages [Internet accessed on Mar. 18, 2005].

Chen, K. et al., "Programming Open Service Gateways with Java Embedded Server Technology," Chapter 1, Addison Wesley Professional, ed. 1, Aug. 30, 2001, http://awprofessional.com/title/0201711028, cover page & pp. 1-14 [Internet accessed on Jan. 26, 2005].

Yomogita, H., "PnP Middleware Connects Home Appliances for Networking," Nikkei Electronics—Asia, Special Report, Aug. 1999, http://nikkeibq.com/nea/aug99/specrep, 7 pages [Internet accessed on Jan. 26, 2005].

"Understanding Universal Plug and Play," Microsoft Windows, Me-Millennium Edition, White Paper, Jun. 2000, 45 pages.

"Jini Network Technology—An Executive Overview," Sun Microsystems, Inc., Palo Alto, CA, Feb. 2001, 19 pages.

"The Connected Home Powered by Java Embedded Server TM Software—White Paper," Sun Microsystems, Inc., Palo Alto, CA, Dec. 2000, 28 pages.

"JXTA Technolgy: Creating Connected Communities," Sun Microsystems, Inc., Palo Alto, CA, Jan. 2004, http://www.jxta.org/project/www/docs/JXTA-Exec-Brief.pdf, 6 pages [Internet accessed on Nov. 8, 2004].

"GigaSpaces Platform—White Paper," GigaSpace Technologies, Ltd., Feb. 25, 2002, http://webarchive.org/web/20030607073327/j-spaces.com/dowload/GigaSpacesWhitePaper.pdf, 14 pages [Internet accessed on Nov. 8, 2004].

"Technical JXTA™ FAQ," http://www.jxta.org/JXTAFAQTech.html, 10 pages [Internet accessed on Nov. 8, 2004].

"General JXTA™ FAQ," http://www.jxta.org/JXTAFAQ.html, 12 pages [Internet accessed on Nov. 8, 2004].

McLean, S. et al., "Understanding the .NET Remoting Architecture," Microsoft .NET Remoting, Chapter 2, http://proquest.safaribooksonline.com/print?xmlid=0735617783/ida5rzr, 5 pages [accessed on Sep. 24, 2008].

Tindall, P. "Taking the Enterprise Application to the Net," Developing Enterprise Applications—An Imputrist's View, Chapter 12, http://proquest.safaribooksonline.com/print?xmlid=0789722690/ch12Iev1sec1, 8 pages [accessed on Sep. 24, 2008].

Non-Final Office Action for U.S. Appl. No. 11/120,664, Mail Date Apr. 16, 2009, 36 pages.

Final Office Action for U.S. Appl. No. 11/120,656, Mail Date Apr. 30, 2009, 19 pages.

* cited by examiner

FIG. 9

TIME-BASED GRAPHICAL USER INTERFACE FOR MULTIMEDIA CONTENT

CROSS REFERENCE TO RELATED APPLICATIONS

The present application is a continuation of U.S. patent application Ser. No. 11/121,302, entitled "Time-Based Graphical User Interface for Multimedia Content," filed May 2, 2005, which claims the benefit under 35 U.S.C. §119(e) of U.S. Provisional Patent Application Ser. No. 60/567,177, entitled "Browser For Multimedia Content," filed Apr. 30, 2004, which applications are incorporated herein by reference in their entireties.

The present application is also related to U.S. patent application Ser. No. 11/121,313, entitled "Time-Based Graphical User Interface For Television Program Information" and filed concurrently, which is hereby incorporated by reference in its entirety.

TECHNICAL FIELD

The present disclosure generally relates to techniques for reviewing, manipulating and presenting content, such as to manage multimedia content via a time-based graphical user interface ("GUI") of a computing device.

BACKGROUND INFORMATION

In the current world of television, movies, and related media systems, many consumers receive television programming-related content via broadcast over a cable network to a television or similar display, with the content often received via a set-top box ("STB") from the cable network that controls display of particular television (or "TV") programs from among a large number of available television channels, while other consumers may similarly receive television programming-related content in other manners (e.g., via satellite transmissions, broadcasts over airwaves, over packet-switched networks, etc.). In addition, enhanced television programming services and capabilities are increasingly being provided to consumers, such as the ability to receive television programming-related content that is delivered "on demand" using Video on Demand ("VOD") technologies (e.g., based on a pay-per-view business model) and/or various interactive TV capabilities. Consumers generally subscribe to services offered by a cable network "head-end" or other similar content distribution facility to obtain particular content, which in some situations may include interactive content and Internet content.

Consumers of content are also increasingly using a variety of devices to record and control viewing of content, such as via digital video recorders ("DVRs") that can record television-related content for later playback and/or can temporarily store recent and current content to allow functionality such as pausing or rewinding live television. A DVR may also be known as a personal video recorder ("PVR"), hard disk recorder ("HDR"), personal video station ("PVS"), or a personal television receiver ("PTR"). DVRs may in some situations be integrated into a set-top box, such as with Digeo's MOXI™ device, while in other situations may be a separate component connected to an STB and/or television. In addition, electronic programming guides ("EPGs") are often made available to aid consumers in selecting a desired program to currently view and/or to schedule for delayed viewing. Using an EPG and a DVR, a consumer can cause a desired program to be recorded and can then view the program at a more convenient time or location.

However, as the cable industry grows and as additional types of content are increasingly being stored and made available to consumers, it is becoming increasingly difficult for consumers to effectively manage the content and the related capabilities of the various devices that are available. Moreover, the proliferation of networked presentation devices within homes (e.g., televisions, handheld and desktop computing systems, stereos, speakers, cell phones, etc.) makes the task of effectively managing the content, including its presentation via the various devices, even more difficult.

BRIEF DESCRIPTION OF THE DRAWINGS

FIGS. 2-27 and 29-31 show example embodiments of a GUI for a content management system.

Non-limiting and non-exhaustive embodiments are described with reference to the figures, wherein like reference numerals refer to like parts throughout the various views unless otherwise specified.

DETAILED DESCRIPTION

Figure 1:
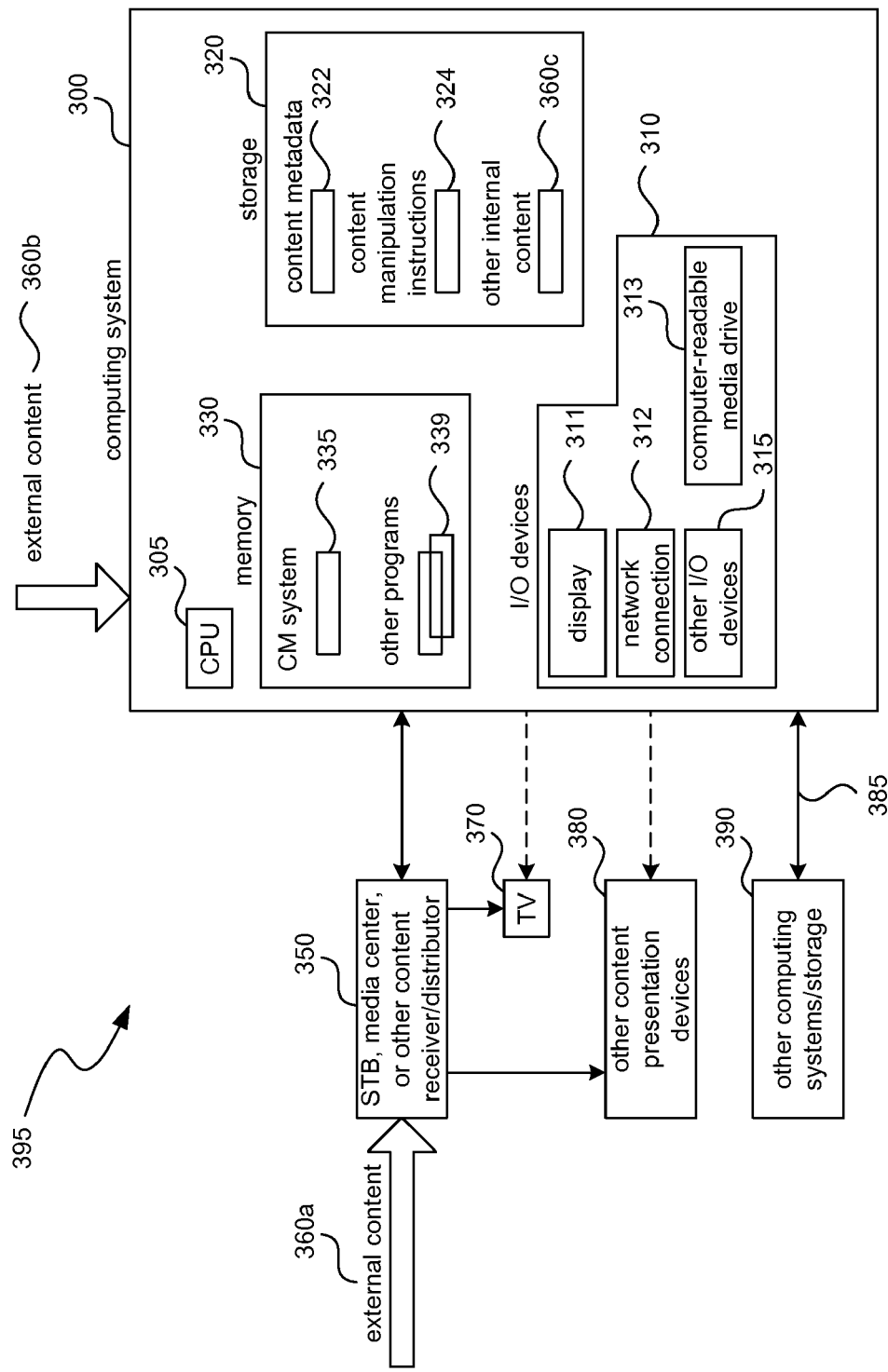
FIG. 1 is a block diagram of an embodiment of a content management ("CM") system environment that can provide a time-based GUI to manage content.

Techniques are described below for managing various types of content in various ways, such as via a time-based graphical user interface ("GUI") of a Content Management ("CM") system executing on a computing device. In some embodiments, at least some of the content being managed includes television programming-related content, with the CM system receiving EPG information for the content (e.g., via interactions with an STB). In such embodiments, the television programming-related content can then be managed via the CM system GUI in a variety of ways using a time-based scheme, such as to allow a consumer to locate and identify content of potential interest, to schedule recordings of selected content, to manage previously recorded content (e.g., to play or delete the content), to control live television, etc. In addition, the CM system can further manage various other types of contents and perform various other types of content management functions, as described in greater detail below.

In at least some embodiments, the CM system GUI includes at least first and second time scales, and simultaneously displays different types of information related to content using the multiple time scales. In embodiments in which the content includes television programming, various types of details may be provided about television programs with scheduled presentation times such that the programs will be available for display on one or more channels during the relatively short second period of time, while indications of or other limited details may be provided about other television programs of potential interest that will be available for display during some or all of the relatively long first period of time. In embodiments in which the content includes one or more of various other types of content that has associated time-based information (e.g., photographs, music, video clips, etc.), various types of details may be provided about such content whose time-based information corresponds to the relatively short second period of time, while indications of or other limited details may be provided about content whose time-based information corresponds to the relatively long first period of time. As discussed in greater detail below, various techniques are provided in various embodiments for displaying, sorting, identifying, filtering, and otherwise managing content using the multiple time scales and other GUI tools.

For illustrative purposes, some embodiments are described below in which specific types of content are managed in specific ways via specific example embodiments of the CM system GUI. However, the techniques can be used in a wide variety of other situations, and that the invention is not limited to the specific illustrative details discussed. More generally, as used herein, multimedia "content" generally includes television programs, movies and other video information (whether stored, such as in a file, or streamed), photos and other images, music and other audio information (whether stored or streamed), presentations, video/teleconferences, videogames, Internet Web pages and other data, and other similar video or audio content.

Referring first to FIG. 1, a network diagram illustrates an example use of an embodiment of the CM system in a home environment 395 for entertainment purposes, although the CM system could similarly be used in business or other non-home environments and for purposes other than entertainment. In this example, the home environment includes an STB or other media center 350 receiving external content 360a that is available to one or more consumers (not shown) in the home environment 395, such as television programming-related content 360a for presentation on a television 370. Other types of audio and/or video content could similarly be received by and/or stored by the media center 350 and presented to the consumer(s) on the television and/or optional other content presentation devices 380 (e.g., other televisions, a stereo receiver, stand-alone speakers, the displays of various types of computing systems, a digital picture frame, etc.) in the home environment 395.

The home environment 395 also includes an example computing system 300 suitable for executing an embodiment of the CM system, as well as one or more optional other local computing systems and/or storage devices 390 with which the computing system 300 can interact via local network 385 (e.g., a wireless or wired/cabled LAN). The computing system includes a CPU 305 or other processor(s), various I/O devices 310, storage 320, and memory 330. The illustrated I/O devices include a display 311, a network connection 312, a computer-readable media drive 313, and other I/O devices 315 (e.g., a keyboard, a mouse, a pointing device, speakers, etc.). In some embodiments the computing system 300 may further interact with one or more external computing systems (not shown), such as via the Internet and/or the World Wide Web, such as to receive additional external content 360b and/or other information or services.

In the illustrated embodiment, the computing system 300 interacts with the media center 350 in a variety of ways (e.g., via a direct connection, as part of local network 385, or as part of another network, not shown), including to receive information about current and/or future television programming-related content 360a and/or other content 360a. In this example, the information received by the computing system 300 includes EPG metadata information for the television programming-related content (e.g., from a cable network operator), and can further include a variety of other types of metadata for the content 360a, whether from the cable network operator or other third-parties (e.g., from various external computing systems, not shown, such as via external content 360b). This received content metadata is then stored in a content metadata database 322 (or other suitable data structure) in the illustrated embodiment for use by the CM system.

An embodiment of the CM system 335 is executing in memory 330. As discussed in greater detail below, the CM system provides information about the available content to one or more users, such as via a GUI using first and second time scales that is displayed on the display device 311 and/or on one or more of the content presentation devices 370 or 380 or other computing systems 390. For example, the CM system may provide some or all of the stored content metadata 322 to the users, and also allow the user to manipulate the content in a variety of ways (e.g., to select content for current presentation, for future recording, etc.). As the user provides instructions related to manipulation of the content, those content manipulation instructions are in the illustrated embodiment stored in a database 324 (or other suitable data structure) on storage 320 for later retrieval and use by the CM system, and at least some such content manipulation instructions may additionally in some embodiments be provided to the media center 350 for use in actually performing the tasks to satisfy the manipulation instructions. In addition, in some embodiments the CM system may also interact with other executing programs in order to provide additional information and/or functionality to the user(s), such as one or more optional executing other programs 339 in memory 330 or instead remote executing programs (not shown) on another computing system.

In the illustrated embodiment, the CM system does not itself present the external content 360a to the user(s), instead interacting with the media center 350 to control the display of the content to the user via the TV and/or one or more of the other content presentation devices. However, in other embodiments the CM system may instead receive some or all of the external content 360a, whether via the media center 350 or instead directly from the source of that content, and if so could directly control the presentation of that content to the user(s) on the display device 311 and/or other content presentation device 370 or 380 or other computing system 390. Conversely, in the illustrated embodiment the computing system 300 and/or media center 350 may have access to additional content, such as external content 360b (e.g., from remote computing systems over the Internet), locally stored other content 360c on storage 320, and/or other locally accessible content (not shown), such as from one or more of the other computing systems/storage devices 390—if so, the computing system 300 may in some embodiments directly present some or all of that content to the user(s), such as on display device 311 (e.g., as part of the CM system GUI) and/or on one or more other content presentation devices 370 or 380 or other computing system 390, while in other embodiments may present some or all of that content to the user(s) by instead interacting with the media center 350 to facilitate the presentation (e.g., by providing the additional content to be presented and/or associated instructions to the media center). As previously noted, the additional content may be content related to the external content 360a but from another source (e.g., additional television-related programming, such as streamed or downloaded over a computer network) and/or multimedia content of other types (e.g., movies and other video information, photos and other images, music and other audio information, presentations, video/teleconferences, videogames, Internet Web pages and other data, etc.).

The functionality of the CM system can be accessed in various ways in different embodiments. For example, some users may have physical access to the computing system 300, and if so can interact with the various I/O devices 310 to provide and/or receive information. Alternatively or additionally, other users can use other client computing devices to remotely access the CM system, such as other local computing systems 390 or instead remotely (e.g., via the Internet and/or the World Wide Web). Such remote users can use software or other functionality provided on the client computing systems (not shown), such as a browser, to interact with the CM system. In other embodiments, users may receive functionality and/or information from the CM system indirectly via interactions with one or more other devices, such as the media center 350, which may directly receive that functionality or information from the CM system before providing it to the users.

Computing system 300 is merely illustrative and is not intended to limit the scope of the present invention. For example, the computing system may instead be comprised of multiple interacting computing systems or devices, and may be connected to other devices that are not illustrated, including through one or more networks such as the Internet or via the World Wide Web ("Web"). More generally, the computing system may comprise any combination of hardware or software that can perform the described techniques, including (without limitation) desktop or other computers, network devices, Internet appliances, PDAs, cordless and other wireless phones, cellphones, devices with walkie-talkie and other push-to-talk capabilities, personal/digital video recorders, pagers, electronic organizers, television-based systems and various other consumer products. In addition, the functionality provided by the illustrated systems may in some embodiments be combined in fewer systems or distributed in additional systems, and one or more of the systems may each have multiple components that each provides a portion of the functionality of that system. Similarly, in some embodiments the functionality of some of the illustrated systems may not be provided and/or other additional functionality may be available.

While various items are illustrated as being stored in memory or on storage while being used, these items or portions of them can be transferred between memory and other storage devices, such as for purposes of memory management and data integrity. Alternatively or additionally, in other embodiments some or all of the software system (or portions of it) may execute in memory on another device and communicate with the illustrated computing system via inter-computer communication. Some or all of the system or data structures (e.g., portions of a database, such as one or more tables or views or portions thereof) used by the system may also be stored (e.g., as software instructions or structured data) on a computer-readable medium, such as a hard disk, a memory, a computer network or other transmission medium, or a portable media article (e.g., a CD, DVD or flash memory device) to be read by an appropriate drive or via an appropriate connection. Some or all of the system and data structures can also be transmitted via generated data signals (e.g., by being encoded in a carrier wave or otherwise included as part of an analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, one or more embodiments may be practiced with other computer system configurations.

FIGS. 2-27 illustrate examples of information and capabilities provided by an embodiment of the CM system. More particularly, features of an example GUI are shown and described, including a variety of information and user-selectable controls in the context of multiple time scales provided in the GUI. While specific layouts and formats are shown in FIGS. 2-37, such specific details are not intended to be limiting or exhaustive.

Figure 2:
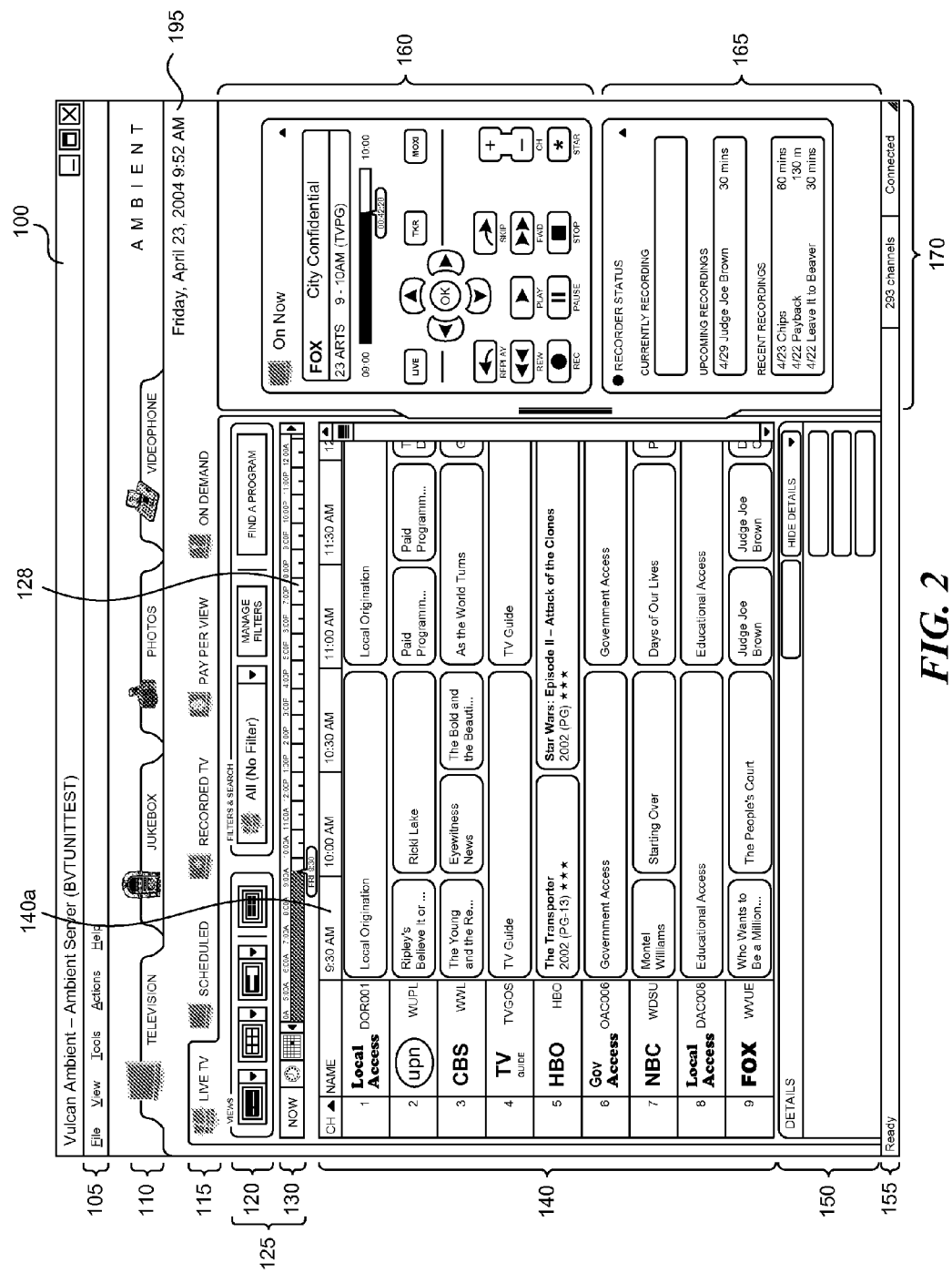

FIG. 2 illustrates a GUI 100 with a variety of displayed information and user-selectable controls. In the current example, the GUI is displaying program listing information for live TV in a view area 140, with the displayed listings initially based on a current time 195. The TV listings in the view area 140 are initially shown in a grid format, with columns of the grid corresponding to successive time units of thirty minutes each and with each row corresponding to a different TV channel that may show one or more TV programs during the displayed time period. The GUI also includes a variety of other areas, including a menu bar 105 with dropdown menus, primary content-type navigation tabs 110, secondary content-type-specific navigation tabs 115, a view control area 125 that includes view and filter controls 120 and time controls 130, a detail area 150, a status bar 155, and a status control sidebar area 170 that includes virtual remote control functionality 160 and a user-focused content summary area 165.

As will be described in further detail below, the view control area 125 also includes a first timebar 128 that corresponds to a relatively long first time period at a first time scale (which is selected based in part using time controls 130) and that may in certain situations display limited information about content, while the view area 140 illustrates detailed information about content for a relatively short second time period at a second time scale. In this example, the first time scale corresponds to approximately 16 hours (with the current first time period being from 8 am to 12 am of the next day, as shown in the first timebar 128), and the second time scale corresponds to approximately 3½ hours (with the current second time period being a first time period subset of 9:30 am to 12:30 pm, as shown in a second timebar 140a rendered at the top of the view area 140). In addition, in this example details about televisions programs shown in the view area 140 include, for example, program title (e.g., "The Transporter"), year of release (e.g., "2002"), and rating information (e.g., "PG-13" and a three-star rating)—various other types of details could similarly be shown, such as information about actors and/or other people associated with the program (e.g., director, producer, etc.), a textual summary of the plot, whether the program is closed captioned and/or broadcast in stereo, whether the program is a repeat, etc. In this example, the first timebar does not display any limited information about any television programs or other content.

Figure 3:
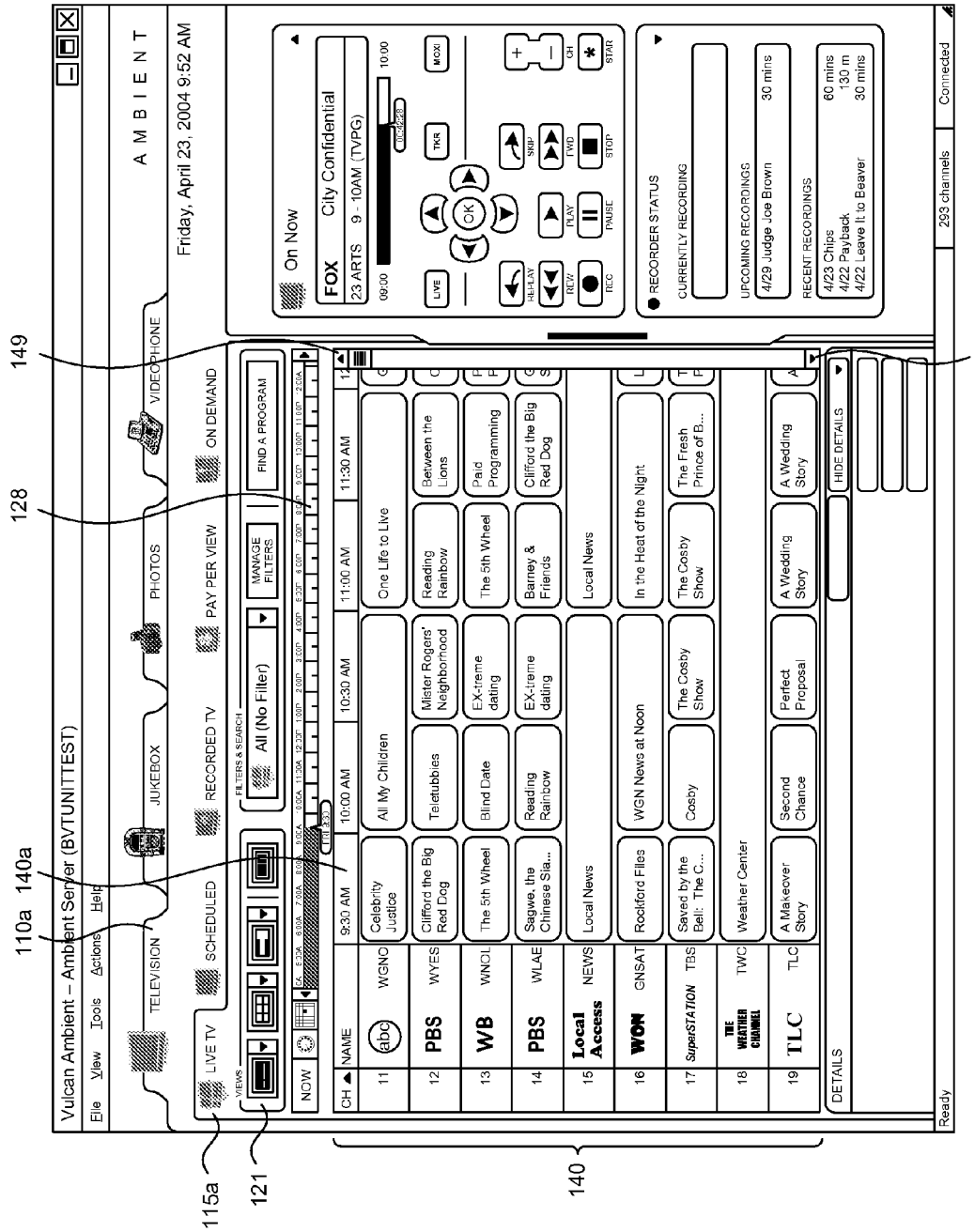

FIG. 3 illustrates a similar view to that shown in FIG. 2, but with additional channels shown in the view area 140. For the sake of simplicity and clarity, the labels for the various components of the GUI 100 are not repeated in FIG. 3 and in the subsequent figures, except where appropriate to provide context or where otherwise helpful to describe the embodiments. In the example of FIG. 3, a user has used a scroll bar 149 to scroll to additional channel listings, although in other embodiments and/or situations the display could instead be changed in other manners. As is illustrated, the primary content-type navigation tab for "Television" 110a continues to be currently selected, the secondary content-type-specific navigation tab for "Live TV" 115a continues to be currently selected, and a "Grid" view control 121 continues to be currently selected.

In a similar manner, FIG. 4 displays program listing information similar to that of FIG. 3, but for a later second time period. In particular, the second timebar rendered at the upper portion of the view area 140 indicates that the second time scale has remained at approximately 3½ hours, but that the current second time period has changed to correspond to times from approximately 11 am to 2 pm—the first time scale and first time period reflected in the first timebar in the view control area have not changed, however. In this example, a user has used a timebar scroll control 136 below the first timebar to change the currently selected time for the second timebar to begin at 11 am, resulting in the program listing information shown in the view area 140 to change to reflect the times for the second timebar—the actual current time 195, however, remains unchanged. In this example embodiment, the timebar scroll control 136 includes a textual display of the currently selected time of "FRI 11:00", corresponding to a change in this example to 11:00 AM later in the same day, and the second time scale of the view area 140 renders a breakdown of time segments in ½ hour increments after 11:00 AM, with the remainder of the view area 140 rendering program listings for each of the broken-down time segments to indicate programs whose presentation times make them available for presentation during the time segment (e.g., based on the programs having start times at the beginning of the time segment). In other embodiments and/or situations, a new time could instead be selected in other manners, such as by manually selecting a specified point on the first timebar (e.g., by clicking a left mouse button while the mouse cursor is above the desired time), or instead by manipulating the second timebar in various ways (e.g., by manually selecting a displayed specified point on the second timebar, by dragging the second timebar so as to select a time that was not previously displayed on the second timebar, etc.). Moreover, in some embodiments times may further be displayed and manipulated in other manners, such as to include a horizontal scroll bar for the view area (e.g., at the bottom of the view area and above the detail area) to allow program listing information at other times to be selected. Modifications using the horizontal scroll bar may not only modify the current second time period for the second timebar, but in at least some embodiments may also affect the first timebar in various ways, such as by causing the first timebar scroll control 136 (or "thumb") to update to reflect the new start time of the second time period, and further in at least some embodiments changes made via the first timebar may conversely cause at least portions of the view area to be updated (e.g., the second time period for the second timebar and/or the horizontal scroll bar).

Figure 4:
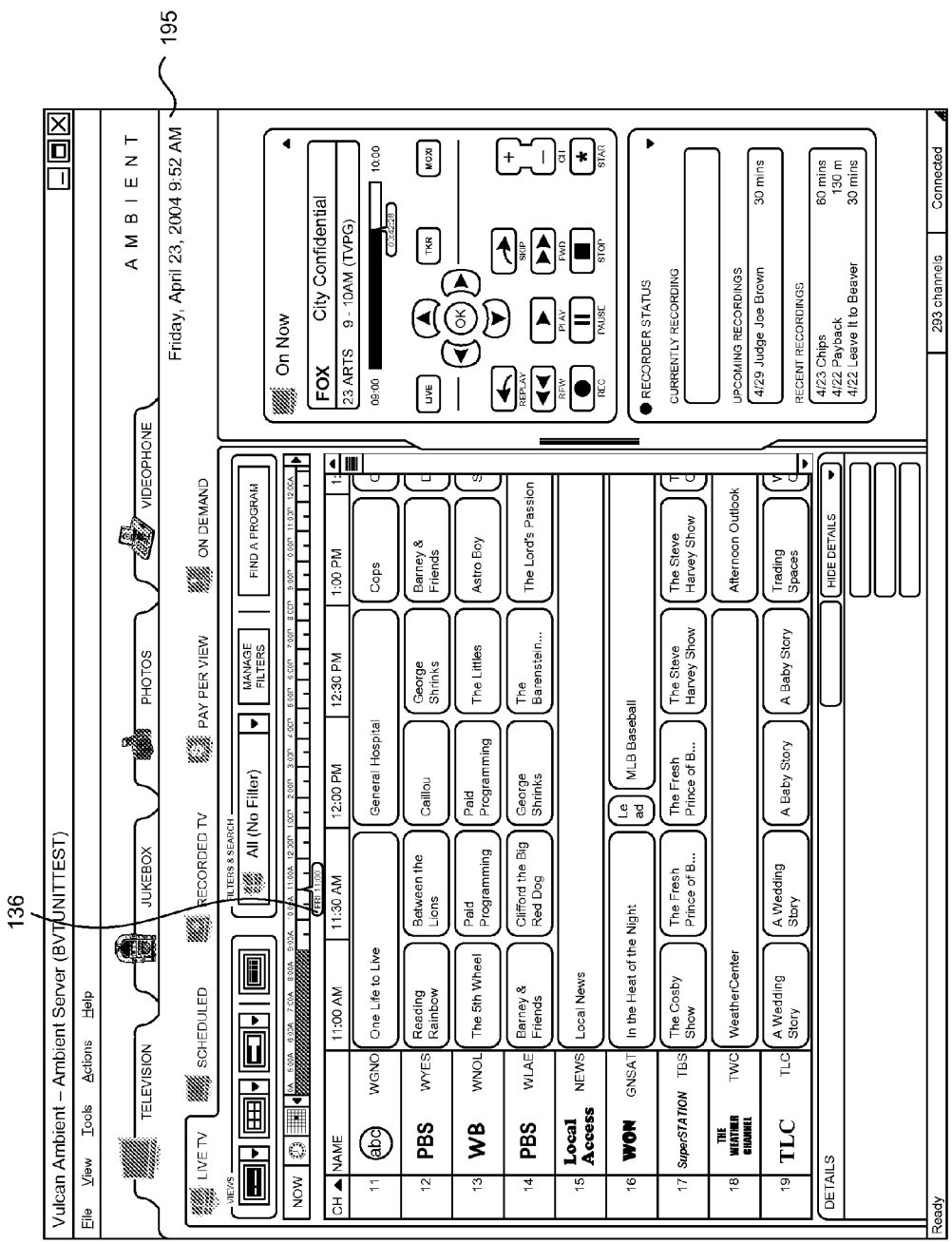
Figure 5:
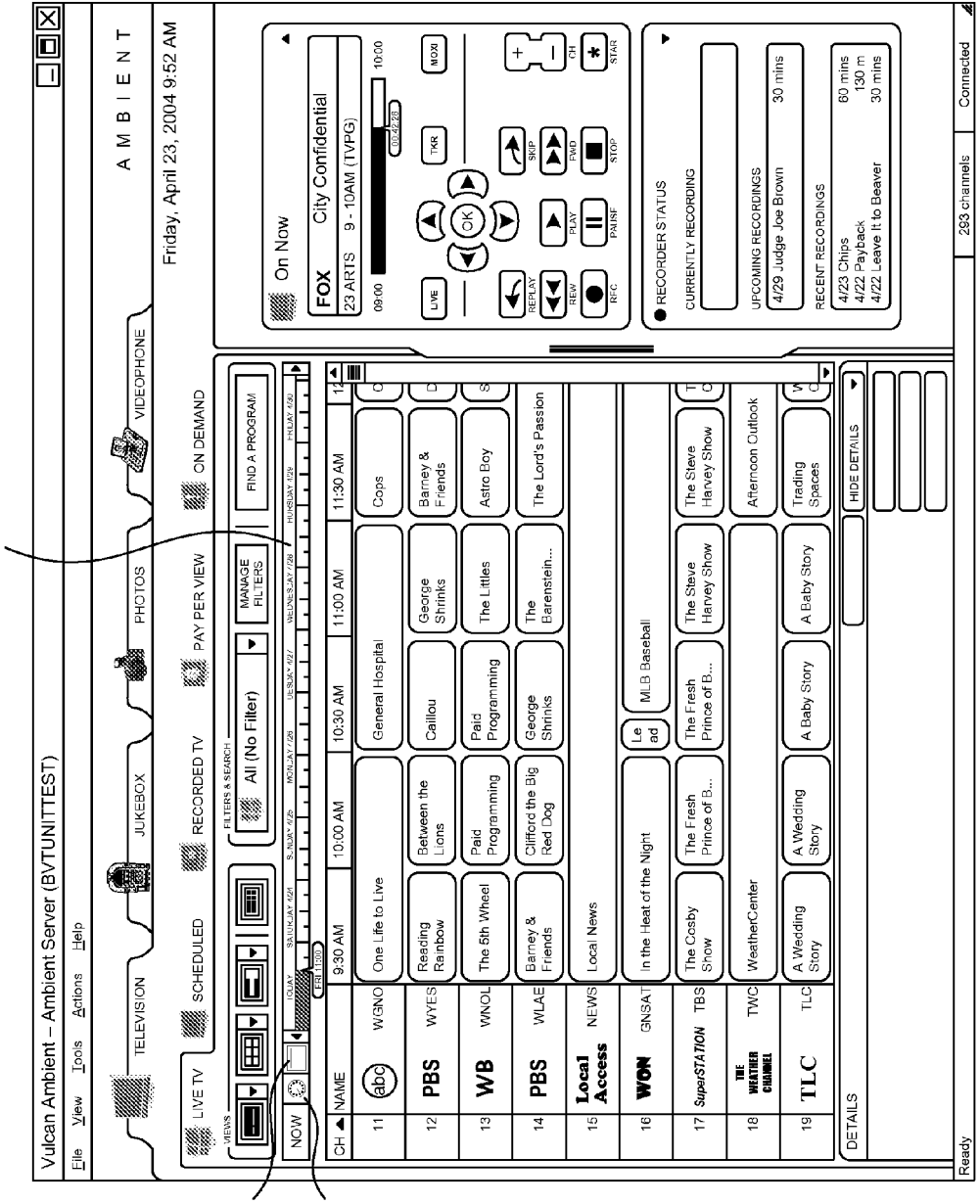

In FIGS. 2-4, the first timebar in the view control area has been displayed using a linear hour-based representation for a multi-hour time first time scale, with the displayed units on the first timebar corresponding to hours and fractions of hours. This hour-based time scale and view corresponds to time control 132 shown in FIG. 5, which in this example embodiment has an icon that includes a representation of a clock. However, the first timebar display in FIG. 5 has been updated to reflect user selection of a day-based time control 133, with the representation of the first timebar now showing successive days and fractions of days as part of a new multi-day first time scale. Nonetheless, the currently selected time for the TV listing display of 11:00 AM on Friday has not changed, and thus the second timebar of the view area 140 continues to show program listings for the same second time period at the same second time scale. While not illustrated here, the GUI could similarly include controls to display the first timebar using other first time scales, such as weekly or monthly.

Figure 6:
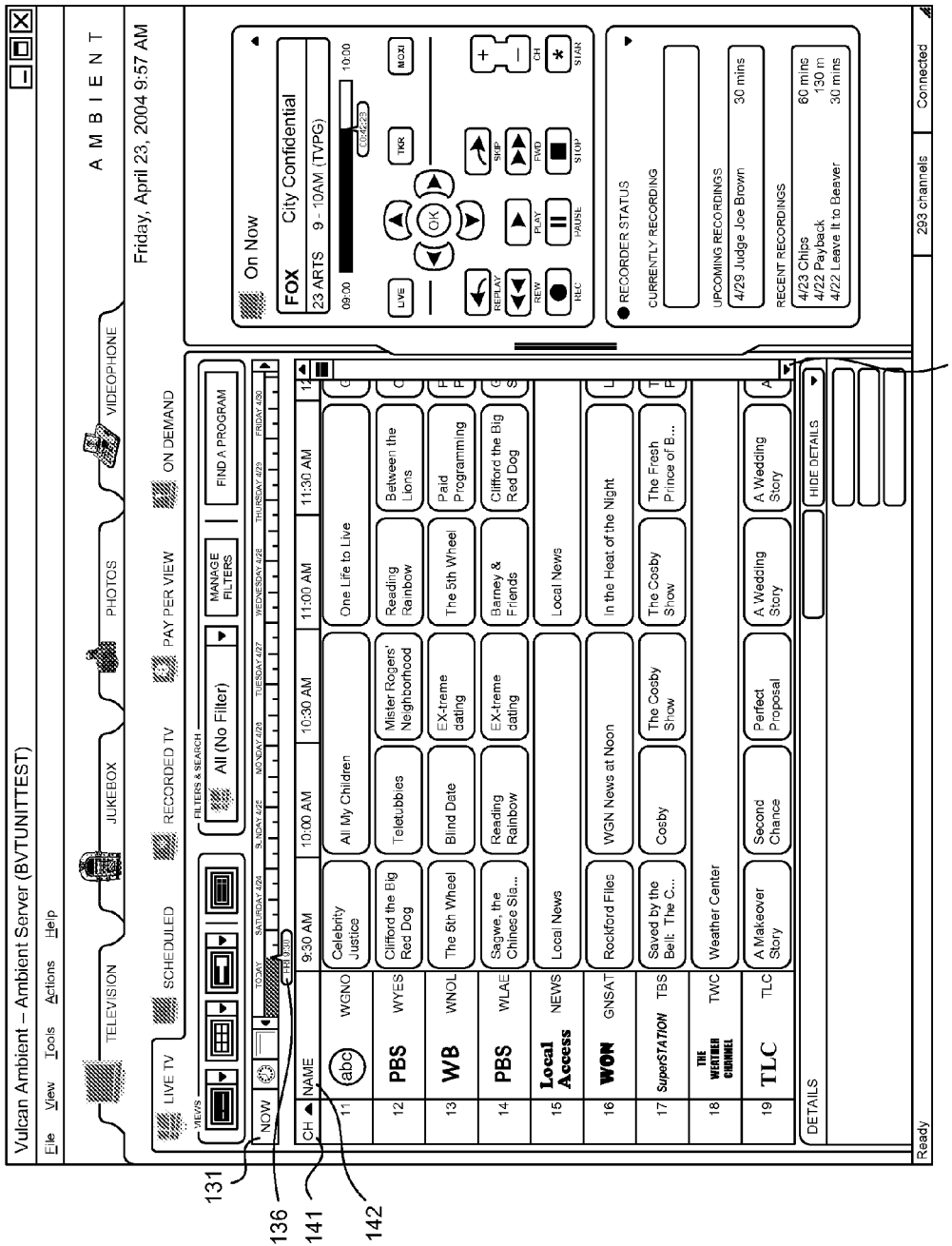

FIG. 6 next corresponds to a similar display after the "Now" time control 131 was selected, causing the currently selected time in the second timebar of the view area 140 to revert to a time corresponding to the current time 195, with the newly selected current time in this example being the beginning of the half-hour segment of time to which the current time belongs (e.g., the half-hour period beginning at 9:30 AM, as shown by the textual display of the timebar scroll control 136, for the current time 195 of 9:57 AM). The second time period of the second time bar now begins at 9:30 am, and the corresponding program listings in the view area 140 now provide the 9:30 AM and onward program listings corresponding to half-hour segments for the second time period.

Figure 8:
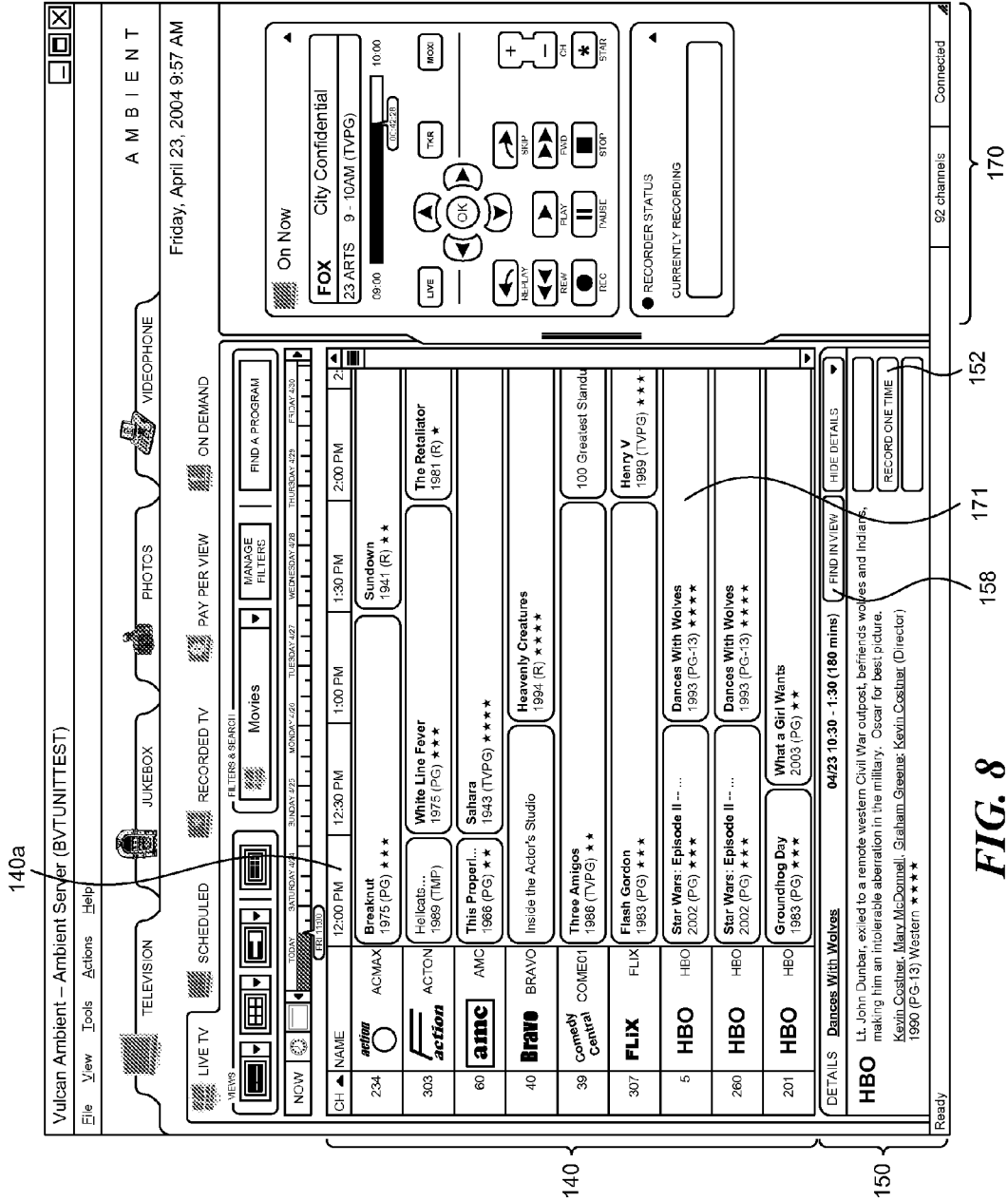

As previously described above with reference to FIG. 4, the user can select (such as by clicking or mouse-over) any time indicated in the first timebar for a specific day, and then the second time period shown in the second timebar and the corresponding program listings in the view area 140 are updated to present the program listings for the selected time and afterwards. Moreover, the scroll bar 149 can be used to scroll up or down in the grid display in the view area 140 for the selected time, so as to view the various television program listings for each particular television channel. Also, the grid display in the view area 140 can be modified in various other ways, such as by arranging the channels in descending order (not shown) by clicking on a "CH" channel number column heading control 141 in FIG. 6. As is shown, a small triangle is currently displayed in the column heading to indicate that the current display reflects an ascending order that is sorted by channel number, but selection of the control 141 would cause the small triangle to change to point down and would cause the channels to be sorted in descending order by channel number (e.g., by first displaying a largest available channel 998, followed by a next available channel 945, etc.). The same information can be sorted in ascending or descending alphabetical order based on the displayed name of the channel, such as by selecting a "NAME" column heading control 142 in FIG. 6 (e.g., as shown in FIG. 8). While not illustrated here, in other embodiments additional similar types of controls and sorting could be made available, such as by sorting channels alphabetically based on the names of current programs being shown at a selected time (e.g., by clicking on a time-segment column heading in the grid corresponding to that time).

Figure 7:
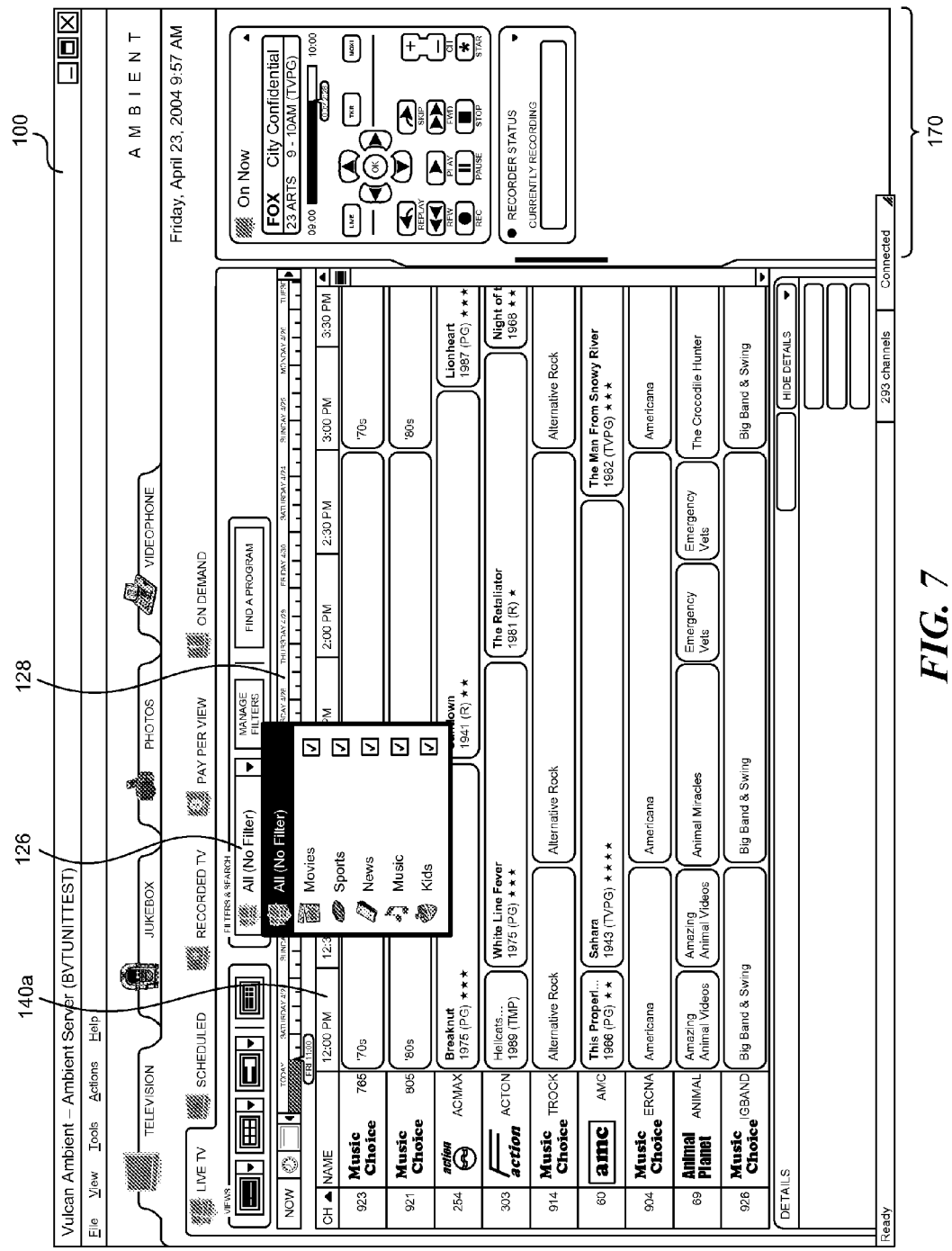

In addition, different programs can be listed using different colors, display patterns (e.g., shading) and/or amounts of highlighting to provide various types of information about the programs, and in at least some embodiments the shapes of program indications may further change for various purposes, such as to indicate various program-related attributes. In particular, such differing visual representations can be used to illustrate different types of TV programs (and/or differences in and/or between different types of content) in some embodiments. FIG. 7 illustrates examples of differing types of visual representations that may be mapped to different types of programs (e.g., by default) via a dropdown menu that shows several predefined types of filters, which in this example was displayed based on user selection of a filter control button 126. For example, the color red can be assigned to programs of the type "movie," the color green can be assigned to programs of the type "sports," and programs of type "news," "music," or "kids" may not have colors assigned to them. Furthermore, each row may in some embodiments be displayed using a different visual representation than the preceding row to assist in readability.

In addition, FIG. 7 also illustrates that the second timebar 140a has been modified so that the second time scale now corresponds to just over 4 hours (with a current second time period of 12 pm to past 4 pm), such as automatically based on an amount of space to display program detail information of interest for current programs being smaller than an amount of space for programs illustrated in prior figures. Similarly, the first timebar 128 has also been modified so that the first time scale now is longer (with a current first time period of 7 days), such as automatically based on the change to the second time scale and/or for other reasons. In addition, the first and/or second time scales may also be automatically modified in other situations in at least some embodiments, such as if the view area 140 decreases (e.g., due to GUI window 100 being resized to a smaller size, or due to another window area such as the status control sidebar area 170 being expanded) and the second time scale are second timebar are automatically changed so that programs beginning at 3:30 PM, 4:00 PM and 4:30 PM are no longer visible, or if the view area 140 increases. Moreover, with changes to the second time period displayed in the second timebar, the channels that are displayed may again be updated to reflect only those channels that include programs matching the current filter during the currently displayed second time period.

Using the filter control button 126, which in the illustrated embodiment causes a dropdown list to be displayed to allow the user to select one or more currently defined filters, the user can select the "movies" filter, for example, which would limit the channels (not shown) displayed in the view area 140 to those that are showing at least one movie during the currently displayed second period of time for the second timebar. For example, the status control sidebar area 170 of FIG. 8 reflects that 92 channels (for example) match the "movies" filter when selected, as contrasted with 293 channels (for example) that were available when no filter was selected in FIG. 7.

FIG. 8 further illustrates that a particular one of the displayed program listings in the view area 140 has been selected, which in this example is the "Dances With Wolves" program beginning at 1:00 PM on channel 5 HBO—in the example embodiment, the selection of and the status of the program as being the currently selected program is shown by a suitably colored line (e.g., green) around the outside of the program listing in the view area 140 (e.g., a selection rectangle 171 or other suitable navigation or selection element). Moreover, in at least some embodiments a separate visual representation (e.g., a dashed line) may be shown for a program that currently is a "focus" of attention, such as based on a current cursor of focus location, which may be moved independently of the currently selected program. More generally, in at least some embodiments the "focus" may be moved to any interactive screen elements, while the "selector" visual representation may be used only with a selected piece of content. In some situations, a single piece of content may be both the focus and the currently selected content piece, such as if a piece of content is specified as the focus and then selected. In addition, once the program has been selected, the detail area 150 is updated to display various additional detail metadata information about the selected program, such as a description of the program, information about cast and crew, information about one or more genres (e.g., Western) of the program, information about one or more ratings of the program, etc. In addition, a control 152 has been enabled to allow a selection to be made to schedule the program to be recorded. While not shown here, a variety of additional types of information and/or functionality could also be shown in the detail area, such as data obtained from third-party sources (e.g., a trailer for the movie, or extra content such as deleted scenes) and/or the ability to select additional services (e.g., providing additional content), such as for a fee.

A different filter can similarly be selected to limit the program listings in the view area 140, such as the "Sports" filter or other available filters, although the results of such a selection are not illustrated here. Such selection of a different filter may cause a variety of changes, such as in some embodiments to cause the status control sidebar area 170 to indicate a different number of channels having programs that match the filter and/or to provide such information in another manner (e.g., near the filter selection control and/or the time controls 130), and to update the view area 140 to display only channels having programs that match the filter during the second time period and/or to display only the matching program listings during the second time period. If a currently selected program is no longer shown in the updated view area 140, (e.g., to not display the "Dances With Wolves" program when a "Sports" filter is selected since the program is not content of type "Sports"), the detail area will nonetheless continue to show information pertaining to that currently selected program in at least some embodiments. In addition, the various previously discussed controls for altering the display continue to be available when showing a filtered view of the TV program. For example, filtered sports programs can be sorted in ascending channel number order, such as by selecting the "CH" column heading to sort the channels that offer sports programming.

As with non-filtered views, the information about filtered sports programs (or any other filtered view) may be modified by the user in various ways. For example, a new current selected time may be chosen by selection within the first timebar, such as by changing the current selected time to 12:00 PM noon on Sunday, and with the second time period displayed for the second timebar changed to show sports program listings on 12:00 PM noon onward on Sunday for the filtered channels that offer sports programming during that second time period. As previously discussed, only the channels that have programs matching the current filter during the currently displayed second time period will be shown in the view area 140 in at least some embodiments, and thus the set of channels that are displayed in the view area 140 may be changed based on changes to the second time period, since some channels may not offer sports programming during a particular second time period. Moreover, the current selected time may also be changed in at least some embodiments and situations by user selection of a "Find In View" control 158, such as when the currently selected program "Dances With Wolves" is not currently visible in the current program display of the view area 140, as selection of the control causes the second time period and corresponding current program display in the view area 140 to be adjusted so that the currently selected program is displayed, including changing the currently selected time as needed, even though the program does not match the current "Sports" filter. In addition, if a currently selected predefined or custom filter does not have a distinct associated color or other visual representation (e.g., for the "News" filter), the programs displayed in the view area 140 may in some embodiments be shown with their default colors but with the programs that match the current filter being displayed using highlighting so as to distinguish them from other programs displayed (or by similarly dimming or otherwise modifying those other programs).

In addition, in at least some embodiments users may each create one or more custom filters that can then be applied to restrict the TV programs that are displayed. For example, creation of such custom filters may include selection of one or more user-selectable filter criteria and specification of corresponding matching values for the criteria, such as to select one or more program genres, people in the cast or crew, specific words in the title and/or description, specific ratings, programs that appear on specific channels, programs that are not repeats, programs that are in HDTV format, programs that have specified audio-visual options, programs that are scheduled for recording, etc. As one specific example, a user may create a custom filter for programs in the "Science Fiction" genre and with the word "Star" in the title. For the sake of brevity, these example filter customization features are not shown or described in detail herein. Instead, the reader is requested to refer to the parent provisional patent application, if desired, for additional information, such as with respect to FIGS. 1R-1Y and corresponding text. After one or more custom filters are created, an updated dropdown menu (not shown) can be generated for the filter control 126, with the new custom filter(s) now present in the dropdown list as available filters that can be selected and applied. The view area 140 would then, after the new custom filter is selected, display results in a manner to that previously discussed with respect to predefined filters—for example, if there are no programs during the currently displayed second time period that match the filter, the current view area 140 may in some embodiments be displayed as blank, while in other embodiments the user may be presented with a warning or other information so that they understand why the view area is blank. In addition, in at least some embodiments predefined and/or custom user-defined filters may be selected and modified in various ways, such as to change criteria and/or to rename the filter.

Figure 9:
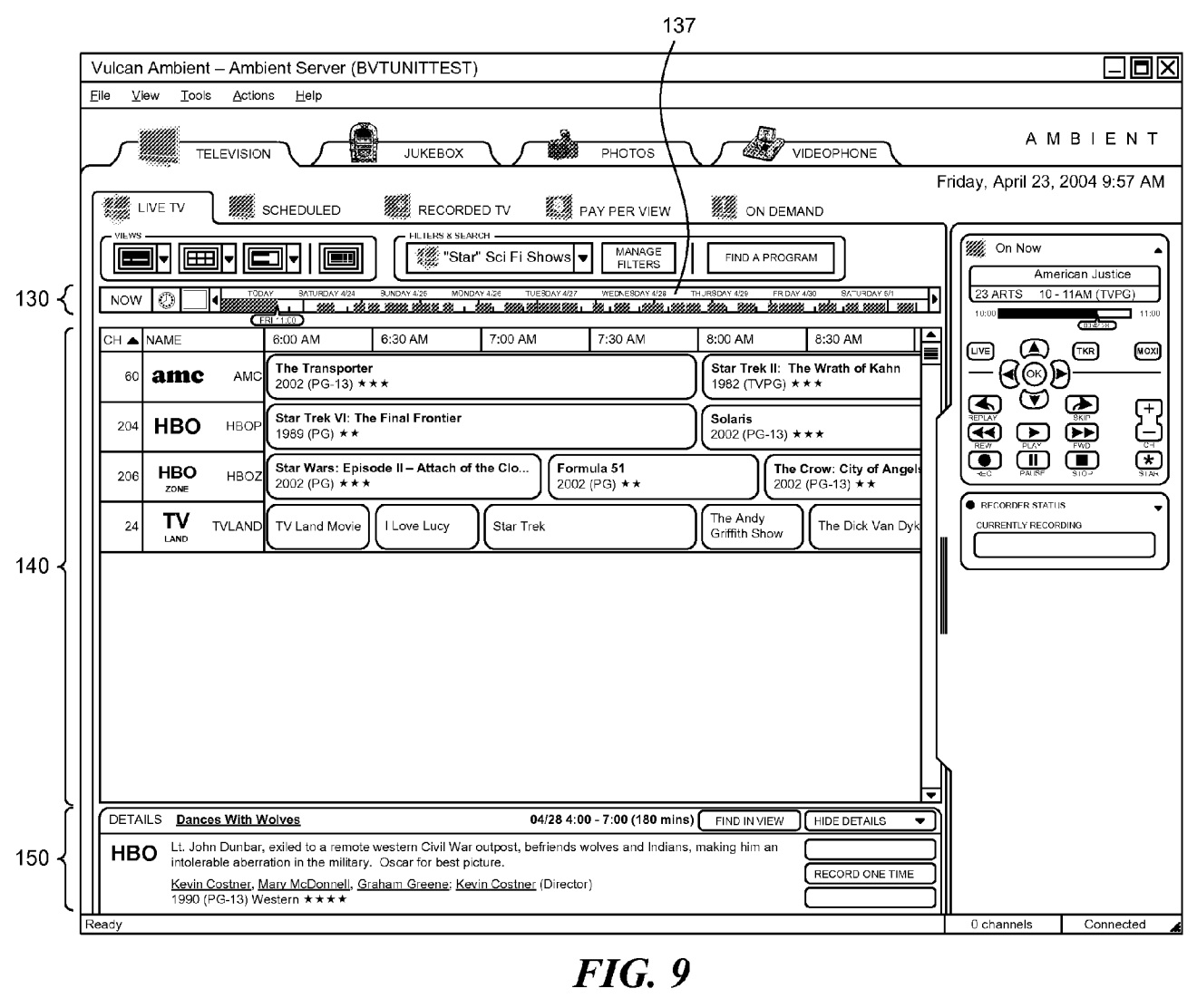

FIG. 9 illustrates one example of how additional information may be provided to users in the first timebar 128 when a filter is being applied, with the first timebar in this example embodiment including small colored (e.g., red) graphical indications 137 to identify times during which programs matching the current filter occur. This allows a user to easily see times at which matching programs occur that do not correspond to the current program display for the second time period, as well as to select one of these times (such as by directly clicking one of the indicators 137) to see details about the matching programs at that time in the view area 140 and/or the detail area 150. Thus, FIG. 9 corresponds to the prior display after a new time has been selected, such as by selecting the time of 6 am on Sunday based on the first timebar having an indicator showing that one or more programs at that time match the current filter. The resulting updated view area 140 display shows that four channels have programs that match the applied custom filter during a corresponding second time period beginning at 6 am on Sunday.

Figure 10:
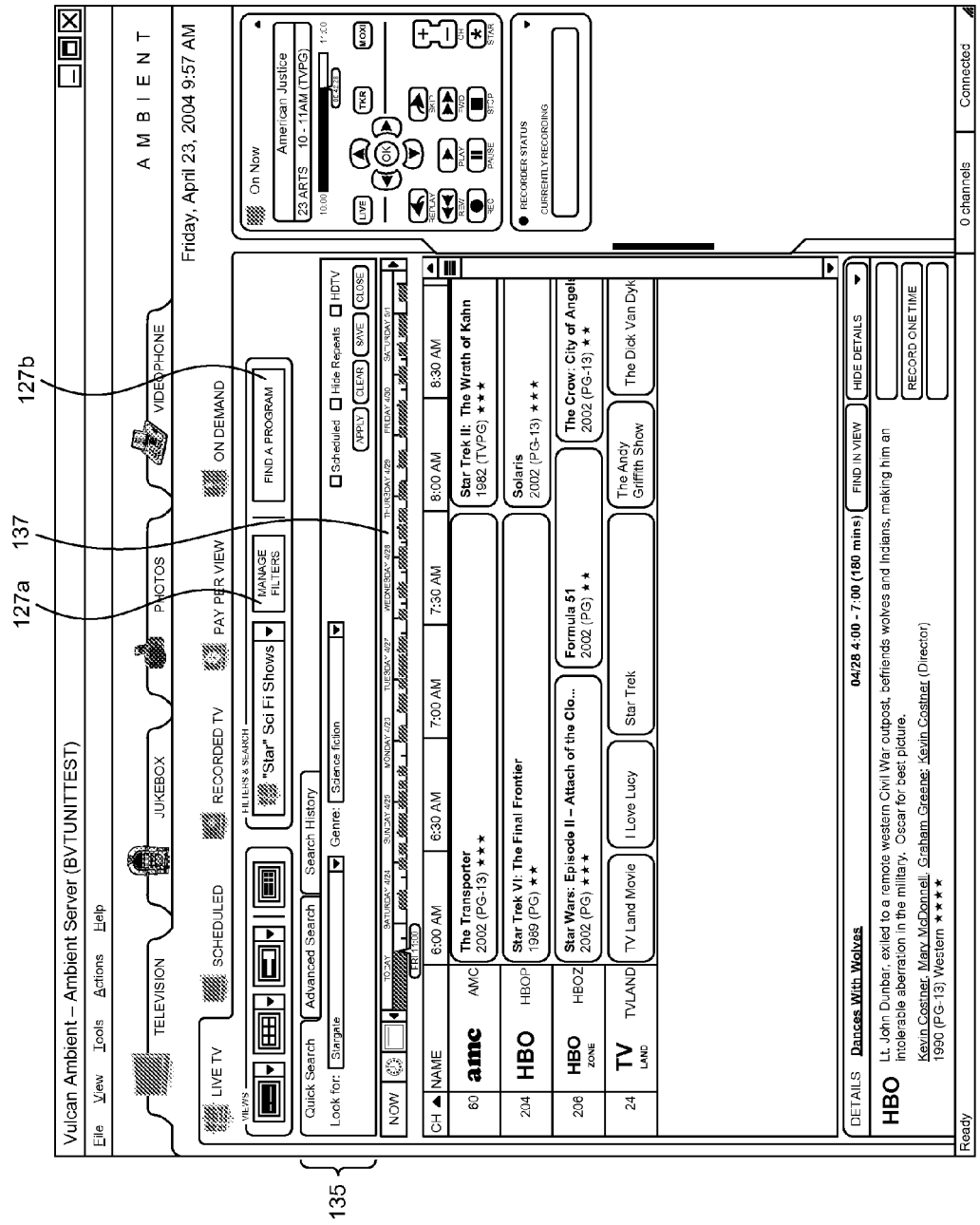

FIG. 10 next illustrates the results after the user has selected the "Find A Program" search control 127b to initiate a search for programs matching specified criteria. In particular, in this example an additional collapsible search area 135 is displayed in response that allows a user to specify various search criteria, with a "Quick Search" capability being selected by default. The Quick Search capability allows the user to specify one or more terms to search for, one or more genres to search for, whether to limit the search to programs that have been scheduled to be recorded, whether to exclude or hide programs that are repeats of previously shown programs, whether to limit the search to programs that are in high-definition TV ("HDTV") format, etc. In this example, the user has selected to look for programs that include the term "Stargate" in the "Science Fiction" genre. FIG. 10 also illustrates an additional "Manage Filters" control 127a, such as to provide a pop-up filter management window.

After the user selects the "Apply" control in the search area 135 to perform the search specified in FIG. 10, the results of the search may be displayed in the view area 140 (not shown). For example, the initial results may not include any programs at the currently displayed time period, and thus the view area 140 may be initially blank for the currently displayed time period. However, the first timebar may similarly be used to provide graphical indicators 137 at times at which any programs that satisfy the search occur, and if a new time is selected from the first timebar (such as by clicking one of the indicators 137 or by other using other functionality of the time controls 130), the view area 140 can be updated to display channels having programs matching the specified search at the selected new time. After the user next selects the "Save" control in the search area 135, the user is allowed to save the previously specified search as a new custom filter. For instance, in this example a new pop-up window (not shown) can be displayed to the user to allow specification of a name for the new custom filter, which may subsequently be included in an updated dropdown menu (not shown) for the filter control 126 as an available filter that can be selected and applied.

Figure 11:
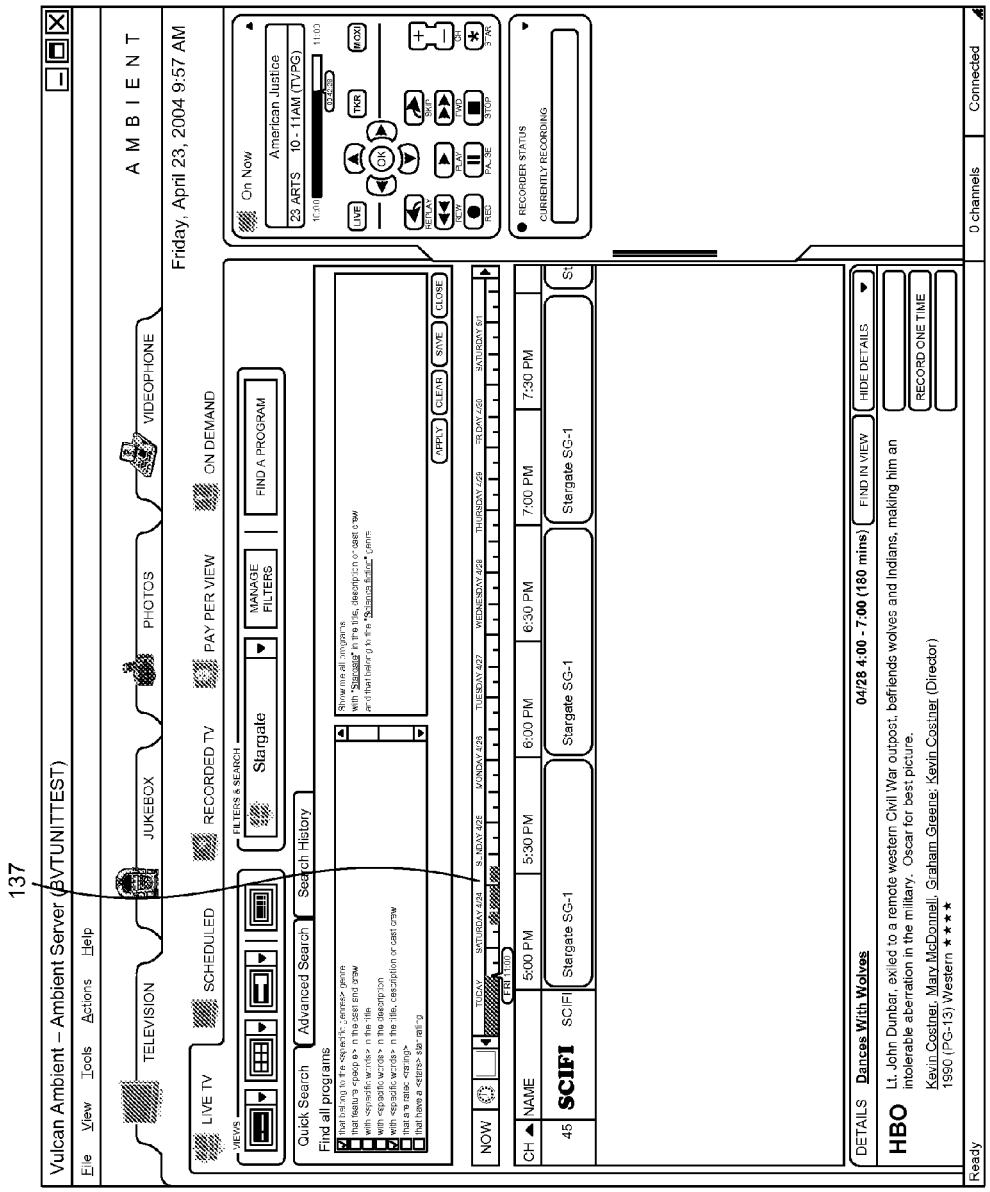

After saving the previously specified search as a new custom filter, the user then selects the "Advanced Search" tab in the search area 135, and FIG. 11 displays the results of that selection—in other embodiments, the "Advanced Search" tab would similarly display such information even if the previously specified search is not saved, such as based on applying a filter, doing a quick search, applying a search from the search history, etc. In particular, in the illustrated embodiment the search area is modified to allow the user to select one or more of a variety of search criteria in a manner similar to that previously discussed with respect to filter creation. In this example, the criteria selections in the search windows are initially set to correspond to the previously specified search, although those selections can be modified or removed by the user. The user can also select the "Search History" tab to display information about the previously applied searches (not shown), such as with a list of entries that are user-selectable such that the user can select one of the previous searches and then use the "Apply" control to again apply that search for the currently selected time—in some embodiments such previous searches may include only searches performed during use of the current instantiation of the GUI, while in other embodiments such state information may be saved from past executions of the CM system (e.g., for all past searches, a specified number of past searches, for user-indicated searches), and may further in at least some embodiments be saved and presented in a user-specific manner. For example, in this illustrated embodiment the user has selected the previously specified search from the search history list corresponding to programs that include the term "Stargate" in the "Science Fiction" genre, with the results of the specified search being displayed in the view area 140 for the current second time period, and with the first timebar providing limited information for programs that match the current search during the first time period (e.g., graphical indicators to indicate presence of such programs). When the user is finished, he/she can next select the "Clear" control of FIG. 11 to clear the currently specified filter/search parameters, and then select the "Close" control to hide the search area 135.

Figure 12:
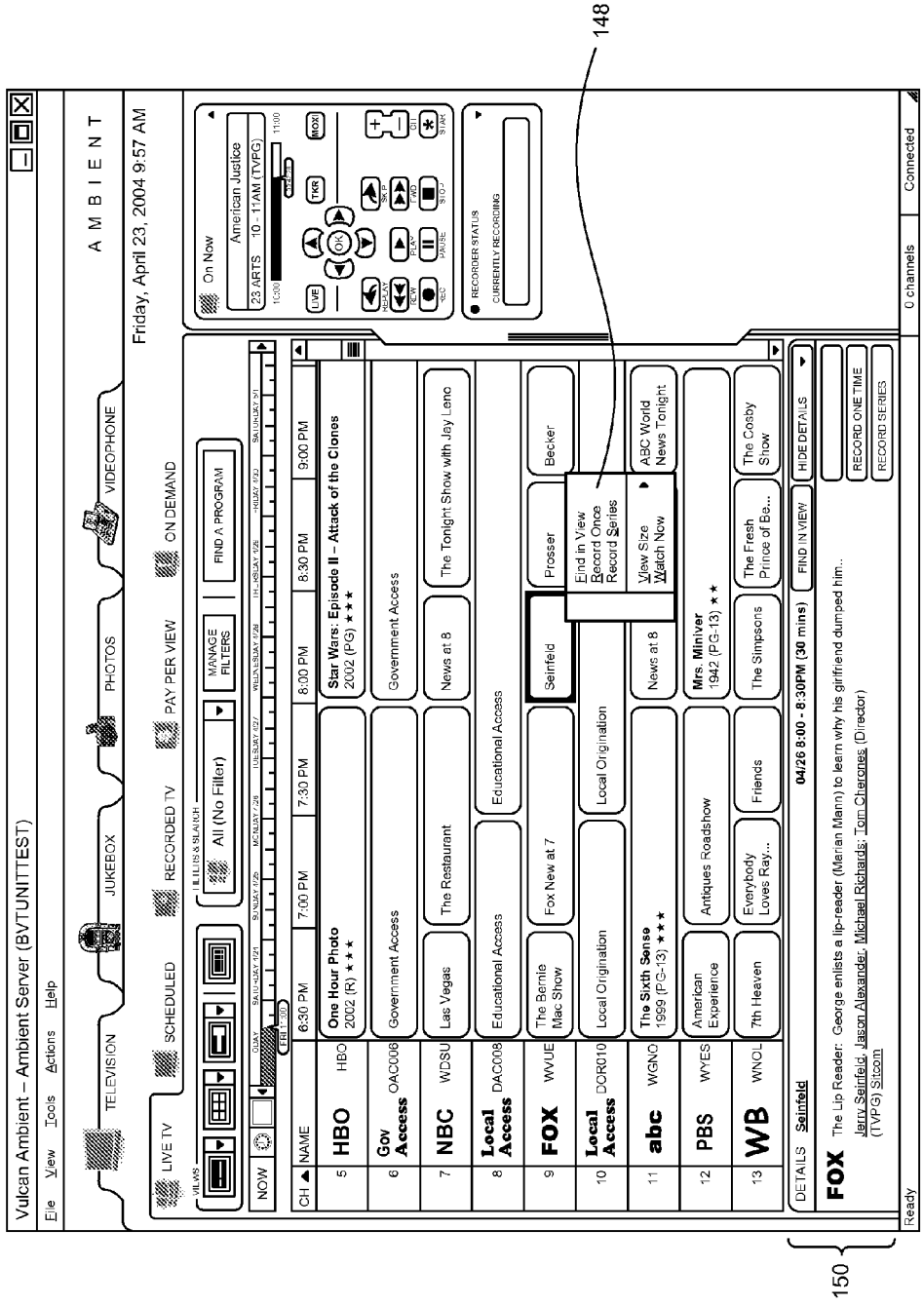

If the user selects a new displayed program, which in the example of FIG. 12 is the "Seinfeld" program episode beginning at 8:00 PM on channel 9 FOX, the detail area 150 is modified to reflect the newly selected program. In addition, in the illustrated embodiment, the user further selects the newly selected program in such a manner as to display a pop-up menu 148 that provides additional functionality with respect to the newly selected program (e.g., by right-clicking on the displayed listing for the program). In this example embodiment, the pop-up menu includes functionality to allow the user to record this episode ("Record Once"), to record multiple episodes of this program ("Record Series"), as well as to perform various other functions.

Figure 13:
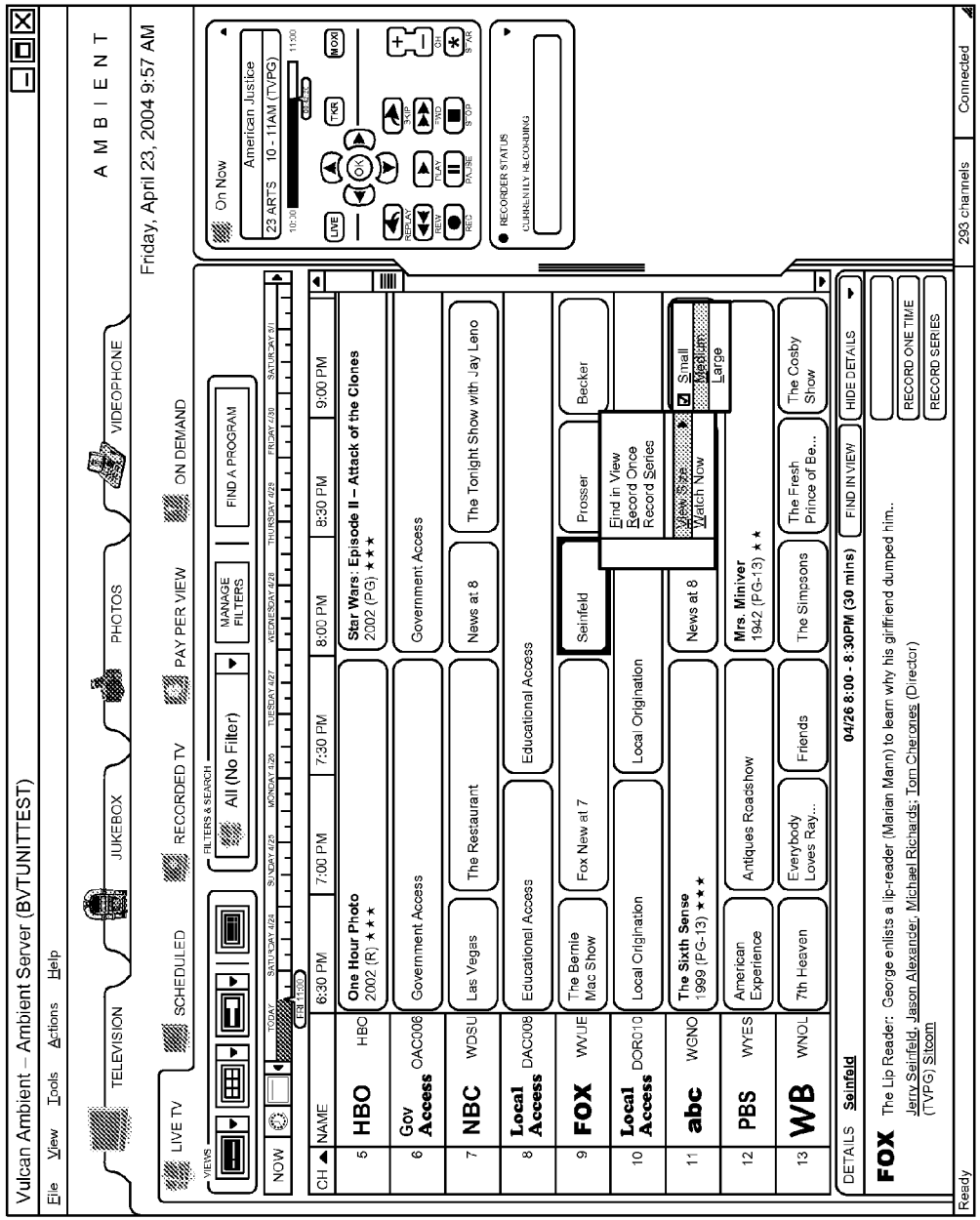

In particular, one of the additional types of functionality available via the pop-up menu 148 is to change the size at which the information in the view area 140 is displayed, and as is shown in FIG. 13, the user in this example is able to select to change the current display size from "Small" to "Medium" or to "Large." If the "Medium" or "Large" selections are made, the view area 140 would be modified to show additional details (e.g., an abbreviated narrative or episode title) about each of programs that are displayed (e.g., in larger "cells" containing the program information), resulting in less programs being shown due to the larger size of the display information. The resultant size of the cells due to the resizing may further in some embodiments result in the first and/or second time periods being automatically changed and/or the first and/or second time scales being changed.

Figure 14:
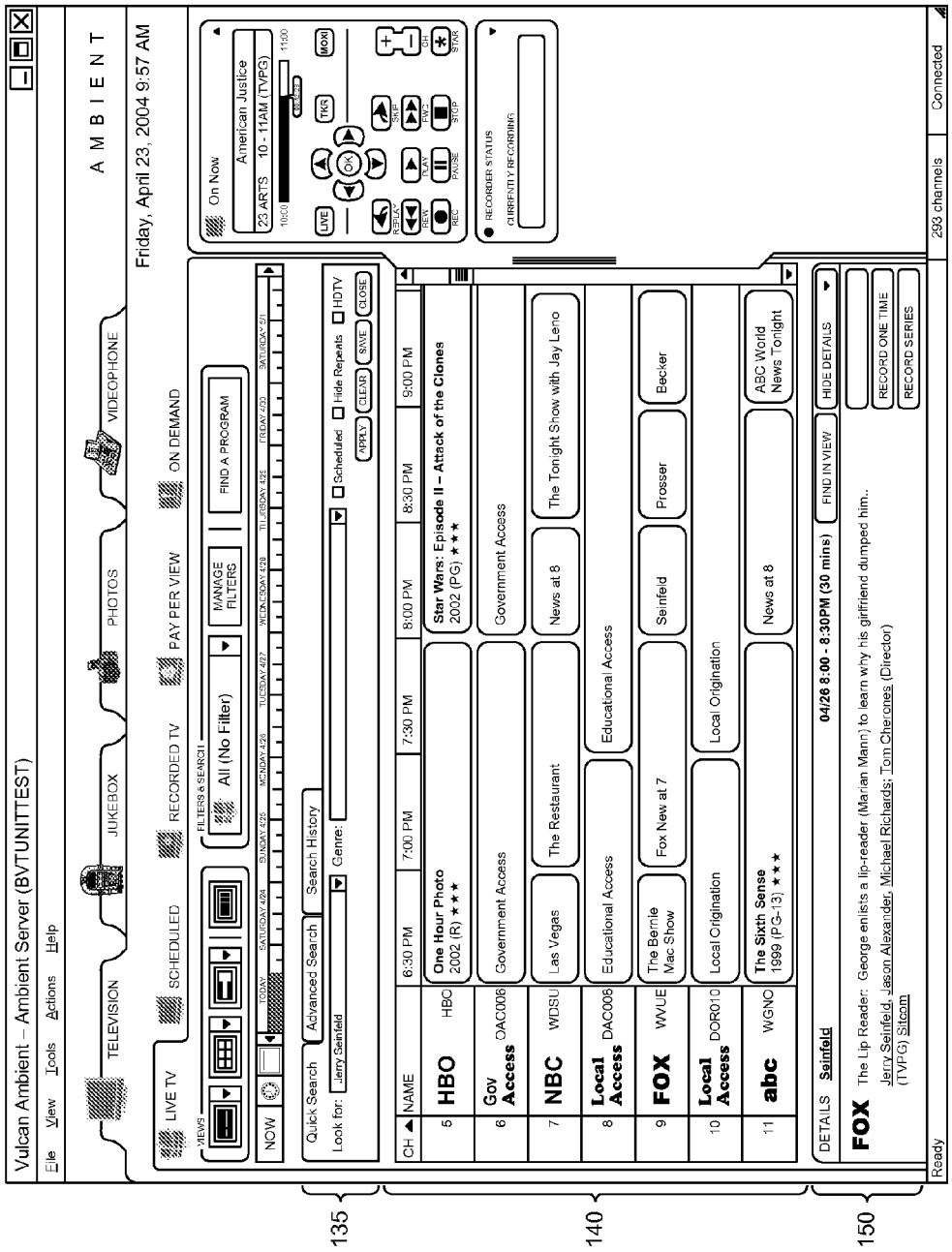

FIG. 14 then shows results after the user has selected the user-selectable information of the name of the actor "Jerry Seinfeld" in the detail area 150. In particular, performing that selection in the example embodiment causes the search area 135 to be displayed and to have the user-selected information added to the portion of the search corresponding to search terms. After applying the new search (e.g., by selecting the "Apply" control in the search area), the results of the new search would be shown in the view area 140, and limited information for any matching programs would be added to the first timebar. Alternatively or additionally in FIG. 14, the user can select the user-selectable genre information of "Sitcom" in the detail area 150, causing the genre portion of the search area 135 to be populated with the data "Sitcom." The user in this example may further select the "Hide Repeats" search criteria in the search area 135 and then apply the new search, with the results in the view area 140 having repeated listings hidden (not shown). The user can also display the current search history after the prior search has been applied, such as based on a user subsequently selecting the "Search History" control tab of the search area 135. Regardless of the search or sorting mechanism used, the GUI can display information using an appropriate first time scale and appropriate second time scale that are correlated to results of the searching and sorting.

Figure 15:
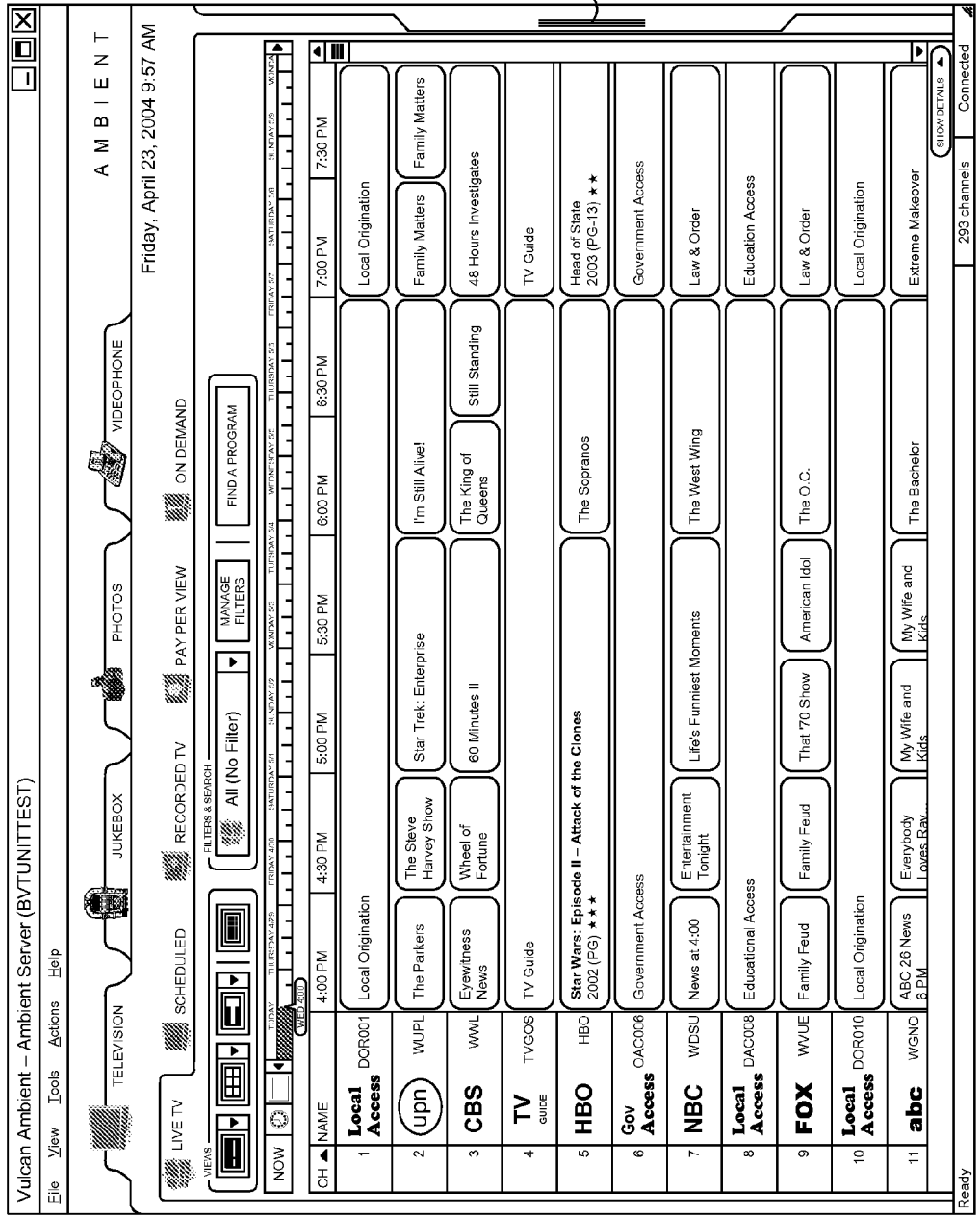

FIG. 15 shows an embodiment after the user has closed the search area 135 (e.g., by selecting the "Close" control in that area), has closed the sidebar status control area 170 (e.g., by using a vertical control bar 173 in the sidebar control area 170 that is just to the right of channels 8 and 9 in FIG. 15), and has closed the detail area 150 by selecting the "Hide Details" control in the detail area 150. Thus, after performing these closures, most of the GUI 100 is devoted to displaying program listings in the view area 140, with the first and second timebars rendered accordingly (e.g., by automatically selecting appropriate first and second time scales and first and second time periods).

Figure 16:
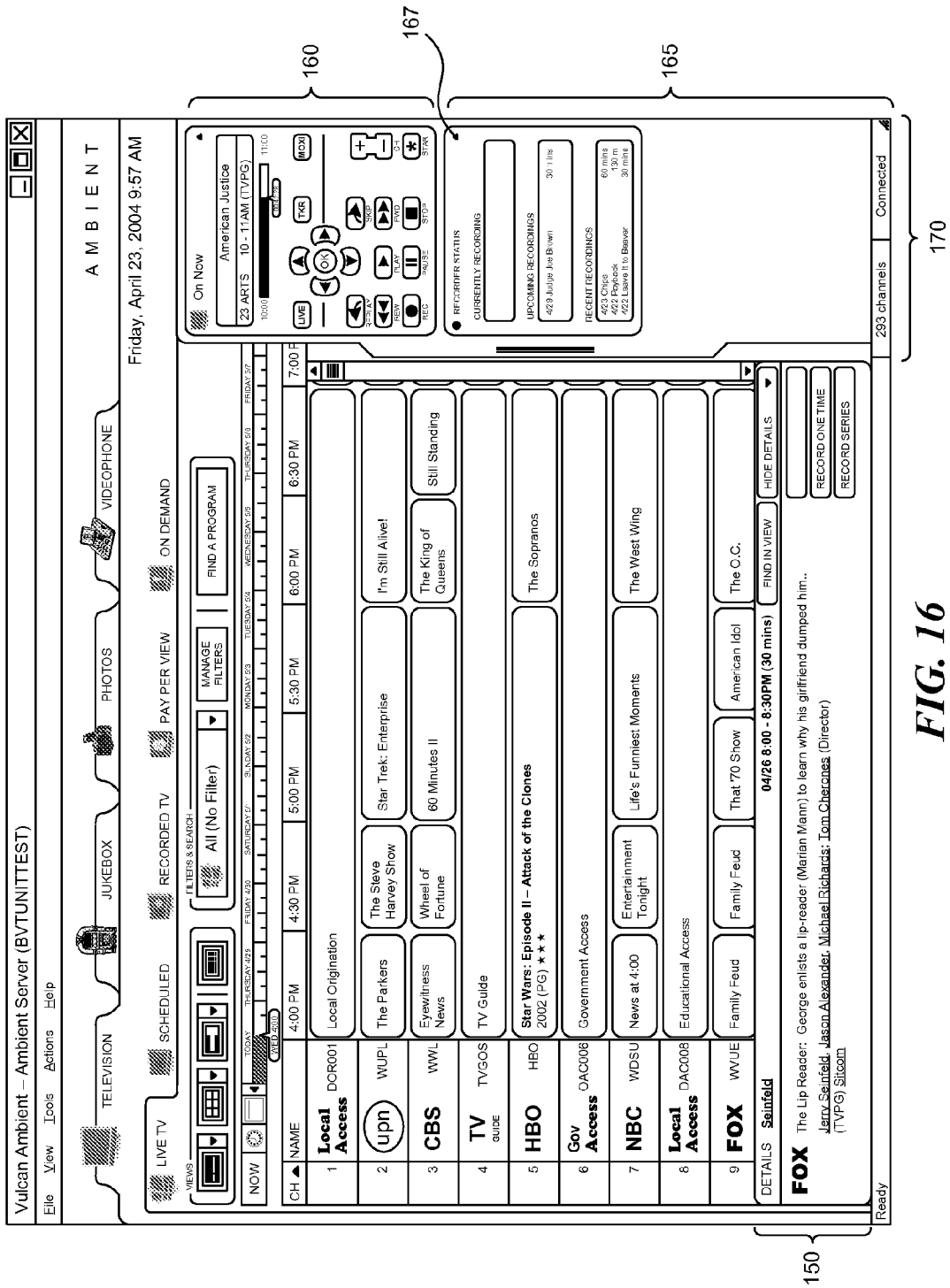

FIG. 16 then shows the results of re-displaying the detail area 150 and the sidebar status control area 170, with the lower information area 165 of the sidebar status control area 170 shown in expanded view (e.g., by selecting an expand/collapse control for that area 165, which in this example embodiment is an up/down triangle arrow icon 167 in the upper right corner of that area 165). In this example embodiment, the information area 165 includes information about the current status of selected content, including content being currently recorded (if any), recently recorded programs, and upcoming scheduled recordings. In some embodiments, some or all such content may be user-selectable from the area 165, such as to allow the user to specify to play previously recorded content. The upper area 160 and/or the lower area 165 of the sidebar status control area 170 can be expanded or collapsed as desired by the user. In addition, in some embodiments the first timebar may be further modified to reflect information in the sidebar status control area 170 (not shown), such as to provide visual indicators of upcoming times at which some (e.g., a selected one) or all of scheduled recordings in the information area 165 will occur.

Figure 17:
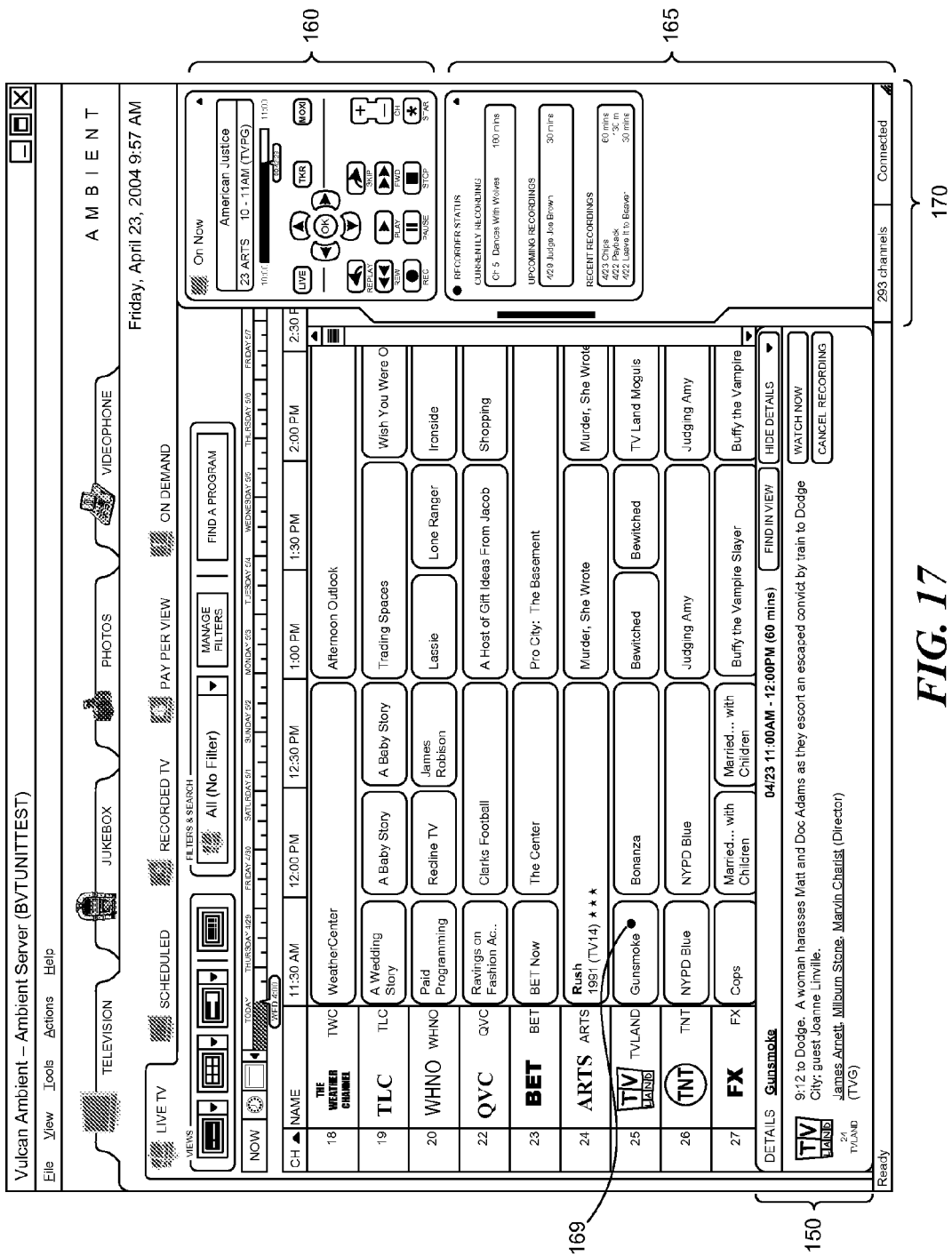

In FIG. 17, the program that is currently on channel 24 TVLAND entitled "Gunsmoke" has been selected to be currently recorded. The newly selected program has corresponding information displayed in the detail area 150, and a status icon is shown in various places to indicate the status of the program as being currently recorded, such as in this example embodiment being illustrated with a red circle or other icon 169. In particular, the recording icon is shown in this example with the program listing information in the view area 140, in the detail area 150, and in the information section 165 of the sidebar status control area 170. In addition, the available controls in the detail area 150 have been modified to include a "Cancel Recording" control (since the selected program is being recorded) and a "Watch Now" control (since the currently selected program is currently available for presentation).

As previously discussed, FIGS. 2-17 have displayed various information about television program listing information in a variety of ways. However, while the program listing information display has been modified in various ways, all of the displayed information has corresponded to a single type of view for the program listing information. In particular, and as previously noted, the program listing information has been displayed in a 2-D grid format, which corresponds to the prior selection of the grid view control 121.

Figure 18:
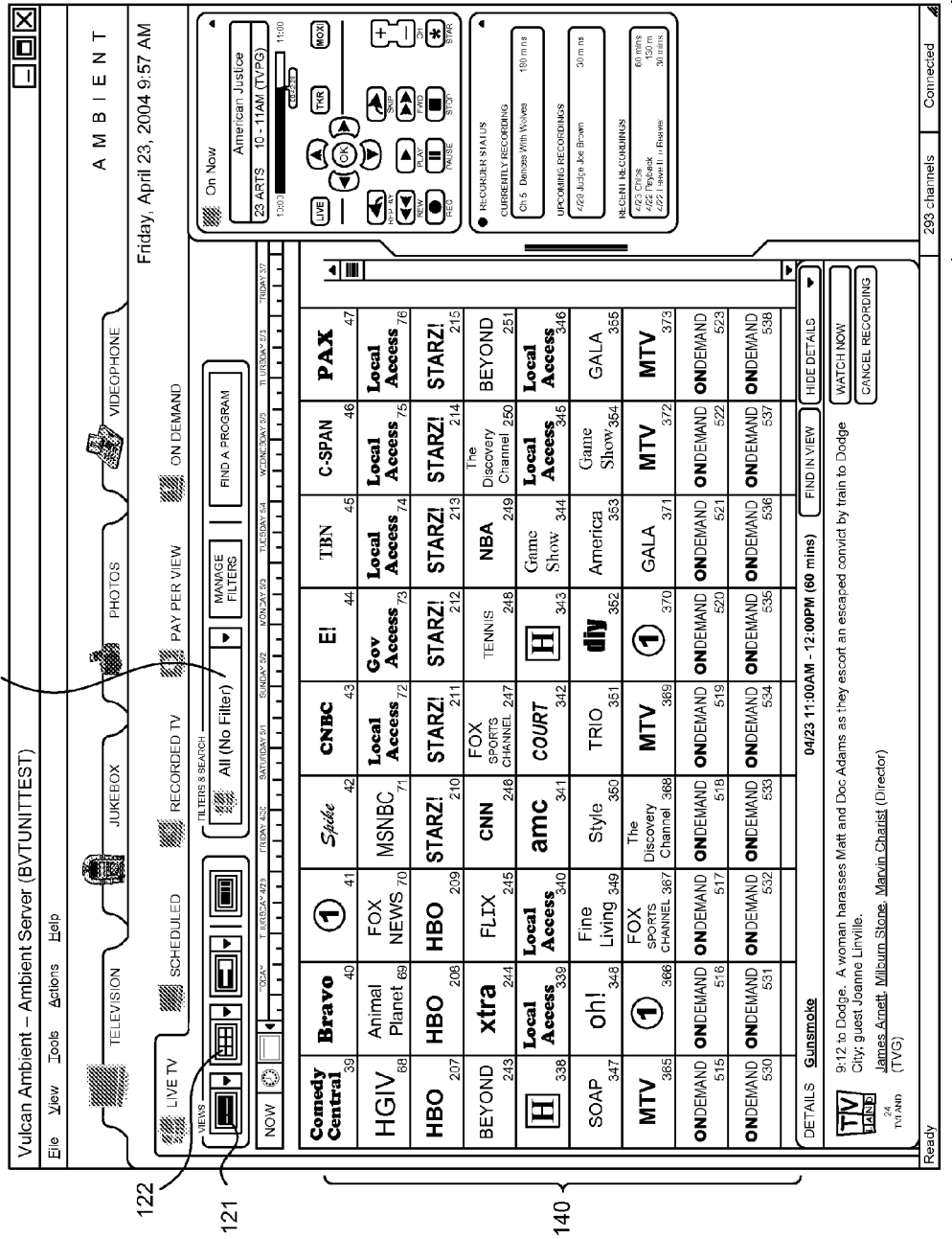

FIG. 18 corresponds to a change in the type of view used for the program listing information, and in particular corresponds to a view of the program listing information in iconic format after selection of an icon view control 122. In this example, the program listing information in the view area 140 is shown in a small size, such as based on the small size being the initial default size for the icon view or being a previous size used with a view (e.g., the previous use of the icon view, or in some embodiments based on the prior grid-based view being in the small size). In this example icon view, information about the channel numbers, names, and station names is displayed, but information about specific programs available at the currently selected time is not shown. The iconic view of program listing information can also be displayed at a medium or large size (not shown) to show more detail information, such as the name of the program at the currently selected time, the time period during which the program is displayed, rating, genre, and so forth. This change in size can be performed in a variety of ways, such as via a selection from a pop-up menu (not shown) in the view area, selection of a dropdown menu (not shown) using the triangle arrow control on the right side of the icon view control 122, etc. Since the displayed information in the view area 140 in the illustrated embodiment corresponds only to the currently selected time (or to no time), in this embodiment the second timebar is not shown, although in other embodiments the second timebar may be shown (e.g., if different iconic information is shown for different time segments).

If a particular program listing is selected as the current program, then the detail area 150 will be populated with information about the newly selected current program. In addition, a pop-up menu (not shown) corresponding to the selected program can be displayed, such as based on the user performing a right-click action on the selected program, with the pop-up menu allowing various actions to be taken with respect to the selected program (e.g., to select the program to be watched on an associated television or other video output device if the currently selected program is currently being shown). In other embodiments, other types of functionality could similarly be provided in such a pop-up menu.

Figure 19:
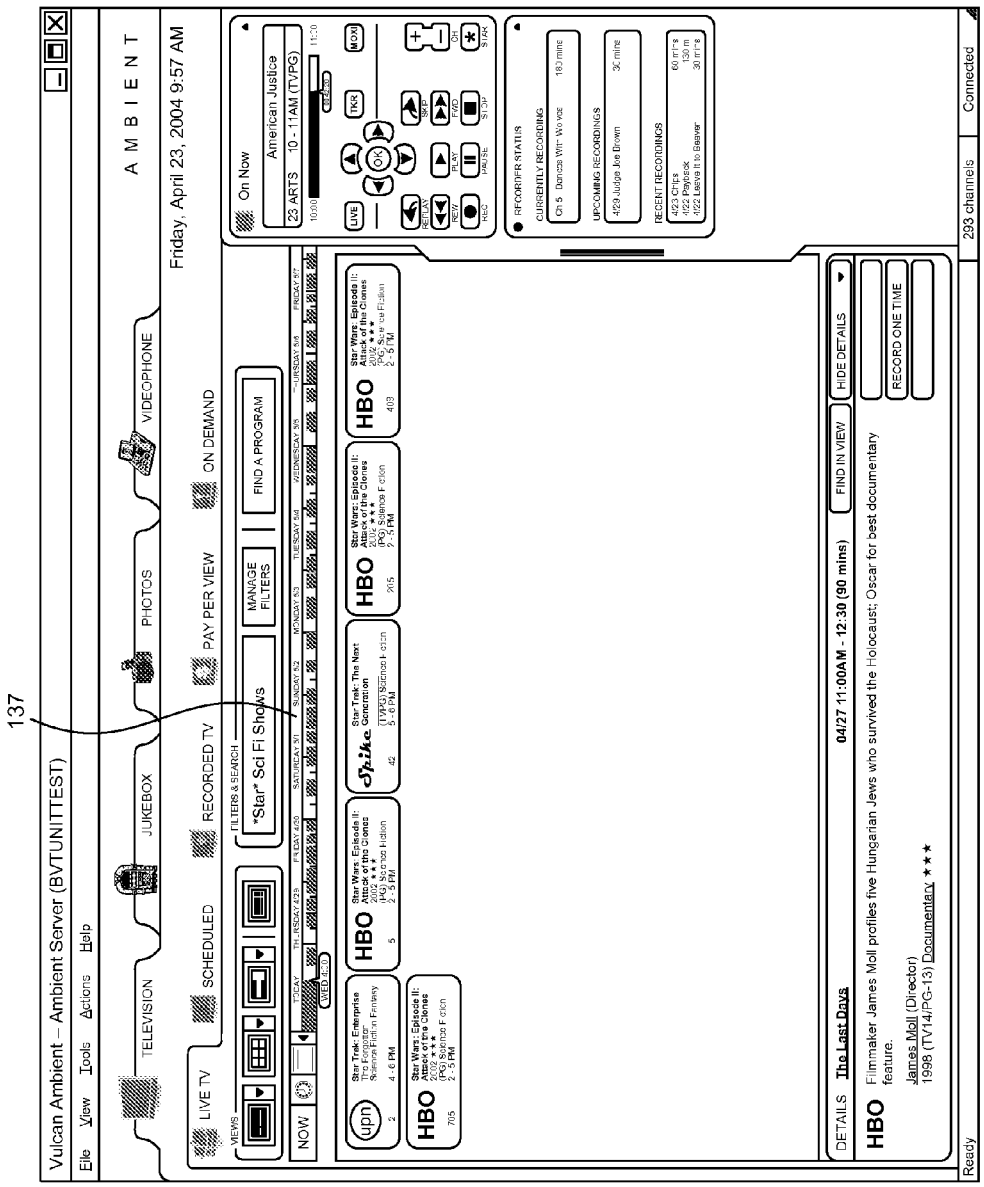

As with embodiments in which the program listings are shown in grid format, the user can use the filter control 126 to filter the information displayed in the view area 140 (whether for predefined or custom filters), and the first timebar may display visual indications corresponding to matching programs. For instance, FIG. 19 shows the results of applying a custom filter for programs in the "Science Fiction" genre and with the word "Star" in the title, and of selecting a current time from the first timebar that has at least one matching program (e.g., based on selecting a point along the timebar having an indicator 137 to indicate the presence of matching programs). In this example, the newly selected time is Wednesday at 5:00 PM, and six channels are shown in the view area as having matching programs at that time.

Figure 20:
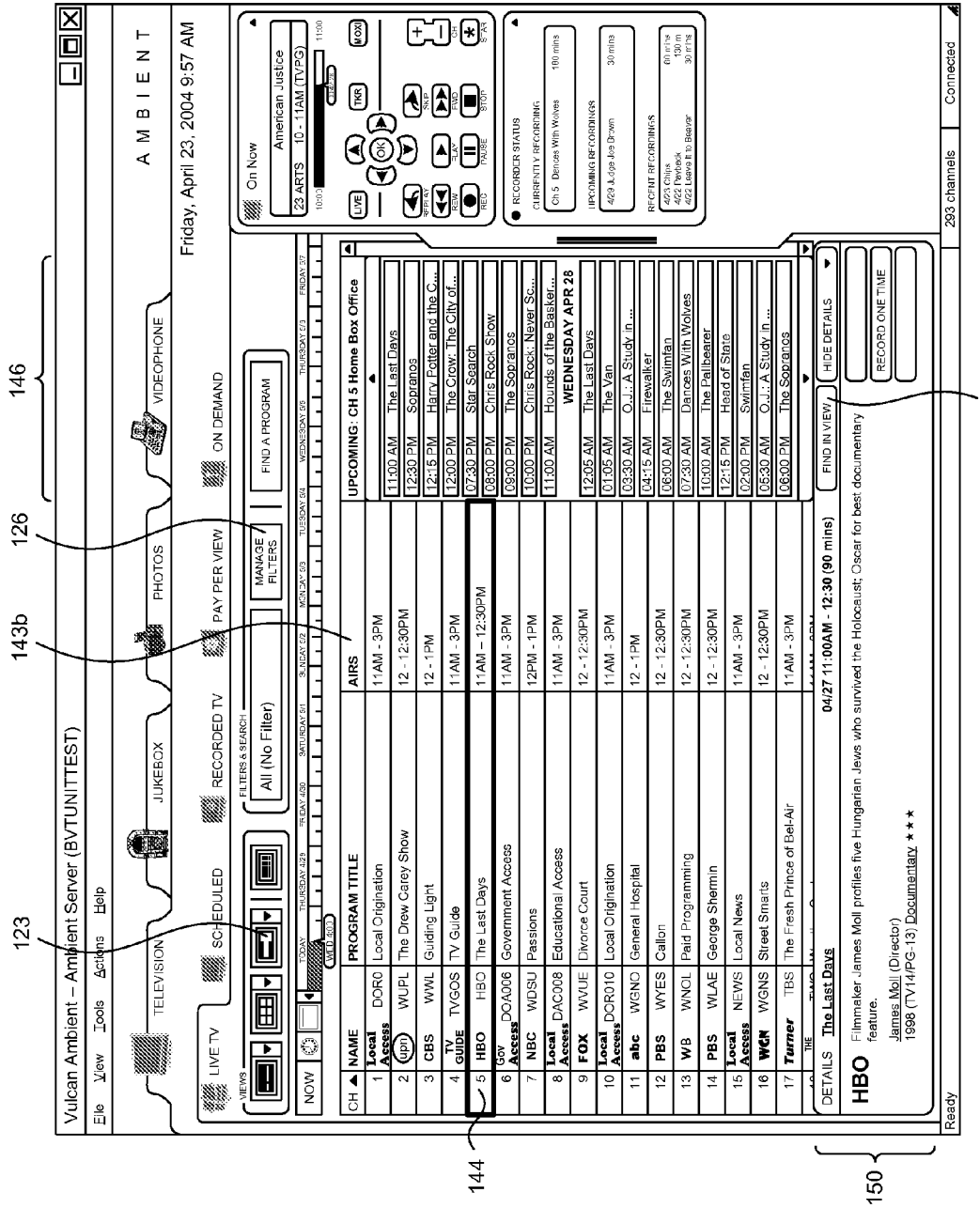

FIG. 20 then illustrates a change in the current view based on selection of the channel view control 123, as well as based on clearing the previously selected filter. In this view, channel and program information for a variety of channels is shown in the main left portion of the view area 140, while an additional right portion 146 of the view area 140 is displayed containing additional channel-specific information for a currently selected channel. In particular, in the current example channel number 5 for the currently selected program "The Last Days" is selected as the current channel 144 in the left portion of the view area 140, and the channel-specific portion 146 contains information about a number of different programs that are available on that currently selected channel over a third period of time that in this example corresponds to approximately the next day and a half. While the times along the left side of the right portion 146 are not illustrated as a distinct timebar in the illustrated embodiment, in other embodiments a third timebar may be displayed along that left side. In addition, while the second timebar is not displayed in the illustrated embodiment, in other embodiments the second timebar may additionally be displayed, such as to show program information for multiple channels in a grid format in the left portion of the view area while continuing to shown the additional channel-specific information for a single channel in the right portion 146. Therefore in this embodiment, the first time scale corresponds to several days, a third time scale for the third time period represented in the channel-specific portion 146 corresponds to hours over a period of approximately 1½ days, and a second time scale for a second timebar (not shown) may correspond to a shorter second period of time (e.g., 1 hour or 4 hours, such as in a manner similar to times displayed in the "AIRS" column 143b). The detail area 150 displays information pertaining to the selected program from the channel-specific portion 146, such as information pertaining to an upcoming program listed therein that airs after the program on the currently selected channel 144.

The user can also select "Find In View" functionality for a currently selected program while using the channel view, such as via the button 158 in the detail area 150 or instead based on a pop-up menu (not shown) for the currently selected program listing in the channel-specific area 146—such functionality is similarly available in the other views in at least some embodiments. For example, if a new program has been selected from the channel-specific portion that is not displayed in the current program listing information in the left portion of the view area (e.g., to select the "Chris Rock Show" at 7:30 pm on Tuesday) and the "Find In View" functionality is selected, the view area 140 information will be updated to show program information corresponding to the time of the currently selected program. If a different channel is selected in the view area 140 as the currently selected channel 144, the program on that channel at the currently selected time becomes the currently selected program in the illustrated embodiment, and the detail area 150 is updated to provide information about that program. Similarly, the channel-specific area 146 of the view area may be updated to include information about the newly selected channel.

As with embodiments in which the program listings are shown in grid and icon views, the filter control 126 can be used with the channel view to filter the information to be displayed in the view area 140 (whether for predefined or custom filters), and the first timebar may display visual indications corresponding to matching programs. Moreover, the size of the view can be switched to a medium size or a large size (or in some embodiments to any desired size for this and/or the other views), such as based on selection of an appropriate control on a pop-up menu in the view area (not shown) or instead based on use of a dropdown menu via the triangle arrow in the right portion of the channel view control 123. The program listings at the medium size, for example, may contain additional detail information relative to those listings at the small size, and use of a large size can display further detail information about the program listings being shown.

Figure 21:
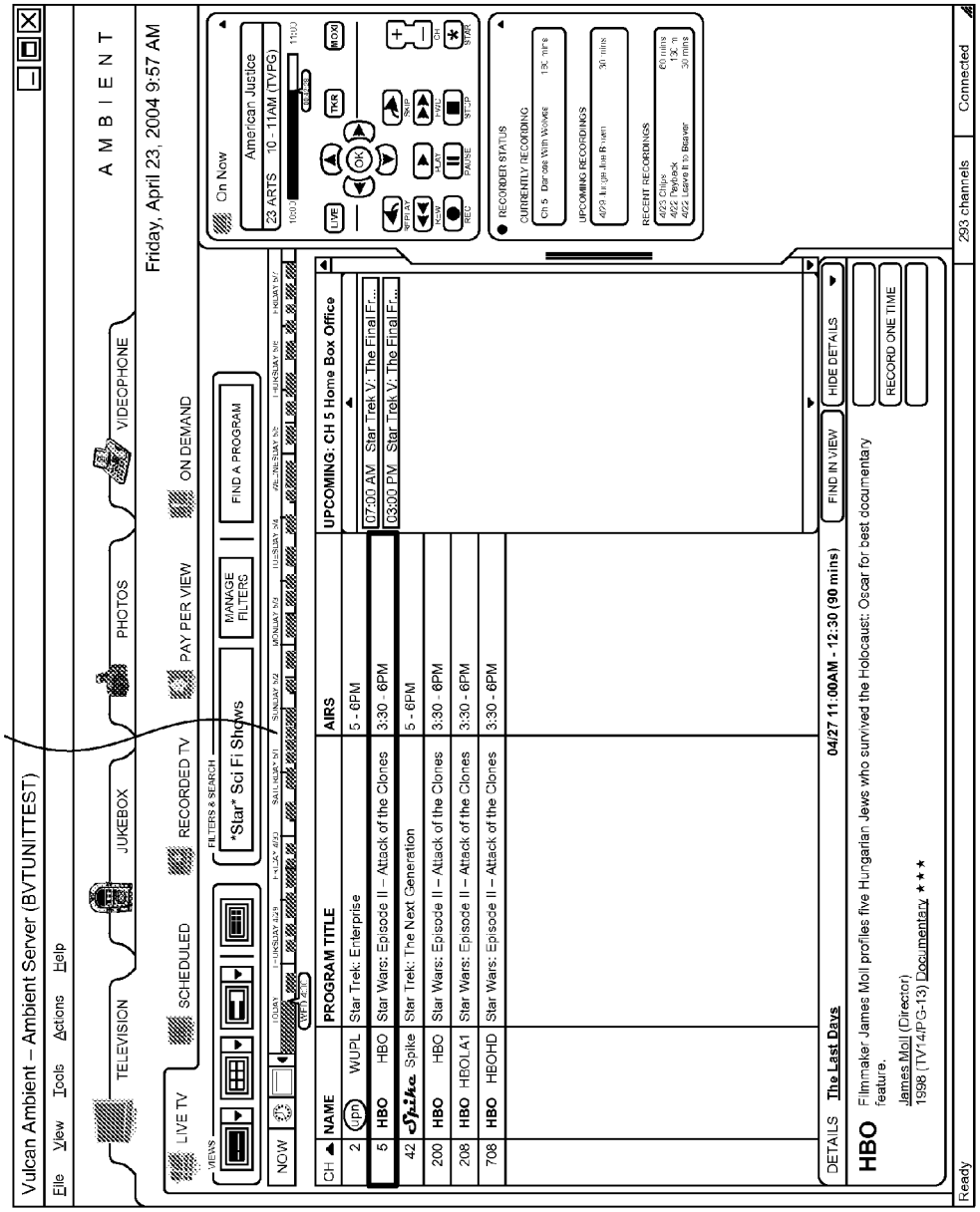

FIG. 21 displays example results of selecting a custom filter for programs in the "Science Fiction" genre and with the word "Star" in the title, and of selecting a new currently selected time of 5:00 PM on Wednesday (such as by clicking a corresponding indicator 137 in the first timebar) that has six program listings matching the filter. Channel number 5 continues to be the currently selected channel based on the currently selected program "The Last Days," despite that currently selected program not being currently displayed. Additionally, in some embodiments the channel listings may be sorted in various ways, such as in ascending order or descending order based on the channel numbers, based on channel names, based on air times of currently displayed programs (e.g., by default or instead based on selection of the "AIRS" column heading 143b), based on names of currently displayed programs, etc.

Figure 22:
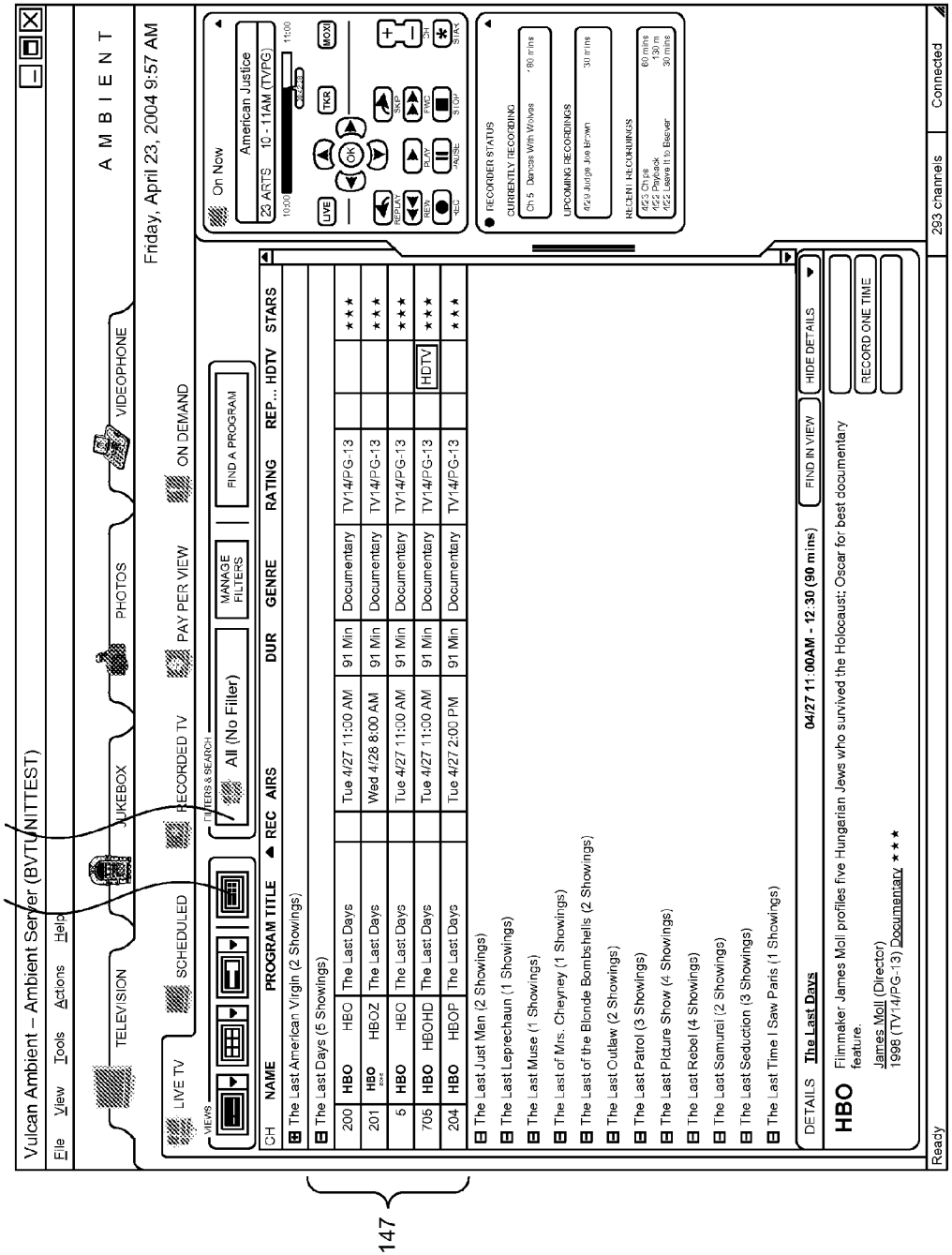

FIG. 22 then displays the results of switching to a list view of the program listings, such as based on selection of the list view control 124. In the current example, the program listings are shown sorted in ascending order based on the title of the programs, such as by default or instead based on user selection of the "PROGRAM TITLE" column heading 143a. In this example embodiment, at least some of the program listings may have multiple showings at different times, and some or all of the program titles can be expanded to show details of each of the showings for that program title. For example, with respect to the currently selected program "The Last Days," that program listing is currently shown in an expanded view 147 so as to provide information about each of the five showings of that program that are currently available over an upcoming period of time (e.g., the next 2 weeks).

In this example embodiment, a program title listing can be expanded in various ways, such as by selecting a small icon to the left of each of the program listings in order to expand or collapse that program listing, or instead using a pop-up menu (not shown) for that program listing, such as based on a right-click selection of the program listing. In addition or in the alternative, a pop-up menu (not shown) in the view area 140 can allow all program listings to be collapsed or expanded, as well as to change the sorting for program listings. If the user selects an "Expand All" control functionality or other similar functionality from a pop-up menu, the resulting listing will include all program information in expanded form in the view area 140. In addition, while the program listing groups here are illustrated based on program titles, in other embodiments the program listings may be grouped in a variety of other manners, such as based on any one or more associated metadata value or other attribute.

As with embodiments in which the program listings are shown in other views, the filter control 126 may in at least some embodiments be used with the program listing view to filter the information to be displayed in the view area 140 (whether for predefined or custom filters). While the times in the "AIRS" column for an expanded program listing are not illustrated as a distinct timebar in the illustrated embodiment, in other embodiments one or more fourth timebars may be displayed with expanded program listing information (e.g., a distinct fourth timebar for each expanded program listing). In addition, while the first timebar is not displayed in the illustrated embodiment, in other embodiments the first timebar may additionally be displayed and may include visual indications corresponding to appropriate programs (e.g., programs matching one or more specified filters and/or searches, or to illustrate upcoming showings of one or more programs, such as for a currently selected program and/or for one or more programs shown with expanded program listing information). Similarly, while the second timebar is not displayed in the illustrated embodiment, in other embodiments the second timebar may additionally be displayed, such as to display information about upcoming showings for one or more of the current programs in a grid format in the view area.

In addition, the program listings may be sorted in a variety of manners, with FIGS. 1BT-1CC from the parent provisional patent application showing examples of sorting and grouping the program listing information in a variety of ways. For instance, all of the program listing information may be shown in collapsed form and in a manner grouped and sorted by channel number in an ascending or descending manner, such as based on user selection of the "CH" column heading. Examples of sorting and grouping of program listing information can include but not be limited to: in ascending or descending order based on channel name; in a manner grouped and sorted based on the recording status of the program listings; in an ascending or descending order based on the air time of the program listings; in ascending or descending order based on duration of the program listing; in ascending or descending order based on the genre of the program listings; in ascending or descending order based on the rating of the program listings; in an ascending or descending order based on whether the program listings are repeat showings; in an ascending or descending order based on whether the program listing information is displayed in HDTV format; in ascending or descending order based on the stars assigned to the program listings; and so forth. Further details of such grouping and sorting are provided in the parent provisional patent application, and are abbreviated herein for the sake of brevity. Also, while not illustrated here, the sorting of program listings in some embodiments may also in at least some embodiments be performed using multiple sort specifications (whether in a manner specific to a particular program listing or instead for all program listings). For example, some or all of the program listings and/or program listing showings may be sorted first based on program title, then secondarily based on air time, and then tertiarily based on whether they are shown in HDTV format, or instead based on any other metadata values or other attributes and/or combination thereof.

Figure 23:
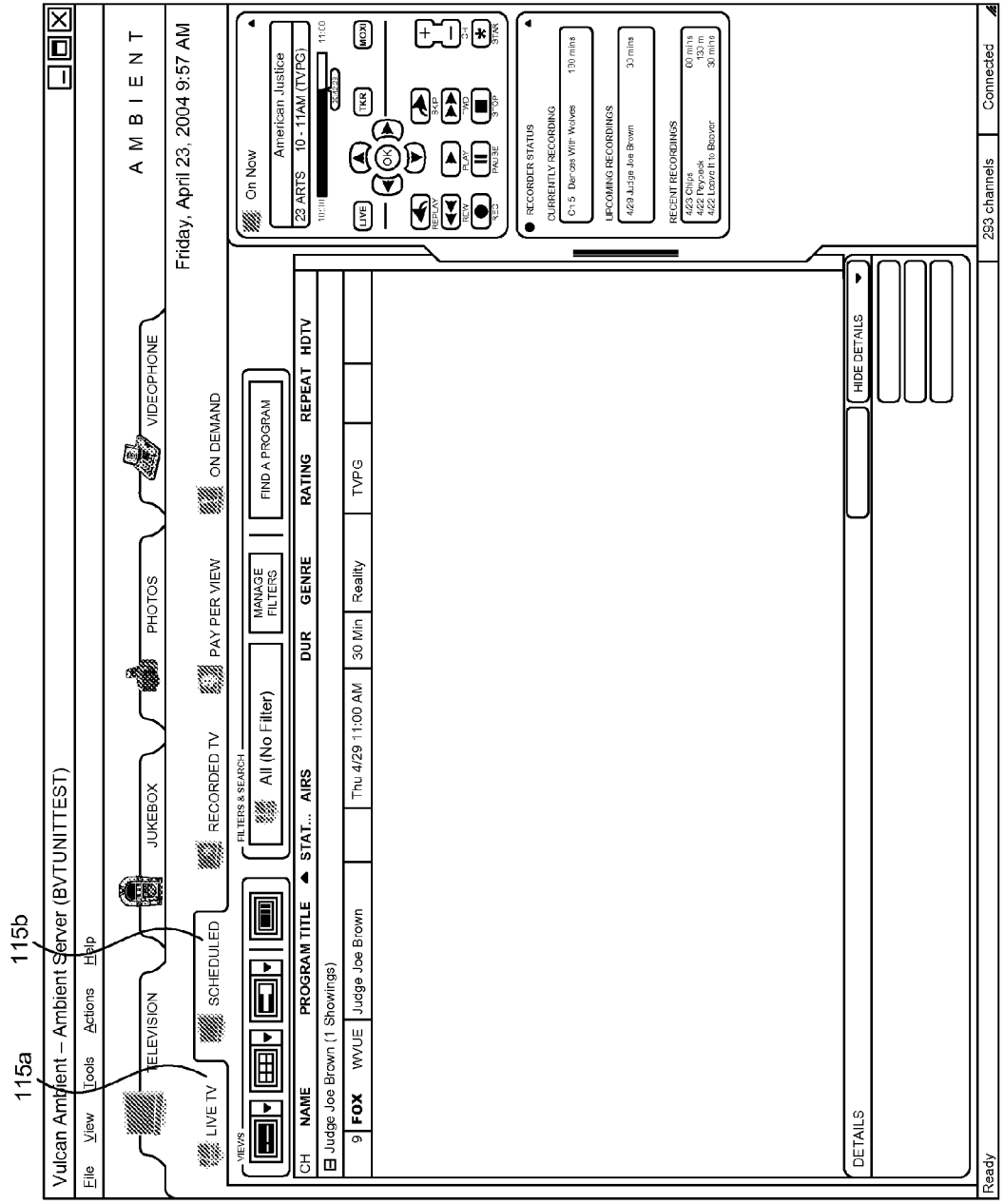

Much of the previously discussed program listing information has corresponded to content categorized as being available via live television, such as based on a prior or default selection of a "LIVE TV" control 115*a*. FIG. 23 corresponds to selection of an alternative type of television-related content, which in this example includes TV program listings that are scheduled to be recorded, such as based on selection of the "SCHEDULED" control 115*b*. In this example, only a single program listing is scheduled to be recorded, which is the "Judge Joe Brown" program on channel 9 FOX at 11:30 am on Thursday, as illustrated in the view area 140 and in the "UPCOMING RECORDINGS" section of the control status area. In addition, the scheduled TV program listing information can be manipulated in a manner similar to that of the live TV program listing information, such as to be sorted in various ways and to have various filters applied, as well as to be displayed using other views in at least some embodiments. For example, the scheduled recording information can be sorted in an ascending manner based on the air time of the programs, rating, genre, and so forth.

Programs may be scheduled for recording in various ways, such as via a pop-up menu (not shown) or other control that is provided regarding one or more upcoming programs (e.g., as displayed using one or more of the views for LIVE TV content) to give the user the option to record (or cancel recording of) a selected program. Information about a currently selected program may include a small red circle status icon or other icon (not shown), as previously described above, to indicate that the program is to be recorded, with the icon shown in the display for the program listing in the view area 140 and/or in the detail area 150. In addition, the information about the upcoming recordings can be shown and updated in the sidebar status control area 170 to reflect a newly scheduled recording. The SCHEDULED control 115*b*, if subsequently selected, will also result in the presentation of the newly scheduled program to be recorded in the view area 140.

Figure 24:
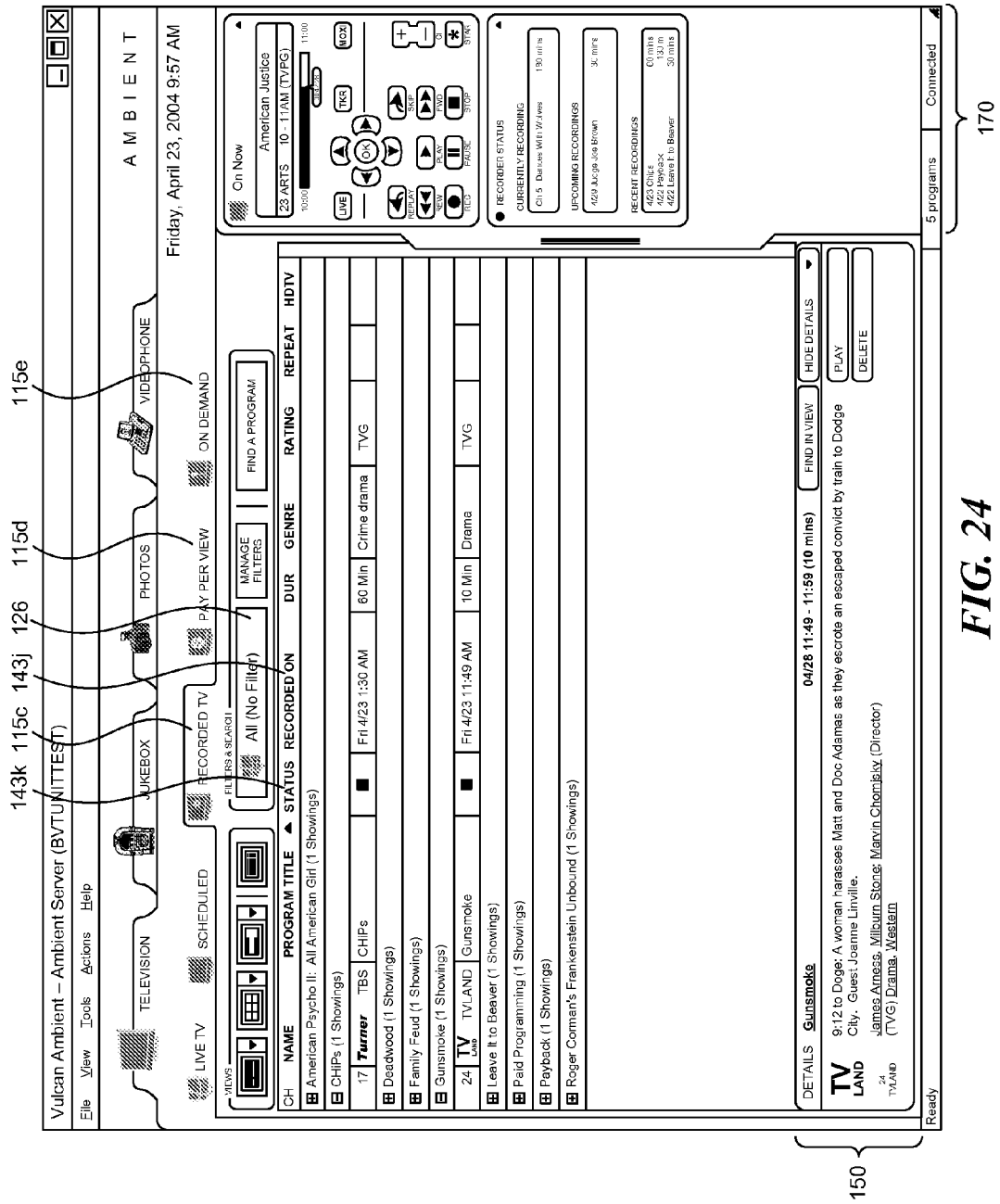

FIG. 24 next displays results of selecting the type of television-related content corresponding to previously recorded TV program listings, such as based on selection of the "RECORDED TV" control 115*c*. While not illustrated here, information for other groups of television-related content can similarly be displayed in other embodiments, such as information corresponding to pay-per-view television (e.g., by selection of the control 115*d*), on-demand television programs (e.g., by selection of the control 115*e*), or various other types of television-related programming via appropriate controls (not shown), such as for interactive television, or more generally for any type of recorded or other content available for presentation (e.g., by being stored on a local device or otherwise retrievable). A pop-up menu (not shown) or other control can be used to provide various functionality for one or more of the previously recorded content listings, such as to delete the recording, play the recording on one or more appropriate video output devices (e.g., a TV) being controlled, and to find the program information for that program in the current view. The detail area 150 in the illustrated embodiment also includes a "PLAY" control button for the currently selected program, and the status control sidebar 170 provides information about the program being currently played.

The recorded TV program listings and/or other content can also be manipulated in a manner similar to that for the other program listing information, such as to be sorted in various ways and to have various filters applied, as well as to in some embodiments be displayed using or more other views. For example, the program listing information may be sorted based on the record time of the program listings (e.g., based on user selection of the "RECORDED ON" column heading 143*j*), or could similarly be sorted based on a current status of the program listing, such as by user selection of the "STATUS" column heading 143*k*. In the illustrated embodiment, program listings can be given a status of recorded, scheduled to be recorded, and not scheduled to be recorded, although in other embodiments a variety of additional types of status information could be similarly assigned and used (e.g., currently recording, scheduled to record once, scheduled to record the series or multiple episodes, live and not recording, future and not scheduled, past shows that were not recorded, scheduled to record but did not, scheduled to record but not going to, recorded as a recommendation, locked to prevent deletion, subject to deletion, imminent deletion, previously viewed (for recorded and/or live programs), partially viewed, has additional associated content, has additional associated functionality, has a user-specified annotation, etc.).

In some embodiments, the content listings shown in the view area 140 for any one or more of the content-type-specific navigation tabs 115 (e.g., LIVE TV, SCHEDULED, RECORDED TV, PAY PER VIEW, and/or ON DEMAND) may further be bifurcated or otherwise organized (not shown) based on one or more devices connected to or otherwise associated with the CM system, such as one or more media centers 350, one or more computing systems 390, or other input/output devices. For example, if there are multiple STBs, DVRs, or other input/output devices (e.g., televisions) coupled to the CM system, the view area 140 may present listing information corresponding to multiple of the devices (e.g., for two devices or for all devices), such as simultaneously in different portions of the view area. Thus, for instance, if two DVRs are connected to the CM system and each is able to record content and/or has recorded content, then the view area 140 may separately or concurrently present the information for each DVR. Program listings for multiple STBs can also be presented in the view area 140 separately or concurrently, such as if these STBs receive different EPG data.

In addition, the GUI may further in some embodiments provide distinct timebars for multiple of such devices (e.g., each device) in the GUI 100, such as distinct first timebars and/or distinct second timebars, whether simultaneously or separately. Alternatively, in some embodiments, a single first timebar and/or second timebar may be used for multiple devices, but with the first timebar and/or second timebar simultaneously displaying different information for each of the devices. Such simultaneous display of different information for each of multiple devices in a single timebar may be performed in various ways in various embodiments, such as by having a single time period and time scale but using different visual representations (e.g., different colors, different shapes, etc.) for displayed visual indicators and other information for different devices, or to instead simultaneously display in a single timebar different time periods for each of the devices and/or information at different time scales for each of the devices (e.g., by bifurcating a timebar and showing one time scale on top and another on bottom, or by selecting a single time scale that is sufficiently large to include two or more distinct time periods). Thus, for example, a first timebar that is simultaneously displaying information for multiple devices may include visual indicators for each of the devices, such as to correspond to programs that match different filters for each of the devices, to indicate upcoming scheduled programs to be recorded on each of the devices, to indicate different current status for each of the devices (e.g., whether or not the device is currently recording a live program), etc.

In some embodiments, information that is displayed in the first and/or second timebars may further be represented in other manners than previously described. For example, with respect to the first timebar, the displayed indicators of relevant content or of other types of information may have a variety of other forms in other embodiments. In particular, in at least some of the previously discussed illustrated embodiments, an indicator displayed in the first timebar reflected the presence of relevant content (e.g., content matching a specified search or filter) at the time in the first time period that the indicator was displayed, with the absence of such an indicator reflecting the absence of any such relevant content. However, in other embodiments the indicator display may be modified in various ways to provide a variety of other types of information. For example, in some embodiments the visual representation of each of the indicators may be modified to provide additional information about the relevant content that is being represented, such as to indicate an amount of relevant content at an indicated time (e.g., by modifying the width of a displayed indicator in proportion to or otherwise based on the amount of relevant content, so that an indicator reflecting five relevant movies on five channels at one time point is wider than another indicator reflecting only a single relevant movie at another time point). Similarly, the visual representation of each of the indicators may be varied in other manners (e.g., color, height, shape, saturation, hue, brightness, etc.) to indicate a variety of other types of information, such as a degree of relevance of the corresponding content (e.g., a degree of match to a filter or a search), one or more ratings of the content, a priority of the content, etc.

In addition, in some embodiments the visual representation of at least some displayed indicators in the first timebar and/or of other aspects of the GUI (e.g., the first timebar and/or second timebar) may be modified in other manners, such as to allow customization of such visual elements. Such customization may be provided, for example, to allow personalization of information to a particular user (e.g., based on preferences of the user, and whether in response to a request by the user or in an automatic manner) and/or to a particular computing device (e.g., to display less information or to display information in a more limited manner when the computing device has a limited display area and/or limited display capabilities, such as for a cellphone or other handheld computing device). In addition, customization of multiple visual elements at a time may be provided, such as to allow different visual "skins" or "themes" to be defined and used. Such use of different skins or other visual customization features may be used in various ways, such as to enable branding by a commercial entity (e.g., for a fee paid by the commercial entity) of some or all portions of the GUI to some or all users, such as by displaying a logo and/or color scheme associated with the commercial entity (e.g., by displaying a logo in a non-functional portion of the GUI, such as the "Ambient" logo in the upper right portion of GUI 100 in FIG. 2, or instead in other manners, such as by modifying some or all of the visual indicators in the first timebar to display or otherwise reflect a logo).

In addition, a variety of additional information about relevant content may be displayed using indicators in the first timebar in other manners, such as upon some form of user selection of the displayed indicator. Such additional information about relevant content corresponding to a displayed indicator may include the types of information discussed with respect to previous examples, or more generally may include any metadata (e.g., EPG data) or other relevant information about a relevant piece of content (e.g., descriptive textual information about a piece of content, a preview or portion of the content, information about other users' use or selection of the content, a user-specified or other "tag" or category associated with the content, an indication of whether the content is currently selected and/or currently displayed in the view area, etc.), whether alternatively or in addition to detail information shown in the view area 140 and/or the detail area 150. User selection of a displayed indicator may include, for example, "mouse-over" of an indicator without a mouse click (or other movement of a cursor over the indicator), with the additional information presented in a manner similar to a pop-up tool tip window. Alternatively, a mouse click (e.g., a right mouse click) may cause such additional information to be displayed in various ways (e.g., a pop-up window). In addition, corresponding types of functionality may be provided for other types of input devices and user manipulations.

In addition to providing additional information about relevant content using indicators in the first timebar, various types of functionality may similarly be provided in at least some embodiments upon some form of user selection of the displayed indicator. For example, as previously indicated, selection of a displayed indicator for a time point may cause that time point to become the currently selected time, with the second time period of the second timebar adjusted to display that currently selected time. In some embodiments, other types of functionality may be provided for selection of a displayed indicator, whether in addition to (e.g., using a different type of selection than for specifying the currently selected time) or instead of specifying the currently selected time. For example, selection of an indicator may cause one or more corresponding pieces of content to become the currently selected content (e.g., the currently selected television program, such as to cause information about that program to be displayed in the detail area 150), or may instead allow various types of capabilities to be provided for one or more such corresponding pieces of content (e.g., to schedule a recording, to initiate a current recording, to watch or manipulate a previously recorded piece of content, etc.). Moreover, in at least some of the previously discussed illustrated embodiments the first and second timebars have been represented in a linear manner. In other embodiments, however, the first and/or second timebars may be represented in other ways, such as by using one or more icons.

Figure 25:
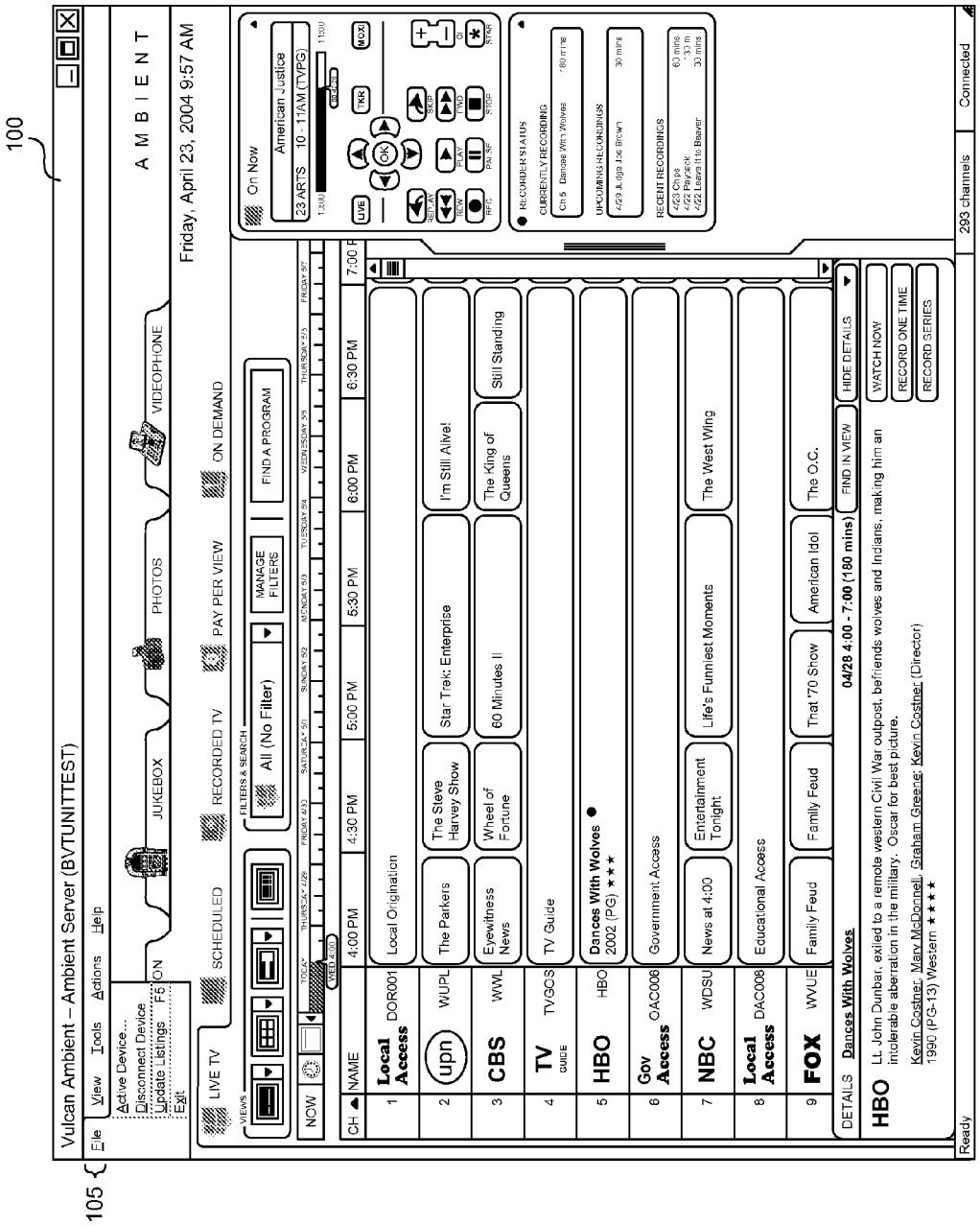
Figure 26:
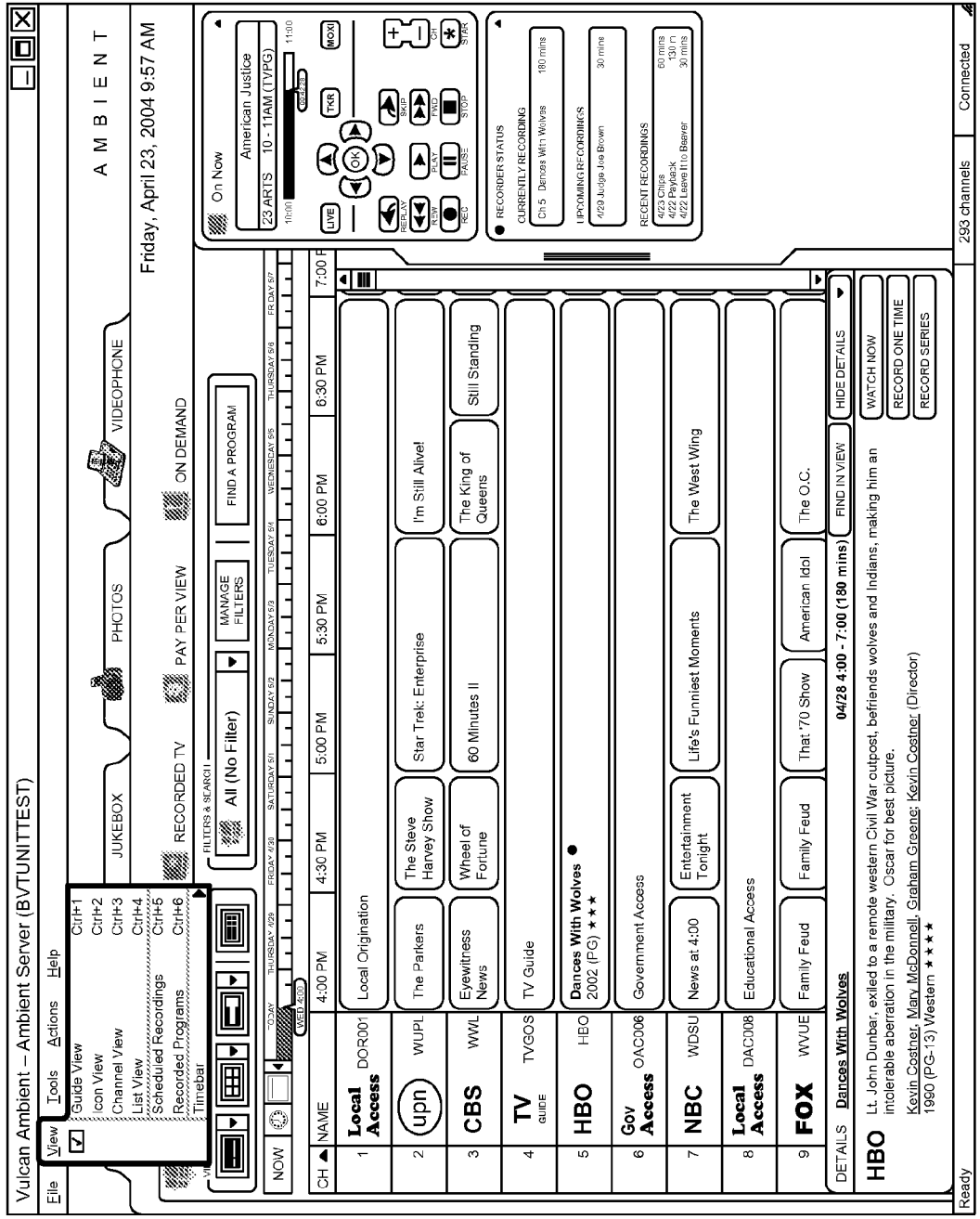
Figure 27:
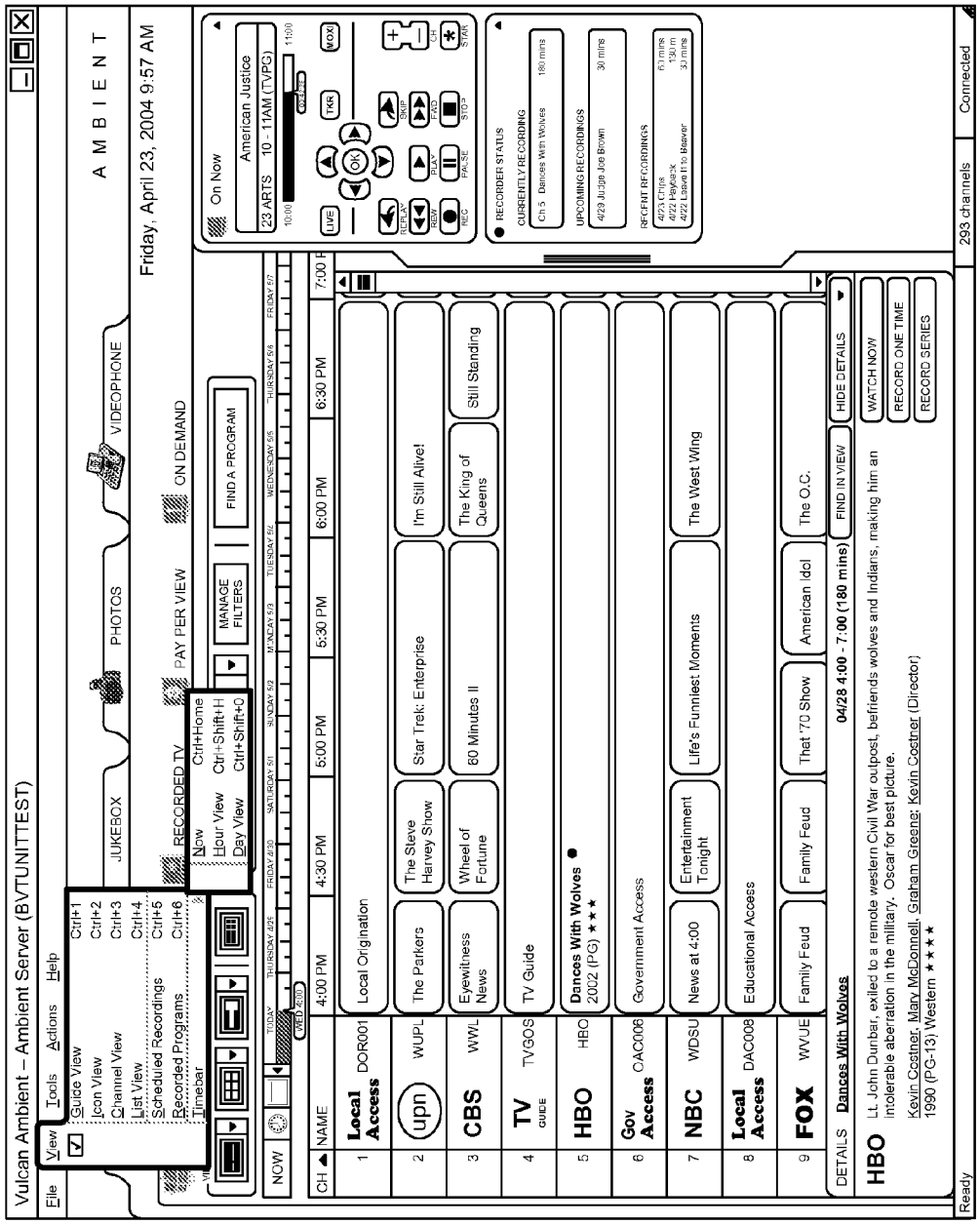

FIGS. 25-27 illustrate examples of additional capabilities available via the GUI 100 by using dropdown menus from the menu bar 105. In particular, FIG. 25 illustrates the dropdown menu available by selecting the "File" menu control, which includes the ability to connect or otherwise associate the GUI with one or more particular STBs, DVRs or other devices with which to interact (e.g., from which to receive program listing information and to which to send content manipulation instructions). For example, choosing the "Active Device" selection from the File dropdown menu may result in a list of one or more available devices (not shown) from which to select, while choosing the "Disconnect Device" selection from the File dropdown menu may result in a pop-up window (not shown) asking whether the user desires to connect to another device, although such a pop-up window may also be provided in other embodiments and situations (e.g., if a connected device or the connection to that device becomes unavailable). Choosing the "Update Listings" selection from the File dropdown menu may result in retrieving updated program listing information (e.g., if needed), and may further result in display of a pop-up window (not shown) indicating that the updated program listing information has been retrieved. Choosing the "Exit" selection from the File dropdown menu would cause the CM application to end.

FIG. 26 illustrates the dropdown menu available by selecting a "View" menu control, which includes the ability to select a current view to apply, as well as to select particular groups of the current content type for display. FIG. 27 then illustrates the results of selecting the "Timebar" selection control from the View dropdown menu, with an additional submenu available to the user for selection to allow the user to select various first time scales for the first timebar (e.g., multi-hour or multi-day), as well as to make the current time the currently selected time. In addition, while not illustrated here, various additional functionality may be available from other dropdown menus. For example, a dropdown menu (not shown) available by selecting the "Tools" menu control may include the ability to search for a program, to define a custom filter, to change a current color scheme, and to specify various options (e.g., via a pop-up window, not shown). Options may include controls, for example, to allow the user to select the style of the time line in the guide view (such as to select a condensed style); to show a visual vertical line or other indication in the view pane through the channel listings to indicate a currently selected time; to specify a default master font for use in the GUI (e.g., with the user receiving an additional pop-up menu to allow specification of the default master font); to limit the number of days of program data to be displayed; to allow the status control sidebar to be automatically hidden when not in use; to specify various information about connections to other devices at startup and periodically afterwards, and to specify various information about software and program listing update functionality. In addition, a dropdown menu (not shown) available by selecting the "Actions" menu control may include the ability to control the recording and viewing of content, as well as to select functionality to scan channels, and a dropdown menu (not shown) available by selecting the "Help" menu control may include the ability to check for updates for the CM system and to receive additional information and other help. Examples of at least some such additional functionality are illustrated in the parent provisional patent application, such as with respect to FIGS. 4G-4N.

Figure 28:
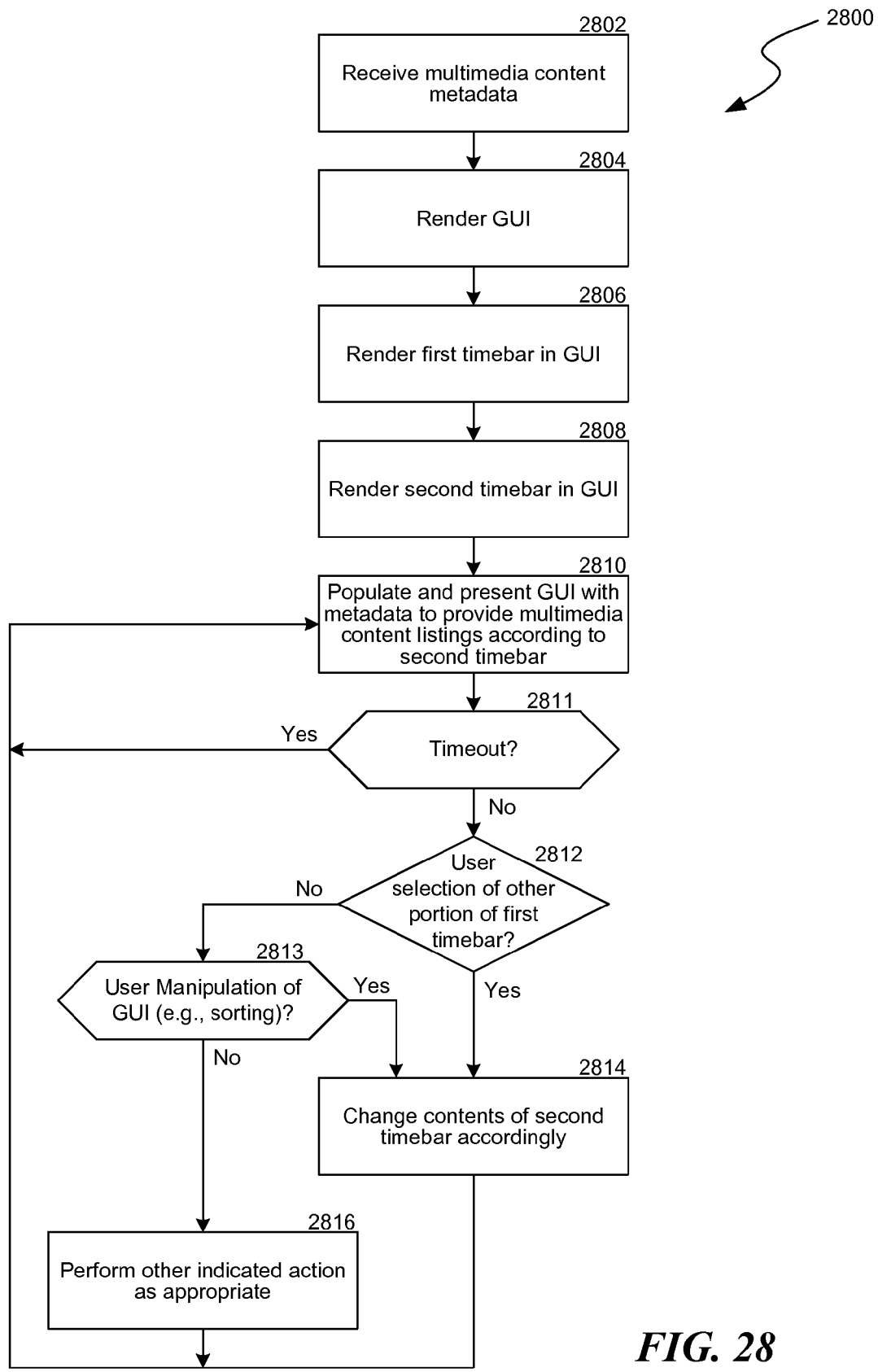
FIG. 28 is a flowchart of an embodiment of a routine for generating and operating embodiments of a time-based GUI.

FIG. 28 is a flowchart 2800 of an embodiment of a routine for operating a time-based GUI, such as for GUI 100 previously discussed with respect to FIGS. 2-27. In some embodiments and situations, the content displayed in the time-based GUI may correspond to television programming, such as to use EPG data, while in other embodiments and situations various other types of content may be displayed.

The routine begins at step 2802, where multimedia content metadata is received, such as if the computing system 300 receives EPG metadata information (i.e., as part of television programming-related content 360*a*) from a head-end and/or an Internet location, and then stores the information as content metadata 322 in the storage unit 320. At step 2804, the GUI begins to be rendered on a suitable display device, such as to render the GUI 100 on the display 311. The rendering process includes rendering a first timebar at step 2806 and rendering a second timebar at step 2808. In at least some embodiments, the first and second timebars may be initially set to reflect default or user-specified first and second time scales and/or first and second time periods, respectively, or to otherwise reflect specified display configuration information. Furthermore, in some embodiments the second time scale and/or second time period are selected so as to correspond to a portion of the first time scale and/or first time period. At step 2810, the GUI is then populated with multimedia content listings that are presented to a user, such as based on the received metadata and in such a manner as to correspond to the second time period for the second timebar, as well as optionally presenting various other types of information to the user. In addition, in some embodiments and situations one or more indicators may be displayed in the first timebar to correspond to content listings, such as content listings that are not currently displayed due to being outside the second time period of the second timebar.

In the illustrated embodiment, the content listings remain rendered in the GUI until a timeout occurs (e.g., to refresh the program contents, such as every few seconds or when a ½ hour or other time segment of the second time period has passed) or until the user selects functionality to cause a change. When such a change is initiated, the routine continues to step 2811 to determine whether a timeout has occurred, and if so returns to step 2810 to modify the GUI accordingly (e.g., to update the first and/or second timebars with new time periods if appropriate, and to update the content listing information in the GUI if appropriate, such as for new time periods and/or to reflect new content that has become available). If it is instead determined in step 2811 that a timeout did not occur and the change initiation is from a user action, the routine continues to step 2812 to determine whether the user has selected a portion of the first timebar that is different than the currently selected time (e.g., based on a displayed indicator corresponding to one or more content listings that are not currently displayed), such as to cause a new second time period for the second time bar to be selected. If so, the routine continues to step 2814 to update the second timebar to reflect the new second time period, and the routine then returns to step 2810 to update the content listings of the GUI to reflect the new second time period, as well as to optionally update the first timebar if appropriate (e.g., to change the first time period of the first timebar and/or to modify a display of indicators corresponding to content listings).

If it is instead determined in step 2812 that the change initiation is not from user selection of the first timebar, the routine continues to step 2813 to determine whether the user has manipulated the GUI so as to perform filtering or searching, and if so continues to step 2814 to modify the second timebar if appropriate before continuing to step 2810 to modify content listing and other displayed information accordingly. For example, at least some such actions may cause information to be displayed in the first timebar to provide indicators of content listings that are not currently visible during the second time period for the second timebar, such as actions to perform searches and to apply filters. If it is instead determined in step 2813 that the user has not performed a filtering or searching activity, the routine continues instead to perform another type of action indicated by the user (e.g., sorting, scheduling or initiating a recording, etc.) in step 2816, and then continues to step 2810 to update content listing and other displayed information as appropriate.

In some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, in other embodiments the operations may be performed in other orders and in other manners. In addition, in some embodiments certain operations may be embodied in software or other computer-readable instructions stored on a computer-readable medium, such as software stored in the memory 330 of the CM system 335 of FIG. 1. The data structures discussed above may also be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

In some embodiments, a variety of other types of content can similarly be reviewed, manipulated, and controlled via a GUI, such as via the example GUI 100. For example, in one example embodiment, the primary content-type navigation tabs 110 of FIG. 2 are available to allow the user to select music content (e.g., via selection of the displayed user-selectable "JUKEBOX" control), photos and/or images (e.g., via selection of a displayed user-selectable "PHOTOS" control), and to obtain videophone functionality (e.g., via selection of a displayed user-selectable "VIDEOPHONE" control)—in other embodiments, other similar types of controls may process access to other types of content, such as to access non-television video content via selection of a displayed user-selectable "VIDEO" control. Selection of one of the displayed controls may cause information about corresponding content to be displayed in the GUI, such as to update the view area 140 (or a similar area of the GUI) to include content listings for the corresponding content (e.g., to display various metadata about the content), to provide various additional details about a selected piece of content via the detail area 150, to include graphical indicators corresponding to selected pieces of the content via the first timebar 128, and to similarly update various other controls and areas of the GUI (e.g., the secondary content-type-specific navigation tabs 115, the menu bar 105, the view control area 125, the status bar 155, the status control sidebar area 170, etc.). A variety of other types of content are similarly available, including advertisements, news clips, excerpts from articles, Internet content, presentations, videogames, etc.

These other types of content may be manipulated in a manner similar to that described above for television programming-related content. In particular, various techniques have been described to organize and manipulate content based on one or more times associated with the content, such as based on the start time at which a piece of television programming-related content may be available for presentation. Other types of content may similarly have one or more of various types of associated times with which the content may be accordingly manipulated. For example, music content may be associated with a record date and time-of-day, a release date and time-of-day, a broadcast date and time-of-day, a receipt/download date and time-of-day, and various other time-related characteristic(s), and one or more of such associated times may be used to select pieces of music content to display in the view area 140 (e.g., based on those pieces of content each having an associated time within a second time period associated with the second timebar) and to select pieces of music content for which graphical indicators will be displayed in the first timebar (e.g., based at least in part on those pieces of content each having an associated time within a first time period associated with the first timebar). Photos and video can similarly have one or more associated times, such as creation date and time-of-day, revision date and time-of-day, download date and time-of-day, etc., and may similarly be displayed based on one or more of such associated times. Other types of multimedia content may have similar time-related characteristics, and the GUI may be modified accordingly to manage such content.

Figure 29:
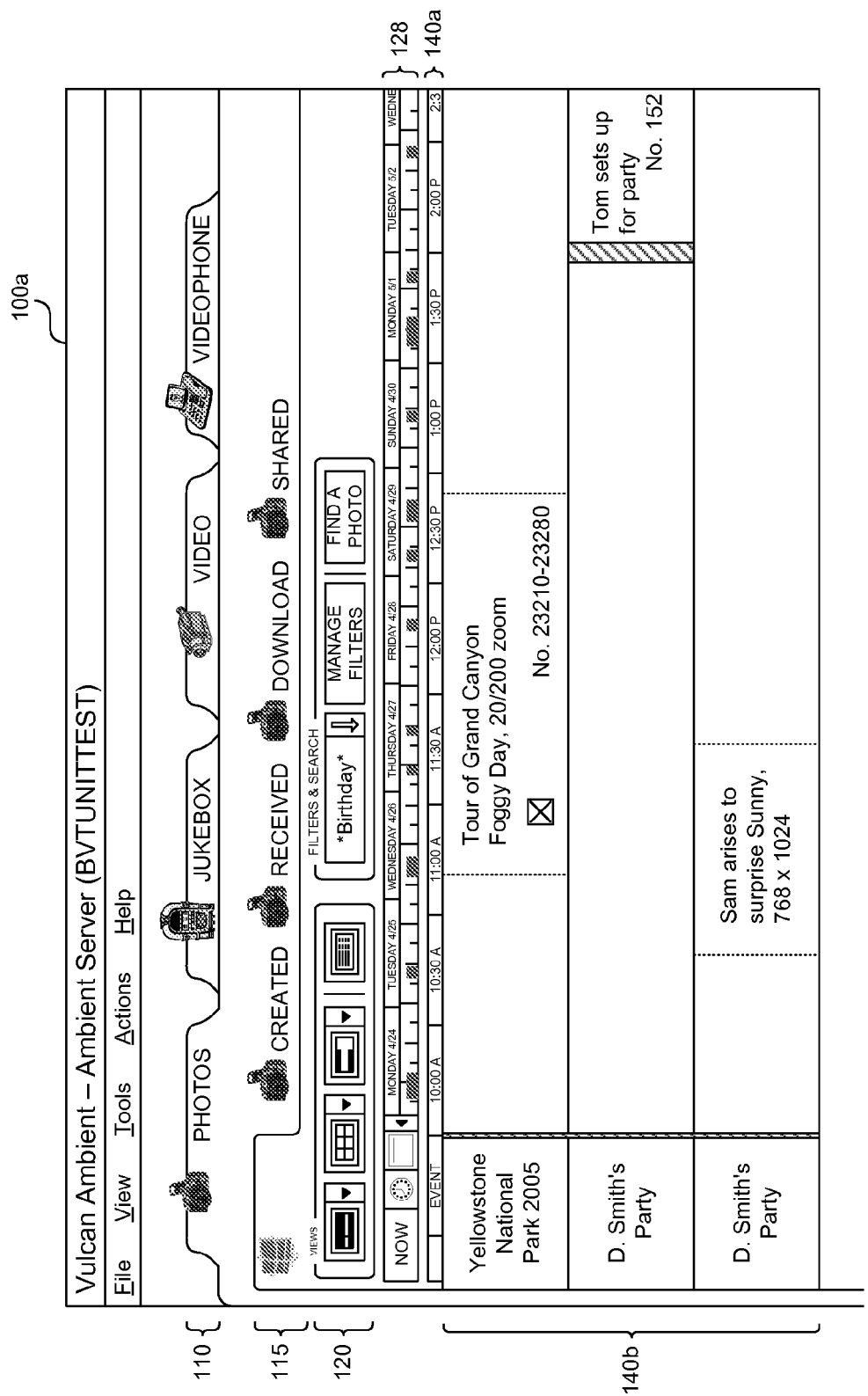

For example, FIG. 29 illustrates an example GUI that provides controls to manage photos using time-related characteristics of the photos. In the illustrated embodiment, a portion 100a of an example GUI is illustrated, with a "PHOTO" primary content-type navigation tab 110 being currently selected. Accordingly, appropriate secondary content-type-specific navigation tabs 115 are illustrated (which in this example are "CREATED," "RECEIVED," "DOWNLOAD," and "SHARED"), and a portion 140b of a view area is shown currently displaying metadata information regarding various photo sets. In particular, in this example embodiment the first timebar 128 illustrates a first period of time and a second timebar 140a illustrates a shorter second period of time, with the photos sets indicated in the view area each having at least one associated time that corresponds to the second time period (e.g., an associated creation time, such as based on a current selection of the "CREATED" secondary content-type-specific navigation tab 115). The photo sets may further be filtered in various ways (e.g., by genre and/or subject) in order to highlight particular photos for easier discovery, with the photo sets in the illustrated embodiment being restricted to photo sets corresponding to a "BIRTHDAY" filter selection 120 (e.g., based on metadata for the displayed photo sets indicating a birthday-related connection).

Figure 30:
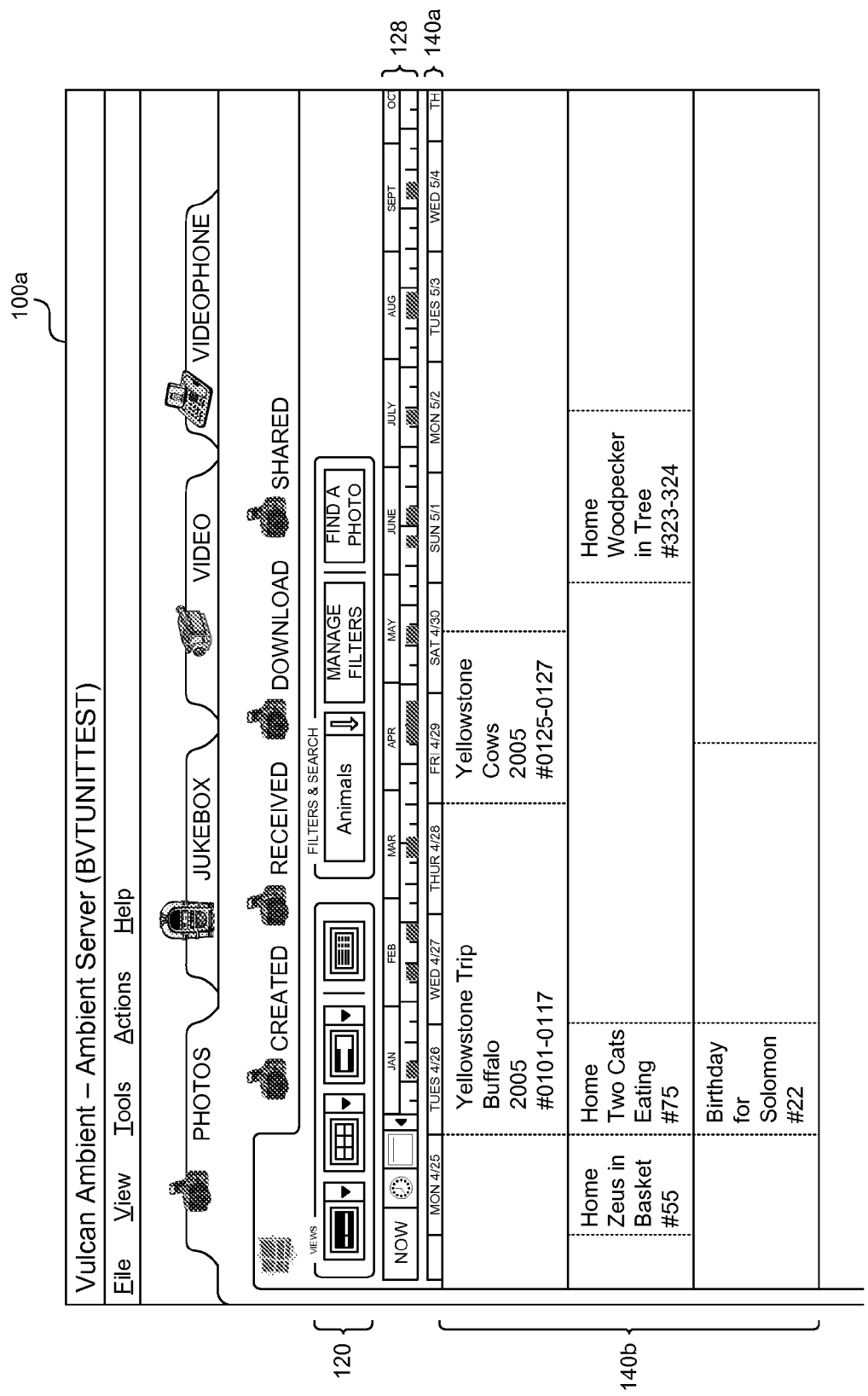

FIG. 30 illustrates an example portion 100a of a GUI that is similar to that displayed in FIG. 29, but with alternative time scales for the first and second timebars. In particular, in FIG. 30 the first timebar 128 illustrates a first time scale of several months, and the second timebar 140a illustrates a second time scale corresponding to several days. A new "ANIMALS" filter control 120 is also currently selected (e.g., for a user-defined custom filter), and the portion 140b of the view area displays metadata information regarding various photo sets corresponding to the second time period and filter. In the illustrated embodiment, selection of another of the secondary content-type-specific navigation tabs would cause other types of time-related information that is associated with photo sets to be used to select the photo sets matching the second time period, such as to use times that photo sets are received, times that photo sets are downloaded, or times that photo sets are shared. A variety of other types of time-related information could similarly be associated with photos and/or with other types of content.

Thus, in at least some embodiments the GUI 100 includes first and second timebars that can be used to organize and manipulate listings and other information for content of such other content types based on associated time information. For example, if a user downloads music on a regular basis and/or music is broadcast according to a timed schedule (e.g., on one or more digital music channels provided by a cable-based or satellite-based content provider), the view area 140 can display song titles based on the download times in a manner corresponding to the second timebar. Moreover, the user can sort, group, filter, view, or otherwise manipulate the listings and other information using similar techniques as previously described above for television program listings.

Moreover, while time-based organization and manipulation is useful for many types of content, in some embodiments at least some types of content may be organized and manipulated based on other types of associated information, whether in addition to or instead of based on time. For example, content with associated textual information (e.g., a title or name, names of one or more associated people, etc.) may be grouped in the GUI alphabetically or otherwise based on that textual information, such as by modifying the first and/or second timebars to correspond to portions of the alphabet rather than periods of time (e.g., to display multiple segments in the second timebar that each correspond to a distinct letter within a subset of letters from the alphabet, such as letters "C" to "H", the vowel letters, etc.). Various other types of metadata for content may similarly be used to group the content in other manners for organization and manipulation in the GUI, such as to group content hierarchically or based on other relationships between pieces of content if such relationships exist (e.g., based on a set of related photos from a single event or shoot, which may be one of many sets that are each associated with a higher-level organization or event), to group content based on genre or other categorization (e.g., for photos, images or video content, based on the device used to create the content, on the person who created the content, on a source from which the content was acquired, on subject matter of the content, on file size, on black-and-white versus color, on number of pixels or frames-per-second or other measure of resolution, on display size of the content, on use restrictions on the content, etc.), or to more generally group the content based on any other parameter or combination of types of parameters.

Figure 31:
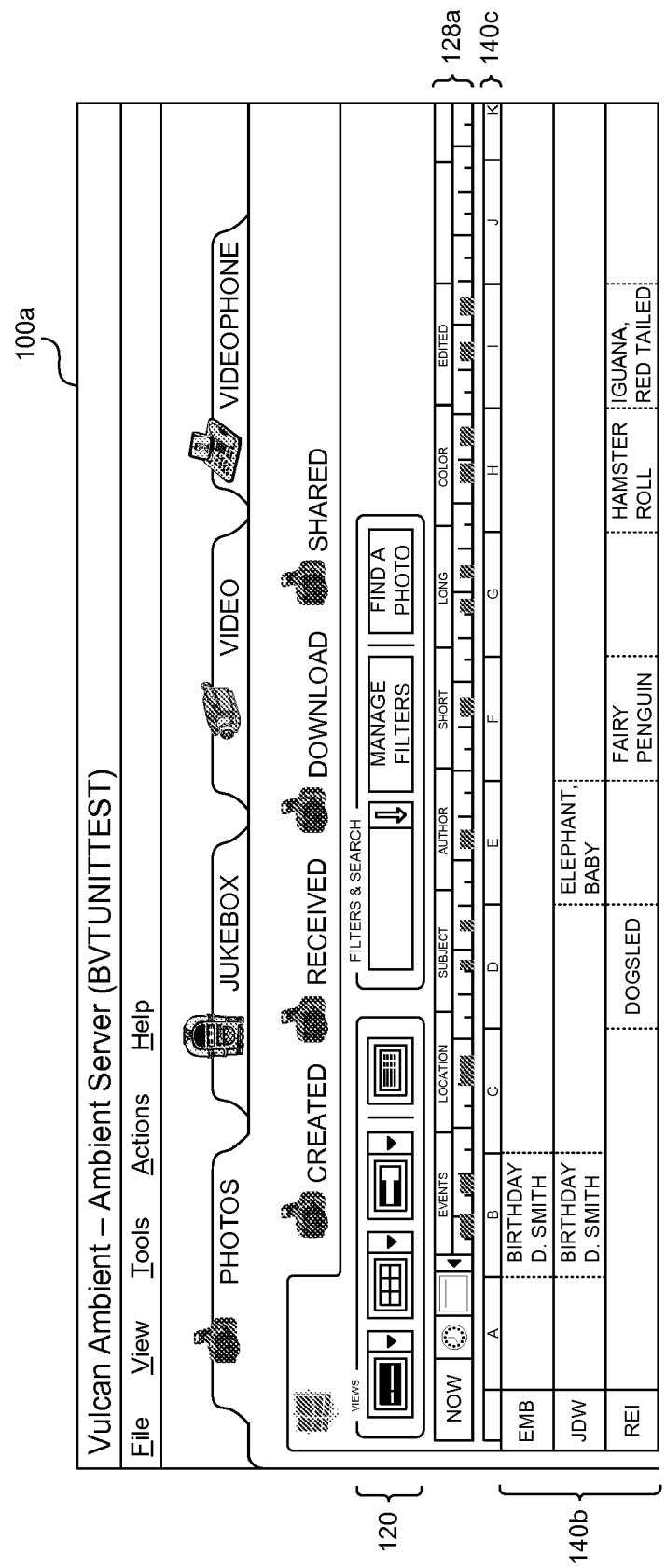

FIG. 31 illustrates an example GUI similar to that discussed with respect to FIGS. 29 and 30, but with content (in this example photos) being organized and managed using content metadata in a manner other than based on time. In particular, in the example illustrated portion 100a of a GUI, photo sets are organized and managed in an alphabetical manner, with a second "alphabet" bar 140c replacing the previously illustrated second timebar, and with the photosets indicated in the view area portion 140b being indexed alphabetically. In some embodiments, various types of content metadata may be selected to be used as the basis for the indicating (e.g., title, author, description, etc.), such as via corresponding secondary content-type-specific navigation tabs 115 (not shown) or analogous tertiary content-type-specific navigation tabs (not shown). In the illustrated embodiment, the previously illustrated first timebar has been replaced with a first "metadata type" bar 128a, such as for use in selecting a metadata type and/or in displaying graphical indicators for content in metadata type areas to which the content corresponds (e.g., in response to a filter that is applied, not shown). Photos may similarly be organized and managed in a variety of ways other than alphabetically or by time (e.g., based on hierarchical and/or other associated between photos and photosets), and other types of content can be handled similarly.

In a similar manner, but while not illustrated here, in some embodiments the GUI could be used to control a variety of devices, such as one or more STBs, one or more DVRs, one or more TVs, one or more of a variety of types of non-TV content presentation devices (e.g., speakers), etc. Thus, in at least some such embodiments, the GUI could be used to concurrently play a first specified program on a first TV, play a second specified program on a second TV, play first specified music content on a first set of one or more speakers, play second specified music content on a second set of one or more speakers, present photos or video on a computing system display or other TV, etc. When multiple such devices are being controlled, they could further be grouped and organized in a variety of ways, such as by location and/or by type of device (or type of content that can be presented on the device). In addition, the virtual remote control buttons displayed in the GUI could change based on a current context, such as on the device that is currently being controlled and/or based on content that is currently selected. In addition, extended controls of a variety of types beyond those discussed in the example embodiment (e.g., channel up and down, volume, a keyboard, device-specific controls, etc.) could additionally be provided via the GUI in at least some embodiments. Moreover, in at least some embodiments all of the controls of the GUI may be selectable by one or more of a variety of input device types, such as all being selectable by keyboard, by voice command, by mouse, etc.

In addition, in some embodiments multiple pieces of content can be simultaneously selected and acted on in various ways, such as to schedule multiple selected TV programs to be recorded or deleted, to group the pieces of content together for future manipulation, etc. Moreover, in some embodiments multiple users may interact with the same copy of the CM system, and if so various user-specific information (e.g., preferences, custom filters, prior searches, prior recordings or viewings of programs, information for user-specific recommendations, etc.) may be stored and used to personalize the GUI and its information and functionality for specific users. In addition, in embodiments in which the CM system is interacting with an external program, such as via an STB or DVR that has its own user GUI (e.g., one that is displayed to users on a television), additional integration between the CM system and the STB or DVR may be possible, such as to include user-selectable links or other references in the GUI of one of the systems to the other system (e.g., to allow a user to select the CM system from a menu or other information displayed to a user by an STB or DVR). A variety of other types of related functionality could similarly be added, including various manners in which one or more remote devices (e.g., a media center) may initiate communications or other interactions with the CM system (e.g., based on events that occur on a remote device that are communicated to the CM system, such as system-generated events by a media center device and/or by a user (whether the same or a different user than for the CM system) who is interacting with one or more remote devices (e.g., a TV being controlled by a media center). Similarly, the CM system may provide information to remote devices about events that occur for the CM system, such as user-initiated events at the computing device and/or at a remote/mobile device controlled by a user to interact with the CM system.

In addition, in at least some embodiments various management is provided for parental controls (whether such controls are implemented by the CM system and/or by one or more other devices being managed, such as a media center), such as to allow them to be view, turned off/on, and modified. For example, in at least some embodiments the display of various types of information may be limited or otherwise controlled based on such controls, such as to modify the displayed channel list (whether on the GUI of the CM system and/or via information presented by another device being controlled, such as information displayed on a television by a media center). In addition, in at least some embodiments such parental controls may be controlled in a distinct manner for different devices, such as to specify distinct controls for distinct televisions (also referred to as being on a "per head" basis).

In addition, the first timebar may be controlled in various manners in various embodiments. For example, arrows on the right and left of the first timebar may be provided to allow the user to control the first time period of the first timebar or to otherwise modify the viewable area of the first timebar, and further to move the "thumb" within that viewable area, or to instead modify the viewable area of the first timebar by dragging the thumb to the far right or far left of the first timebar to cause the first time period to change. In such embodiments, the thumb may stay where it is left, with the second time period for the second timebar being adjusted accordingly to reflect the new selected time. Alternatively, the "thumb" display may be maintained in one position (e.g., the center), with a pull on it (e.g., to the right or left) causing it to temporarily move at least slightly and the first time period to slide accordingly until a desired current start time becomes visible. When the user halts the pulling, the "thumb" then returns to the original position, while the first time period is changed such that the new start time is in place under the thumb and the second time period of the second timebar is updated accordingly. A variety of similar types of manipulations may be used in other embodiments.

Thus, as discussed below, the previously described example GUI of an embodiment of the CM system provides a variety of types of content information and content manipulation functionality. The following is a summary of the capabilities of an example embodiment of the GUI, which in this example embodiment provides various types of information and functionality for television-related content.

A. The View Control Area
  a. Available Views For TV Programming Content
    Guide (provides a guide-based experience with the channels listed at left and time on the horizontal axis)
    Icon (provides an icon-based view that displays as many Channel Icons as possible for quick visual recognition and selection)
    Channel (provides a look ahead for a selected channel, and maintains the "time ahead" state while moving across channels)
    List (as a grouped, ordered list, and does not use the Navigation/Timebar as it displays information from the entire 2 week period, and not just at a specific point in time)
  When switching between views, typically maintain any filter or search criteria.
  b. Filters
  May allow a filter to be applied to any view of TV Programming
    May provide some default filters, such as to associate a first color with Sports and another with Movies
      May allow a user to associate or disassociate a highlight color with a default filter
    Create, edit or delete a number (e.g., up to 20) of custom filters, such as based on the following attributes
    Example metadata attributes for use as types of criteria:
      Keyword
      Title
      Cast/Crew
      Genre
      Channel (Name or Number)
      Star Rating
      MPAA or TV Rating
      First run
      HDTV
      Audio
        CC
        DVS
        SAP/ESP
        Surround sound
      Previously recorded (On disk, Watched, deleted)
    Pay Per View
    On Demand
  c. Quick Search
  May provide a Quick Search capability that allows searches on basic criteria
    Example criteria:
      Keyword
      Cast/Crew
      Genre
      Hide Repeats
      HDTV Pay Per View
On Demand
  If a filter or previous search is applied when the user invokes the Quick Search interface, may auto-populate the fields with any attributes from the filter that match the fields available in the Quick Search.
  If an applied filter contains attributes that are not covered by the Quick Search, such as MPAA rating, then when the Quick Search is populated, they are not included. Likewise, if the user changes the criteria (by adding, editing, or removing attributes in the Quick Search interface) and then saves this group of criteria as a new Filter, it will only include Quick Search fields.
  Save search criteria as a custom filter
d. Advanced Search
May provide an Advanced search that allows searches on any Criteria
  Example Criteria
    Keyword
    Title
    Cast/Crew
    Genre
    Channel (Name or Number)
    Star Rating
    MPAA or TV Rating
    Hide repeats
    HDTV
    Audio
    CC
    DVS
    SAP/ESP
    Surround sound
      Previously recorded (On disk, Watched, deleted)
    Pay Per View
    On Demand
  Allow search criteria to be saved as a custom filter
  If a filter or previous search is applied when the user invokes the Advanced Search interface, may auto-populate the fields with any attributes from the filter that match the fields available in the Quick Search.
e. Search History
May provide a way to view past searches.
May provide a way to select a past search and to search using those search criteria.
  May allow only one search to be selectable at a time.
  Double click on a past search to run the selected search.
  Press the "Apply Button" to run the selected search.
  Press the "Save Button" to save the selected search as a custom filter
  Press the "Clear Button" to display the complete dataset
  Press the "Close" button to close the search interface and return to the complete dataset
f. First Timebar
May provide a way to navigate through time (For Guide, Icon, and Channel Views), such as to:
  Jump to a day
  Jump to a time
  Jump to the current date and time
  Change the displayed time scale between hours and days
  Visually present filter or search results over time (e.g., for highlighting recordings in the Scheduled Recordings area, or for photos)
  Visually present two weeks of program data.
  Enable navigation between a Y hour block of programming that is "on now" and the end of two weeks of program data.
  Visually indicate where "on now" is in the context of two weeks of program data.
  Timebar UI Element behavior:
    Keep the date/time indicator (thumb) on the same date and time (i.e. the thumb moves with the selected date)
    The date/time indicator (thumb) actually disappears out of the visible bounds of the timebar—to preserve the selected date and time—since the selected date time is out of the visible bounds.
g. Other:
  if adding "on now" when the user is viewing the Guide, Channel, or Icon view, snapping back to "On Now" is appropriate and desirable.
2. The Scheduled Recordings Tab
The Scheduled Recordings Tab offers functionality similar to other tabs, except that it is filtered to only show those programs that are scheduled to record.
3. The Recorded Content Tab
The Recorded Content Tab is different in that it may only have a modified List view, although filtering and searching may remain the same.
B. The Detail Area
  1. Capabilities
    Display detailed information about a selected show, including (but not limited to) the title, description, rating information, and channel information.
    Display and enable actions that are appropriate for the state of a selected show.
    Use criteria of the selected show to find other shows with the same criteria
      Indicate which fields can be used
      Optionally allow only fields and values that are available in the Quick Search to be used
      Populate the Quick Search with the new criteria
      Display the Quick Search (if it is not already displayed)
      Replace all previous criteria with the new criteria
      Give focus to the Apply action but do not apply the search yet
      a. Data Elements
Below are examples of data fields.

| Channel Number | Station Icon/Logo | Title: SubTitle StarRating (ReleaseYear) | [action] |
| | | EpisodeTitle: Description (IsRepeat) | [action] |
| | | Actors (4 max), Director, CastCrew (1) | |
| | | AirTime - EndTime (Duration) | |
| Callsign | Affiliate (if no affiliate, then Channel/Network name) | Genre (s), SubGenre(s) | |
| | | MPAARating/ParentalRating/ExpandedParentalRating/ExpandedRating CountryOrigin | |
| | | IsStereo, IsJoinedInProgress, IsCableInTheClassroom, IsSap, IsEnhanced, IsThreeD, IsLetterbox, IsHdtv, IsDolby, IsDvs, IsClosedCaptioned, IsSubtitled | |
| | | IsRecorded/IsToBeRecorded | | b. Buttons & Actions
Below are examples of states of a program and buttons that are applicable for each state.

| Action | Previously Recorded | On Now, Not Recording | On Now, Recording | Future, Unscheduled | Future, Scheduled Program | Future, Scheduled as Series |
|---|---|---|---|---|---|---|
| Watch | | ✓ | ✓ | | | |
| Play | ✓ | | | | | |
| Record Once | | ✓ | | ✓ | | |
| Record Series | | ✓ | | ✓ | ✓ | |
| Cancel Recording | | | ✓ | | ✓ | ✓ |
| Delete | ✓ | | | | | |

C. The View Area
  1. Capabilities
    Can List Programs
      Over Time
        At a given date/time
        In a date/time range
      In a specific state
      With specific criteria
        That match search or filter criteria
    Can Differentiate between programs
      Highlight based on criteria (filter)
      Indicate state
        Recorded
        On Now (not recording)
        Currently recording
        In the future
        Scheduled to record (single/series)
      Denote selection
        Focus
        Selection
    Can Act on program
      Get more information (e.g., from a third-party)
      Watch/Play
      Schedule to Record
    Can Provide different views of programs
      Guide—programs on channels over time
      Icon—scan icons visually
      Channel—looking forward on a channel
      List—list/sort/group
    Can Change between Views
    Can Adjust the granularity of information
      Small—channel and title
      Medium—more info
      Large—detailed
    Can Associate a level of granularity on a per view basis
  2. Views
There are four views. The first three, Guide, Icon, and Channel, are dependant on a specific point in time and use that as a starting point. The List view is a list of programs that can be sorted and grouped, and is not dependant on a specific time—rather it lists all the live and upcoming programs. As a user transitions from one view to the next, the time in the first timebar remains constant (even when the user goes to and from the List View), as does the program in the detail area.
    a. Guide View
The guide view presents programs in the context of channel and time.
    If a filter or search is applied, only channels with programs that match the criteria in the viewable time range should display.
    Programs that are on a channel but do not meet the filter or search criteria should be de-saturated.
    If there are no programs in the viewable time range that match the criteria on any channel when a filter or search is applied, a message could be displayed to communicate this to prevent a blank screen from being shown.
    b. Icon View
The Icon view presents programs that are on at a specific (e.g., ½ hour) point in time. It allows users to recognize channels visually by their logos, and then to determine what program is associated with that channel.
    If a channel has more than one program on in the selected ½ hour, both programs may display.
    Only programs (and therefore channels) with a program on in the specific point of time will display.
    If there are no programs in the viewable time range that match the criteria when a filter or search is applied, a message could be displayed that communicates this.
    c. Channel View
The Channel view shows not only what programs are on at a specific time, but also what is coming up on a specific channel.
    The right hand column displays shows on the same channel as the selected program/channel in the left-hand column.
    The first show in the right hand column can be, by default, the show that's on right after the highlighted show in the left-hand column.
    When a filter or search is applied, only those channels for which there are results somewhere in the 2 weeks of program data may be listed.
    If, when a filter or search is applied, a channel with a result in the future doesn't have a program that matches the current date/time indicated in the time-bar, then it should still display the title of the program on at the indicated date/time, but it could be de-saturated.
    When a filter or search is applied, the subset of channels could display even if the only programs that fit the criteria are chronologically before the place where the date/time indicator in the time-bar is.
    d. List View
The List View allows users to quickly sort and group by a variety of criteria. It is not dependant on a specific time, and the First Timebar is not shown.
    Default grouping can be by Title (ascending), and default sort can be chronological. If the user re-groups or re-sorts, the new sort/grouping may be maintained.
    Users can ungroup the list, and regroup it.
    User can select any column heading to group by that field. Each criteria has a default sort. The headings and default sorts are:
      Channel Number—Program Name, Air Time
      Channel Affiliate/Logo—Program Name, Air Time
      Program Name—Air Time Record Status (recording, scheduled, not scheduled)—Program Name, Air Time
Repeat—Program Name, Air Time
HDTV—Program Name, Air Time
Genre (ascending)—Program Name, Air Time
MPAA Rating—Program Name, Air Time
Star Rating—Program Name, Air Time
Air Time (ascending)—Program Name
Duration (ascending)—Program Name, Air Time
User can change the secondary and subsequent sorts by Shift-clicking a column. Shift-clicking the column again will reverse the sort.
e. Changes to the List view for the Recordings Tab:
The "AIRS" column is replaced with "RECORDED ON"
The "REC" column is renamed "STATUS" so that it can show the icon for "scheduled to be deleted", but it will show a similar type of data The default sort is by "RECORDED ON", and the increment will be the Day (e.g., Tues 3/20, Mon 3/19, etc.) in reverse chronological order, with the secondary sort (on the programs within a day group) of time (reverse chronological). Thus, the last thing recorded will be at the top of the first group.

A "VIEWED" column may also be provided.

3. Levels of Granularity

The Guide, Icon, and Channel views can be set to one of three size "resolutions". Small displays more individual listings, but the least amount of information about each. Large displays the most information about each, but displays fewer individual listings. It is preferable to show Episode Title for sports events in all resolutions.

| Data Element (included in Detail Area) | Guide | | | Icon | | | Channel (L Column) | | | Channel (R Column) | | |
|---|---|---|---|---|---|---|---|---|---|---|---|---|
| | S | M | L | S | M | L | S | M | L | S | M | L |
| Channel Number | ✓ | ✓ | ✓ | ✓ | ✓ | ✓ | ✓ | ✓ | ✓ | | | |
| Callsign | | ✓ | ✓ | | ✓ | ✓ | | ✓ | ✓ | | | |
| Station Icon/Logo | ✓ | ✓ | ✓ | ✓ | ✓ | ✓ | ✓ | ✓ | ✓ | | | |
| Affiliate (if no affiliate, then Channel/Network name) | | ✓ | ✓ | | ✓ | ✓ | | ✓ | ✓ | | | |
| IsRecorded/IsToBeRecorded | ✓ | ✓ | ✓ | ✓ | ✓ | ✓ | ✓ | ✓ | ✓ | ✓ | ✓ | ✓ |
| Title | ✓ | ✓ | ✓ | ✓ | ✓ | ✓ | ✓ | ✓ | ✓ | ✓ | ✓ | ✓ |
| SubTitle | | | ✓ | | | ✓ | | | ✓ | | | ✓ |
| StarRating | ✓ | ✓ | ✓ | ✓ | ✓ | ✓ | ✓ | ✓ | ✓ | ✓ | ✓ | ✓ |
| ReleaseYear | ✓ | ✓ | ✓ | ✓ | ✓ | ✓ | ✓ | ✓ | ✓ | ✓ | ✓ | ✓ |
| EpisodeTitle | | ✓ | ✓ | | ✓ | ✓ | | ✓ | ✓ | | ✓ | ✓ |
| Description | | | | | | | | | | | | |
| IsRepeat | | | | | | | | | | | | |
| Actors (4 max) | | | | | | | | | | | | |
| Director | | | | | | | | | | | | |
| Crew (1) | | | | | | | | | | | | |
| AirTime | | | | ✓ | ✓ | ✓ | ✓ | ✓ | ✓ | ✓ | ✓ | ✓ |
| EndTime | | | | | ✓ | ✓ | | ✓ | ✓ | | | ✓ |
| Duration | | | | | | | | | | | | |
| Genre (s) | | | | | | | | | | | | |
| MPAARating/ParentalRating | | | ✓ | | | ✓ | | | ✓ | | | ✓ |
| ExpandedParentalRating/ExpandedRating | | | | | | | | | | | | |
| CountryOrigin | | | | | | | | | | | | |
| IsStereo | | | | | | | | | | | | |
| IsJoinedInProgress | | | | | | | | | | | | |
| IsCableInTheClassroom | | | | | | | | | | | | |
| IsSap | | | | | | | | | | | | |
| IsEnhanced | | | | | | | | | | | | |
| IsThreeD | | | | | | | | | | | | |
| IsLetterbox | | | | | | | | | | | | |
| IsHdtv | | | ✓ | | | ✓ | | | ✓ | | | ✓ |
| IsDolby | | | | | | | | | | | | |
| IsDvs | | | | | | | | | | | | |
| IsClosedCaptioned | | | ✓ | | | ✓ | | | ✓ | | | ✓ |
| IsSubtitled | | | | | | | | | | | | |

D. Sidebar Control Area
  1. Capabilities
Display Program Info
  Program on TV now
  (Tuned or Playback of a Recorded Program)
  (may be the program that corresponds to the current point in the buffer, as the live buffer can contain multiple programs)
    Title
    Channel
    Start time (or "presentation time") & Duration
Display the Buffer/Recording
  Buffer/Recording length
  Place in Buffer/Recording
    Time marker
  Current Transport Control
  Beginning/End of Buffer
Provide Remote Control Buttons
  Transport Controls
  D-pad
  Status—List the following in chronological order (Channel, Title, Record Status & Start Time)
    Next three programs to be recorded
    Any programs that are currently recording
    Last three programs that were recorded
E. Input Devices
  Left-click should select a program such that it would both have focus and be selected. Using the arrow keys would move the focus around (maintaining the previously made selection) and Enter would select it.
F. Table of Functions
  The following table of functions takes a top-down approach to the GUI. Starting at the top and working toward the bottom, this table lists the location on the GUI of various controls, names of the GUI element, and how they function.

| Location on GUI | Name of GUI element | Function |
| --- | --- | --- |
| Primary Navigation tabs | User interface appears for first time | When the GUI first appears, the default screen is Live TV, Guide View. |
| Primary Navigation tabs | TELEVISION tab | When the user clicks the TELEVISION tab, the default screen is Live TV, Guide View. |
| Secondary Navigation tabs | LIVE TV tab | When the user clicks the LIVE TV tab, the Guide View screen appears. |
| View Control area, on the Toolbar | Guide View button | Click the Guide View button to display a TV Guide-like grid of program bubbles. |
| View Control area, on the Toolbar | Guide View button drop-down menu | Click the arrow next to the Guide View button to display the menu. Menu selections are small, medium, or large. If you select Small, the program bubbles in the TV grid will show only the program title. By selecting Medium, the program bubbles expand to display information about the programs. By selecting Large, the program bubbles expand to display the maximum amount of information about the programs. |
| View Control area, on the Toolbar | Icon View button | Click the Icon View button to display a grid of channels by channel icon. |
| View Control area, on the Toolbar | Icon View button drop-down menu | Click the arrow next to the Icon View button to display the menu. Menu selections are small, medium, or large. If you select Small, the maximum number of channel icons will appear. By selecting Medium, fewer channel icons appear. However, the expanded channel icons display the name of the programs per channel. By selecting Large, the program bubbles expand to a size greater than medium. |
| View Control area, on the Toolbar | Channel View button | Click the Channel View button to display a list of programs by channel. On the right side is the Channel Paddle area which lists upcoming programs based on which channel is selected. Use the Channel Paddle buttons to scroll forward and backward in time. |
| View Control area, on the Toolbar | Channel View button drop-down menu | Click the arrow next to the Channel View button to display the menu. Menu selections are small, medium, or large. |
| View Control area, on the Toolbar | Browse button | Click the Browse button to display a list of channels. Each channel has an Expand button next to it that, when clicked, displays a list of upcoming programs. The First Timebar does not display when this view is active. |
| View Control area, on the Toolbar | Filters drop-down menu (see below) | All is the default selection. See below for the other filters. |
| Filters drop-down menu | All (No Filter) | Click All to display all of the programs. |

| Location on GUI | Name of GUI element | Function |
|---|---|---|
| Filters drop-down menu | Movies | Click Movies to display programs that are categorized as movies. |
| Filters drop-down menu | Sports | Click Sports to display programs that are categorized as sports. |
| Filters drop-down menu | News | Click News to display programs that are categorized as news. |
| Filters drop-down menu | Music | Click Music to display programs that are categorized as music. |
| Filters drop-down menu | Kids | Click Kids to display programs that are categorized as child-oriented. |
| Filters drop-down menu | Custom Filters . . . | Click Custom Filters . . . to open the Filter Wizard. |
| View Control area, on the Toolbar | Manage Filters | Click Manage Filters to open the Filter Wizard. |
| View Control area, on the Toolbar, in the Search Control area | Find a Program button | Click Find a Program to open the Search Control area. |
| Search Control area | Quick Search tab | The Quick Search tab appears by default. To use Quick Search: In the Look for text box, type what you are looking for, for example, actor Tom Cruise. In the Genre text box, type a genre or select one from the drop-down menu. Click Apply. If any programs featuring Tom Cruise are on or upcoming, the listing will appear in the main content area of the UI. List of Genres: Action Adults Only Adventure Animals Animated Anime Anthology Auto racing Basketball Biography Bus./financial Children Comedy Comedy-drama Computers Cooking Crime Crime drama Docudrama Documentary Drama Educational Entertainment Event . . . |
| Search Control area | Quick Search tab area buttons and boxes: | |
| Quick Search tab area buttons and boxes: | Hide Repeats box | Click the box next to Hide Repeats to block repeated programs from being displayed in the main content area. |
| Quick Search tab area buttons and boxes: | HDTV box | Click the box next to HDTV to include programs offered in HDTV. |
| Quick Search tab area buttons and boxes: | Apply button | Click Apply to display results in the main content area. |
| Quick Search tab area buttons and boxes: | Clear button | Click Clear to clear search criteria. |
| Quick Search tab area buttons and boxes: | Save button | Click Save to save search criteria. You will be prompted to name this as a new filter. |
| Quick Search tab area buttons and boxes: | Close button | Click Close to close the Search Control area. |

| Location on GUI | Name of GUI element | Function |
|---|---|---|
| Advanced Search boxes and buttons | Find all programs box, which contains multiple check boxes of search criteria rules. | Click one or many check boxes in the Find all programs: box. The selected search rule(s) will be added to the Search rules description: box. |
| Find all programs box in the Advanced Search tab | That belong to the <specific genres> genre | Click the That belong to the <specific genres> genre check box. The rule appears in the Search rules description box.<br>Click <specific genres> in the Search rules description box to open the Genre Filter box.<br>In the Genre Filter box, select one or many genres.<br>Click the > arrow.<br>Click OK. The genre(s) you selected become part of the search criteria.<br>You can change the search criteria at any time by clicking the blue underlined text in the rule you want to change, then modifying the filter that opens. |
| Find all programs box in the Advanced Search tab | That feature <people> in the cast and crew | Click the That feature <people> in the cast and crew check box. The rule appears in the Search rules description box.<br>Click <people> in the Search rules description box to open the Cast and Crew Filter box.<br>In the Add new text box, type the name of the cast or crew member you want to search for. Click Add.<br>Repeat steps three and four if you searching for more than one person.<br>Click OK. Any names you add become part of the search criteria.<br>You can change the search criteria at any time by clicking the blue underlined text in the rule you want to change, then modifying the filter that opens. |
| Find all programs box in the Advanced Search tab | That are rated <rating> | Click the That are rated <rating> check box. The rule appears in the Search rules description box.<br>Click <rating> in the Search Rules description box to open the Parental Rating Filter box.<br>In the Select all programs with a parental rating drop-down menu, select no higher than or no lower than.<br>In the Movies drop-down menu, select G, PG, PG-13, R, or NC-17.<br>In the Television drop-down menu, select TVY, TVY7, TVY7FV, TVG, TVPG, TV14, or TVMA.<br>Click the check box next to Exclude unrated programs to prevent unrated programs from appearing in the guide.<br>Click OK. The ratings you add become part of the search criteria.<br>You can change the search criteria at any time by clicking the blue underlined text in the rule you want to change, then modifying the filter that opens. |
| | That have a <stars> star rating | Click the That have a <stars> star rating check box. The rule appears in the Search rules description box.<br>Click <at least a 0.0> in the Search Rules description box to open the Star Rating Filter box.<br>In the first All programs with a star rating drop-down menu, select equal to or at least.<br>In the second All programs with a star rating drop-down menu, select 0 through 4.<br>Click OK. The star rating you add becomes part of the search criteria.<br>You can change the search criteria at any time by clicking the blue underlined text in |

-continued

| Location on GUI | Name of GUI element | Function |
|---|---|---|
| | | the rule you want to change, then modifying the filter that opens. |
| | Appearing on <channel> | Click the Appearing on <channel> check box. The rule appears in the Search rules description box.<br>Click <channel> in the Search rules description box to open the Channel Filter box.<br>In the Available Channels list, select one or more channels. Use Shift + click or CTRL + shift to select multiple channels.<br>Click the > arrow to add channels to the Selected Channels list.<br>Click OK. The channels you add become part of the search criteria.<br>You can change the search criteria at any time by clicking the blue underlined text in the appropriate rule, then modifying the filter that opens. |
| | With <specific words> in the title | Click the With <specific words> in the title check box. The rule appears in the Search rules description box.<br>Click <specific words> in the Search rules description box to open the Title Filter box.<br>In the Add new text box, type the words or phrases you want to search for. Click Add.<br>Repeat steps three and four if you searching for more than one term.<br>Click OK. Any terms you add become part of the search criteria.<br>You can change the search criteria at any time by clicking the blue underlined text in the rule you want to change, then modifying the filter that opens. |
| | With <specific words> in the description | Click the With <specific words> in the description check box. The rule appears in the Search rules description box.<br>Click <specific words> in the Search rules description box to open the Description Filter box.<br>In the Add new text box, type the words or phrases you want to search for. Click Add.<br>Repeat steps three and four if you searching for more than one term.<br>Click OK. Any terms you add become part of the search criteria.<br>You can change the search criteria at any time by clicking the blue underlined text in the rule you want to change, then modifying the filter that opens. |
| | That are not repeats | Click the That are not repeats check box. The rule appears in the Search rules description box and becomes part of the search criteria. |
| | That are HDTV | Click the That are HDTV check box. The rule appears in the Search rules description box and becomes part of the search criteria. |
| | That have <audio-visual options> | Click the That have <audio-visual options> check box. The rule appears in the Search rules description box.<br>Click <audio-visual options> in the Search rules description box to open the Audio-Video Filter box.<br>Select Closed Captioned, DVS, SAP/ESP, Stereo, or Subtitled. Click OK. Any of the audio-visual options you add become part of the search criteria.<br>You can change the search criteria at any time. Click the blue underlined text in the rule you want to change, then modify the filter that opens. |
| Advanced Search buttons | Apply button | Click Apply to display results in the main content area. |
| Advanced Search buttons | Clear button | Click Clear to clear search criteria. |

-continued

| Location on GUI | Name of GUI element | Function |
| --- | --- | --- |
| Advanced Search buttons | Save button | Click Save to save search criteria. You will be prompted to name this as a new filter. |
| Advanced Search buttons | Close button | Click Close to close the Search Control area. |
| Search History tab boxes and buttons | Select a search and click Apply box | This box displays all of the prior search criteria. |
| Search History tab boxes and buttons | Apply button | Clicking Apply performs the selected search. |
| Search History tab boxes and buttons | Clear button | Clears search criteria. |
| Search History tab boxes and buttons | Save button | Clicking Save opens Save as Filter box. |
| Search History tab boxes and buttons | Close button | Click Close to close the Search Control area. |
| First Timebar | Now button | Click the Now button to display programs playing now. |
| First Timebar | Hour View button | Click the Hour View button to display the timebar in hour increments. |
| First Timebar | Day View button | Click the Day View button to display the timebar in day increments. |
| First Timebar | Scroll left arrow | Click the left scroll arrow to scroll back in time. The stopping point is the current time in this example embodiment. |
| First Timebar | Thumb | Click and hold the thumb to move back and forward in time. |
| First Timebar | Time span | Viewed either in hour or day increments. |
| First Timebar | Scroll right arrow | Click the right scroll arrow to move forward in time. The stopping point is two weeks from the current time in this example embodiment. |
| Details area | Default is for this area to be expanded | |
| Details area | Watch Now button | |
| Details area | Record One Time button | |
| Details area | Record Series button | |
| Details area | Hide Details arrow | |
| Main content area | Program info bubble | Left-click to select, right-click to open drop-down menu that displays "Watch Now," "Record Once," "Record Series," "Alert," and "View Size" shortcuts. |
| Sidebar | On Now window | |
| Sidebar | Buffer | |
| Sidebar/ Transport Controls | Live button | |
| | TKR button device-specific button Navigation buttons Replay button Skip button Rewind button Play button Forward button Rec button Pause button Stop button Channel up/down Star * Menu button | |

| Location on GUI | Name of GUI element | Function |
|---|---|---|
| Sidebar/Recorder Status area | Currently Recording Upcoming Recording Recent Recordings | Shows the last three programs that were recorded, date of recording and length of program. |
| Sidebar | | Display Program Info Program on TV now (Tuned or Playback of a recorded program) (typically is the program that corresponds to the current point in the buffer, as the live buffer can contain multiple programs) Title Channel Start time & Duration Display the Buffer/Recording Buffer/Recording length Place in Buffer/Recording Time marker Current Transport Control Beginning/End of Buffer Provide Remote Control Buttons Transport Controls D-pad Status - List the following in chronological order (Channel, Title, Record Status & Start Time) Next three programs to be recorded Any programs that are currently recording Last three programs that were recorded |

G. Table of Functions for Mouse/Touchpad/Eraserhead

| Mouse/Touchpad/Eraserhead | Function | Notes |
|---|---|---|
| Mouse-overs | Display tool tips and/or shortcut key combos | |
| Left-Click | Left-click should select the program, so it would both have focus and be selected. Using the arrow keys would move the focus around (maintaining the previously made selection) and Enter would select it. | |

H. Table of Functions for Keyboard

| Key | Function | Notes |
|---|---|---|
| Tabbing Arrow Keys | Navigates from program bubble to program bubble. Using the arrow keys moves the focus around (maintaining the previously made selection). | |
| Enter | Enter selects the program that has the focus. | |
| Ctrl+ . . . | Used in shortcut key combos for view control buttons and to open find a program box. | |

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In addition, the described techniques are applicable to architectures other than a set-top box architecture or architectures based upon the MOXI™ system. For example, an equivalent system and applications can be developed for other DVRs and STBs. The methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.) able to receive and record such content.

In the description, numerous specific details have been given to provide a thorough understanding of embodiments. The embodiments can be practiced without one or more of the specific details, or with other methods, components, materials, etc. In other instances, well-known structures, materials,

What is claimed is:

1. A method for a computing device to present information about multimedia content via a graphical user interface, wherein different types of information related to the multimedia content are simultaneously displayed, the method comprising:
receiving metadata information for each of multiple indicated pieces of multimedia content that are each associated with at least one time-related characteristic, and that each satisfy a search request of multimedia content;
determining a selected period of time;
determining which of the indicated pieces of multimedia content have associated time-related characteristics that correspond to the selected period of time, and which of the indicated pieces of multimedia content have associated time-related characteristics that do not correspond to the selected period of time; and,
displaying to a user of the computing device a graphical user interface having information about pieces of multimedia content available for presentation, and wherein the displayed graphical user interface includes:
a first timebar that represents a first period of time, wherein the first timebar includes:
indications of times outside the selected period of time,
multiple index marks corresponding to units of time for the first period of time, and
a graphical indicator representing a future occurrence of multimedia content for each of one or more of the indicated pieces of multimedia content that have associated time-related characteristics that do not correspond to the selected period of time, wherein each of the graphical indicators is displayed on the first timebar at an index mark corresponding to an associated time-related characteristic of an indicated piece of multimedia content, and wherein each of the graphical indicators is selectable by the user to display information for the associated piece of multimedia content;
a second timebar that represents a second period of time, wherein the second period of time is shorter than the first period of time, and wherein the second timebar includes:
indications of multiple segments of time during the selected period of time; and
a region associated with the second timebar that includes:
at least some of the received metadata information for one or more of the indicated pieces of multimedia content that have associated time-related characteristics that correspond to the selected period of time.

2. The method of claim 1 wherein the pieces of multimedia content include any one or combination of music, photograph, image, video, advertisement, news clip, presentation, article, videogame, and Internet content,
wherein the associated time-related characteristic of the pieces of multimedia content is one of a record date and time-of-day, a release date and time-of-day, a broadcast date and time-of-day, a receipt date and time-of-day, a creation date and time-of-day, a revision date and time-of-day, and a download date and time-of-day, and
wherein the pieces of multimedia content include pieces of multimedia content from multiple multimedia content sources, and wherein the received metadata information includes information for each of the pieces of multimedia content that includes a title and genre and one or more people associated with the pieces of multimedia content.

3. The method of claim 1, further comprising receiving one or more indications from the user of one or more criteria that can be related to at least one piece of multimedia content of interest, and
wherein the multiple indicated pieces of multimedia content are selected such that each of the multiple indicated pieces of multimedia content satisfy the indicated criteria, so that the graphical indicators displayed in the first timebar reflect pieces of multimedia content that satisfy the indicated criteria.

4. The method of claim 3 wherein the indicated criteria include one or more of a specified title value, a specified date value, a specified associated person value, a specified text value, a specified relationship value, a specified alphabetical value, a specified rating value, or a specified categorization value, including a value that pertains to at least one of a genre, a device used to create the content, a person who created the content, a source from which the content was acquired, a subject matter of the content, a file size, a color, a number of pixels, a frame rate, a measure of resolution, a display size of the content, and a use restriction on the content.

5. The method of claim 4, further comprising:
modifying the graphical user interface in a manner that:
the first timebar has indications that are different than the indications of time and that represent at least one of the indicated criteria,
the second timebar includes indications that are subsets of the indications of the first timebar that represent the at least one of the indicated criteria, and
the region associated with the second timebar presents metadata information for pieces of multimedia content that correspond to the indications of the second timebar and that have been organized and manipulated by the user based on at least one of the indicated criteria.

6. The method of claim 5 wherein the metadata information presented by the region associated with the second time bar is presented according to a hierarchical relationship between the metadata information.

7. The method of claim 1, further comprising providing status information pertaining to at least one of the indicated pieces of multimedia content, and
wherein providing the status information includes providing status information associated with multiple devices that respectively control presentation of the indicated pieces of multimedia content, at least some of the multiple devices being associated with different multiple first timebars on the graphical user interface, each first timebar further being associated with a second timebar that can be displayed simultaneously with their associated first timebar, the second time bar having indications that are subsets of the indications of their associated first timebar.

8. The method of claim 1, further comprising displaying the metadata information for pieces of multimedia content that have time-related characteristics corresponding to the selected period of time or of the at least some pieces of multimedia content that have time-related characteristics that do not correspond to the selected period of time in a similar manner for similar multimedia content types and in a different manner for different multimedia content types.

9. The method of claim 1 wherein the graphical indicators included in the first timebar are displayed in such a manner as to have differing appearances, and wherein the appearance of each graphical indicator is specified so as to indicate a status of the indicated piece of multimedia content relative to one or more statuses of other indicated pieces of multimedia content.

10. The method of claim 9 wherein the differing appearances of the graphical indicators include variations in one or more of width, color, height, shape, saturation, hue, and brightness.

11. The method of claim 9 wherein the status of an indicated piece of multimedia content is related to at least one of a degree of relevance of the piece of content, a rating of the piece of content, and a priority of the piece of content.

12. The method of claim 1 wherein at least some of the indications of times in the first timebar are each user-selectable, the method further comprising:
receiving an indication of a selection by the user of one of the user-selectable indications of time in the first timebar;
selecting a new period of time based on the selected time indication; and
updating the indications of multiple segments of time in the second timebar displayed graphical user interface to reflect the selected new period of time, including updating at least some of the received metadata information included in the region associated with the second timebar for one or more of the indicated pieces of multimedia content whose associated time-related characteristic correspond to the selected new period of time.

13. The method of claim 1 wherein the indicated times for the first timebar represent a first time period and wherein the selected period of time is a second distinct time period that is selected as a subset of the first time period,
wherein the displayed graphical user interface further includes a region associated with the second timebar that includes indications of multiple multimedia content sources,
wherein the indicated pieces of multimedia content that have associated time-related characteristics that correspond to the selected period of time include pieces of multimedia content from the multiple multimedia content sources whose associated time-related characteristics correspond to one of the multiple segments of time during the selected period of time, and
wherein the at least some of the received metadata information that is included in the region associated with the second timebar in the displayed graphical user interface is displayed in a grid format within the region associated with the second timebar and includes detail information for each of the one or more indicated pieces of multimedia content.

14. The method of claim 1 wherein, for each of at least one of the graphical indicators included on the displayed first timebar, the graphical indicator is displayed on the first timebar in such a manner as to correspond to multiple distinct pieces of multimedia content whose associated time-related characteristics overlap, and
wherein, for one or more of the at least one graphical indicators, the graphical indicator is displayed so as to have an appearance that indicates a quantity of the multiple distinct pieces of multimedia content to which the graphical indicator corresponds.

15. The method of claim 1 wherein the displayed graphical user interface further includes one or more user-selectable controls corresponding to a time scale for the first timebar, and wherein the method further comprises:
receiving an indication of a selection by the user of one of the user-selectable controls;
selecting a new time scale for the first timebar based on the selection of the user-selectable control, wherein the new time scale represents time using one of hours, days, weeks and months, and wherein a prior time scale of the first timebar represented time using a different one of hours, days, weeks, and months; and
updating the displayed graphical user interface to reflect the new time scale, the updating including changing at least some of the graphical indicators for indicated pieces of multimedia content that are included on the first timebar.

16. The method of claim 1 wherein the indications of times included in the first timebar are part of a first time period represented by the first timebar, wherein the displayed graphical user interface further includes one or more user-selectable controls for use in changing the first time period represented by the first timebar, and wherein the method further comprises:
receiving an indication of a selection by the user of one of the user-selectable controls;
adjusting the first time period for the first timebar based on the selection of the user-selectable control; and
updating the displayed graphical user interface such that the first timebar includes indications of times corresponding to the adjusted first time period.

17. The method of claim 16 wherein the selected period of time is a subset of the first time period, wherein the adjusting of the first time period includes modifying the selected period of time, and wherein the method further comprises: updating the displayed graphical user interface to include at least some of the received metadata information for each indicated piece of multimedia content whose associated time-related characteristic occurs during the modified selected period of time.

18. The method of claim 1, wherein the method further comprises, after receiving an indication of a selection by the user of one of the user-selectable graphical indicators in the first timebar, providing functionality related to one or more of the identified pieces of multimedia content associated with the selected graphical indicator.

19. The method of claim 1,
wherein the method further comprises, after receiving an indication of a selection by the user of one of the user-selectable graphical indicators in the first timebar, providing additional information related to one or more of the identified pieces of multimedia content associated with the selected graphical indicator, and
wherein the indication of the selection by the user includes one or more of a mouse-over and a mouse click.

20. The method of claim 1 wherein the multimedia content comprises television programs,
wherein an associated time-related characteristic is a presentation time at which an associated television program is available for presentation, wherein the method further comprises:
receiving an indication of a selection by the user of one of the user-selectable graphical indicators;
selecting a new period of time based on the selected graphical indicator; and
updating the indications of multiple segments of time in the second timebar displayed in the graphical user interface to reflect the selected new period of time, including updating at least some of the received metadata information included in the region associated with the second timebar for one or more of the indicated television programs whose associated presentation times occur during the selected new period of time.

21. A computing system configured to present information about multimedia content, wherein different types of information related to the multimedia content are simultaneously displayed, comprising:
a display; and
a content management system configured to present on the display a graphical user interface having information about pieces of multimedia content that each satisfy a search request of multimedia content, the presented graphical user interface including:
a first timebar that corresponds to a first time period, wherein the first timebar includes one or more graphical indicators corresponding to a future occurrence of one or more pieces of multimedia content that are each associated with a portion of the first time period that is outside of a second time period, and wherein each of the graphical indicators is selectable by the user to display information for the associated piece of multimedia content;
a second timebar that corresponds to the second time period, wherein the second time period is shorter than the first time period; and,
a second region that corresponds to the second time period, wherein the second region includes detail information for each of a plurality of pieces of multimedia content associated with the second time period,
so that detail information is displayed for pieces of multimedia content associated with the second time period and so that graphical indicators are displayed for at least some of the pieces of multimedia content associated with the first time period.

22. The computing system of claim 21 further comprising a device to control presentation of pieces of multimedia content on one or more presentation devices, and
wherein the presented graphical user interface further includes user-selectable controls to allow a user to control the presentation of certain pieces of multimedia content on the one or more presentation devices via instructions sent to the device.

23. The computing system of claim 21 wherein the content management system consists of a means for presenting on the display a graphical user interface having information about pieces of multimedia content, the presented graphical user interface including:
a first timebar that corresponds to a first time period, wherein the first timebar includes one or more graphical indicators corresponding to a future occurrence of one or more pieces of multimedia content that are each associated with a portion of the first time period that is outside of the second time period, and wherein each of the graphical indicators is selectable by the user to display information for the associated piece of multimedia content;
a second timebar that corresponds to the second time period; and,
a second region that corresponds to the second time period, wherein the second region includes detail information for each of a plurality of pieces of multimedia content associated with a second time period.

24. A non-transitory computer-readable storage medium whose contents enable a computing device to perform a method for presenting information about multimedia content via a graphical user interface, wherein different types of information related to the multimedia content are simultaneously displayed, the method comprising:
receiving metadata information for each of multiple indicated pieces of multimedia content that are each associated with at least one time-related characteristic that each satisfy a search request of multimedia content;
determining a selected period of time;
determining which of the indicated pieces of multimedia content have associated time-related characteristics that correspond to the selected period of time, and which of the indicated pieces of multimedia content have associated time-related characteristics that do not correspond to the selected period of time; and,
displaying to a user of the computing device a graphical user interface having information about pieces of multimedia content available for presentation, and wherein the displayed graphical user interface includes:
a first timebar that represents a first period of time, wherein the first timebar includes:
indications of times outside the selected period of time,
multiple index marks corresponding to units of time for the first period of time, and
a graphical indicator representing a future occurrence of multimedia content for each of one or more of the indicated pieces of multimedia content that have associated time-related characteristics that do not correspond to the selected period of time, wherein each of the graphical indicators is displayed on the first timebar at an index mark corresponding to an associated time-related characteristic of an indicated piece of multimedia content, and wherein each of the graphical indicators is selectable by the user to display information for the associated piece of multimedia content;
a second timebar that represents a second period of time, wherein the second period of time is shorter than the first period of time, and wherein the second timebar includes:
indications of multiple segments of time during the selected period of time; and
a region associated with the second timebar that includes:
at least some of the received metadata information for one or more of the indicated pieces of multimedia content that have associated time-related characteristics that correspond to the selected period of time.

25. The method of claim 24 wherein the pieces of multimedia content include any one or combination of music, photograph, image, video, advertisement, news clip, presentation, article, videogame, and Internet content,
wherein the associated time-related characteristic of the pieces of multimedia content is one of a record date and time-of-day, a release date and time-of-day, a broadcast date and time-of-day, a receipt date and time-of-day, a creation date and time-of-day, a revision date and time-of-day, and a download date and time-of-day, and wherein the pieces of multimedia content include pieces of multimedia content from multiple multimedia content sources, and wherein the received metadata information includes information for each of the pieces of multimedia content that includes a title and genre and one or more people associated with the pieces of multimedia content.

26. The method of claim 24, further comprising receiving one or more indications from the user of one or more criteria that can be related to at least one piece of multimedia content of interest, and wherein the multiple indicated pieces of multimedia content are selected such that each of the multiple indicated pieces of multimedia content satisfy the indicated criteria, so that the graphical indicators displayed in the first timebar reflect pieces of multimedia content that satisfy the indicated criteria.

27. The method of claim 24, further comprising displaying the metadata information for pieces of multimedia content that have time-related characteristics corresponding to the selected period of time or of the at least some pieces of multimedia content that have time-related characteristics that do not correspond to the selected period of time in a similar manner for similar multimedia content types and in a different manner for different multimedia content types.

28. The method of claim 24, further comprising providing status information pertaining to at least one of the indicated pieces of multimedia content, and wherein providing the status information includes providing status information associated with multiple devices that respectively control presentation of the indicated pieces of multimedia content, at least some of the multiple devices being associated with different multiple first timebars on the graphical user interface, each first timebar further being associated with a second timebar that can be displayed simultaneously with their associated first timebar, the second time bar having indications that are subsets of the indications of their associated first timebar.

29. The method of claim 24 wherein the graphical indicators included in the first timebar are displayed in such a manner as to have differing appearances, and wherein the appearance of each graphical indicator is specified so as to indicate a status of the indicated piece of multimedia content relative to one or more statuses of other indicated pieces of multimedia content.

30. The method of claim 24 wherein at least some of the indications of times in the first timebar are each user-selectable, the method further comprising:

receiving an indication of a selection by the user of one of the user-selectable indications of time in the first timebar;

selecting a new period of time based on the selected time indication; and updating the indications of multiple segments of time in the second timebar displayed graphical user interface to reflect the selected new period of time, including updating at least some of the received metadata information included in the region associated with the second timebar for one or more of the indicated pieces of multimedia content whose associated time-related characteristic correspond to the selected new period of time.

31. The method of claim 24 wherein the indicated times for the first timebar represent a first time period and wherein the selected period of time is a second distinct time period that is selected as a subset of the first time period, wherein the displayed graphical user interface further includes a region associated with the second timebar that includes indications of multiple multimedia content sources, wherein the indicated pieces of multimedia content that have associated time-related characteristics that correspond to the selected period of time include pieces of multimedia content from the multiple multimedia content sources whose associated time-related characteristics correspond to one of the multiple segments of time during the selected period of time, and wherein the at least some of the received metadata information that is included in the region associated with the second timebar in the displayed graphical user interface is displayed in a grid format within the region associated with the second timebar and includes detail information for each of the one or more indicated pieces of multimedia content.

32. The method of claim 24 wherein, for each of at least one of the graphical indicators included on the displayed first timebar, the graphical indicator is displayed on the first timebar in such a manner as to correspond to multiple distinct pieces of multimedia content whose associated time-related characteristics overlap, and wherein, for one or more of the at least one graphical indicators, the graphical indicator is displayed so as to have an appearance that indicates a quantity of the multiple distinct pieces of multimedia content to which the graphical indicator corresponds.

33. The method of claim 24 wherein the displayed graphical user interface further includes one or more user-selectable controls corresponding to a time scale for the first timebar, and wherein the method further comprises:

receiving an indication of a selection by the user of one of the user-selectable controls;

selecting a new time scale for the first timebar based on the selection of the user-selectable control, wherein the new time scale represents time using one of hours, days, weeks and months, and wherein a prior time scale of the first timebar represented time using a different one of hours, days, weeks, and months; and updating the displayed graphical user interface to reflect the new time scale, the updating including changing at least some of the graphical indicators for indicated pieces of multimedia content that are included on the first timebar.

34. The method of claim 24 wherein the indications of times included in the first timebar are part of a first time period represented by the first timebar, wherein the displayed graphical user interface further includes one or more user-selectable controls for use in changing the first time period represented by the first timebar, and wherein the method further comprises:

receiving an indication of a selection by the user of one of the user-selectable controls;

adjusting the first time period for the first timebar based on the selection of the user-selectable control; and updating the displayed graphical user interface such that the first timebar includes indications of times corresponding to the adjusted first time period.

* * * * *

UNITED STATES PATENT AND TRADEMARK OFFICE
CERTIFICATE OF CORRECTION

| | | |
|---|---|---|
| PATENT NO. | : 7,941,819 B2 | |
| APPLICATION NO. | : 12/430746 | |
| DATED | : May 10, 2011 | |
| INVENTOR(S) | : Korina J. B. Stark et al. | |

It is certified that error appears in the above-identified patent and that said Letters Patent is hereby corrected as shown below:

On the cover page, below item (63) "Related U.S. Application Data", insert -- Provisional Application No. 60/567,177, filed on Apr. 30, 2004. --.

On Page 2, in column 2, line 18, under "Other Publications", delete "Controllng" and insert -- Controlling --, therefor.

On Page 3, in column 1, line 15, under "Other Publications", delete "Technolgy" and insert -- Technology --, therefor.

In column 30, line 12, delete "Y" and insert -- 1/2 --, therefor.

In column 52, line 15, in Claim 24, delete "characteristic" and insert -- characteristic, and --, therefor.

Signed and Sealed this
Second Day of August, 2011

David J. Kappos
*Director of the United States Patent and Trademark Office*